US012229888B2

(12) United States Patent
Koyama et al.

(10) Patent No.: US 12,229,888 B2
(45) Date of Patent: *Feb. 18, 2025

(54) DISPLAY METHOD AND DISPLAY DEVICE FOR PROVIDING SURROUNDING INFORMATION BASED ON DRIVING CONDITION

(71) Applicant: Panasonic Intellectual Property Corporation of America, Torrance, CA (US)

(72) Inventors: Tatsuya Koyama, Kyoto (JP); Takahiro Nishi, Nara (JP); Toshiyasu Sugio, Osaka (JP); Tadamasa Toma, Osaka (JP); Satoshi Yoshikawa, Hyogo (JP); Toru Matsunobu, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,429

(22) Filed: Jul. 11, 2023

(65) Prior Publication Data

US 2023/0351688 A1  Nov. 2, 2023

Related U.S. Application Data

(63) Continuation of application No. 17/554,482, filed on Dec. 17, 2021, now Pat. No. 11,748,947, which is a
(Continued)

(51) Int. Cl.
*G06T 17/05* (2011.01)
*G01C 21/36* (2006.01)
(Continued)

(52) U.S. Cl.
CPC .............. *G06T 17/05* (2013.01); *G01C 21/36* (2013.01); *G01C 21/3635* (2013.01);
(Continued)

(58) Field of Classification Search
CPC ......... G06T 17/05; G06T 15/10; G01C 21/36; G01C 21/3635; G08G 1/16; G09B 21/00; H04N 7/18; B60R 2300/605
See application file for complete search history.

(56) References Cited

U.S. PATENT DOCUMENTS

| 5,913,918 A | 6/1999 | Nakano |
| 6,373,472 B1 | 4/2002 | Palalau |

(Continued)

FOREIGN PATENT DOCUMENTS

| DE | 10 2004 037900 | 3/2006 | |
| DE | 102004037900 A1 * | 3/2006 | ......... G01C 21/3638 |

(Continued)

OTHER PUBLICATIONS

International Search Report (ISR) issued on Jan. 9, 2018 in International (PCT) Application No. PCT/JP2017/037929.
(Continued)

*Primary Examiner* — Terrell M Robinson
(74) *Attorney, Agent, or Firm* — Wenderoth, Lind & Ponack, L.L.P.

(57) ABSTRACT

A display method is a display method performed by a display device that operates in conjunction with a mobile object, and includes: determining which one of first surrounding information, which is video showing a surrounding condition of the mobile object and is generated using two-dimensional information, and second surrounding information, which is video showing the surrounding condition of the mobile object and is generated using three-dimensional data, is to be displayed, based on a driving condition
(Continued)

of the mobile object; and displaying the one of the first surrounding information and the second surrounding information that is determined to be displayed.

6 Claims, 25 Drawing Sheets

Related U.S. Application Data continuation of application No. 16/860,741, filed on Apr. 28, 2020, now Pat. No. 11,238,648, which is a continuation of application No. 16/391,884, filed on Apr. 23, 2019, now Pat. No. 10,719,984, which is a continuation of application No. PCT/JP2017/037929, filed on Oct. 20, 2017.

(60) Provisional application No. 62/415,645, filed on Nov. 1, 2016.

(51) Int. Cl.
*G06T 15/10* (2011.01)
*G08G 1/16* (2006.01)
*G09B 21/00* (2006.01)
*H04N 7/18* (2006.01)

(52) U.S. Cl.
CPC ............. *G06T 15/10* (2013.01); *G08G 1/16* (2013.01); *G09B 21/00* (2013.01); *H04N 7/18* (2013.01); *B60R 2300/605* (2013.01)

(56) References Cited

U.S. PATENT DOCUMENTS

| | | |
|---|---|---|
| 7,869,943 B1 | 1/2011 | Simon |
| 7,894,951 B2 | 2/2011 | Norris |
| 8,020,657 B2 | 9/2011 | Allard |
| 8,565,958 B1 | 10/2013 | Montemerlo |
| 9,052,721 B1 | 6/2015 | Dowdall |
| 9,285,805 B1 | 3/2016 | Pollock |
| 9,501,058 B1 | 11/2016 | Mariet |
| 2008/0055114 A1 | 3/2008 | Kim et al. |
| 2010/0034426 A1 | 2/2010 | Takiguchi et al. |
| 2011/0032252 A1* | 2/2011 | Ohta ............... H04N 13/10 345/419 |
| 2011/0090221 A1 | 4/2011 | Ren |
| 2011/0164037 A1 | 7/2011 | Yoshida et al. |
| 2011/0274343 A1 | 11/2011 | Krishnaswamy |
| 2012/0226439 A1 | 9/2012 | Chan |
| 2013/0207966 A1 | 8/2013 | Chu |
| 2014/0121880 A1 | 5/2014 | Dolgov |
| 2014/0375638 A1 | 12/2014 | Tomaru et al. |
| 2015/0003723 A1 | 1/2015 | Huang |
| 2015/0154467 A1 | 6/2015 | Feng |
| 2016/0260326 A1 | 9/2016 | Ng-Thow-Hing et al. |
| 2016/0266256 A1 | 9/2016 | Allen |
| 2017/0046880 A1* | 2/2017 | Kasazumi ............ G06F 3/013 |
| 2017/0054973 A1* | 2/2017 | Kasazumi ............ B60R 1/00 |
| 2017/0064278 A1 | 3/2017 | Posselius |
| 2017/0076455 A1 | 3/2017 | Newman |
| 2017/0345321 A1 | 11/2017 | Cross |
| 2017/0358113 A1 | 12/2017 | Bray |
| 2018/0259338 A1* | 9/2018 | Stokes ............... G06T 7/70 |
| 2019/0147250 A1 | 5/2019 | Zhang |
| 2019/0387060 A1 | 12/2019 | Kentley-Kiay |

FOREIGN PATENT DOCUMENTS

| | | |
|---|---|---|
| EP | 0 875 730 | 11/1998 |
| EP | 2 120 009 | 11/2009 |
| JP | 2005-292064 | 10/2005 |
| JP | 2011-73466 | 4/2011 |
| JP | 2011-203643 | 10/2011 |
| JP | 2011-244465 | 12/2011 |
| JP | 2012-18170 | 1/2012 |
| KR | 10-2007-0019166 A | 2/2007 |
| WO | 2006/015892 | 2/2006 |
| WO | 2008/099915 | 8/2008 |
| WO | 2014/020663 | 2/2014 |

OTHER PUBLICATIONS

Extended European Search Report issued Jul. 16, 2019 in corresponding European Patent Application No. 17868462.7.
Extended European Search Report issued Dec. 13, 2024 in European Patent Application No. 24202515.3, 7 pages.

* cited by examiner

FIRST SPC

GOS INDEX NUMBER (ENCODING ORDER)

| OBJECT | GOS NUMBER |
|---|---|
| object(1) | 1, 2 |
| object(2) | 5 |
| object(3) | 8, 9, 10 |
| ... | ... |
| object(N) | 101, 113, 125 |

OBJECT-GOS TABLE

| COORDINATES | GOS NUMBER |
|---|---|
| (x1, y1, z1) | 1 |
| (x2, y2, z2) | 2 |
| (x3, y3, z3) | 3 |
| ... | ... |
| (xN, yN, zN) | N |

COORDINATES-GOS TABLE

| TIME | GOS NUMBER |
|---|---|
| pts(1) | 1 |
| pts(2) | 30 |
| pts(3) | 50 |
| ... | ... |
| pts(N) | 200 |

TIME-GOS TABLE

| GOS NUMBER | GOS ADDRESS |
|---|---|
| 1 | addr(1) |
| 2 | addr(2) |
| 3 | addr(3) |
| ... | ... |
| N | addr(N) |

GOS-ADDRESS TABLE

SURROUNDING CONDITION
DETECTION RESULT    POINT CLOUD DATA

SURROUNDING CONDITION
DETECTION RESULT    POINT CLOUD DATA

DISPLAY METHOD AND DISPLAY DEVICE FOR PROVIDING SURROUNDING INFORMATION BASED ON DRIVING CONDITION

CROSS REFERENCE TO RELATED APPLICATIONS

This application is a continuation of application Ser. No. 17/554,482, filed Dec. 17, 2021, which is a continuation of application Ser. No. 16/860,741, filed Apr. 28, 2020, now U.S. Pat. No. 11,238,648, which is a continuation of application Ser. No. 16/391,884, filed Apr. 23, 2019, now U.S. Pat. No. 10,719,984, which is a U.S. continuation application of PCT International Patent Application Number PCT/JP2017/037929 filed on Oct. 20, 2017, claiming the benefit of priority of U.S. Provisional Patent Application No. 62/415,645 filed on Nov. 1, 2016, the entire contents of which are hereby incorporated by reference.

BACKGROUND

1. Technical Field

The present disclosure relates to a display method and a display device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see International Publication No. WO2014/020663).

SUMMARY

In display devices that display information based on such three-dimensional data, being able to display appropriate information according to conditions is desired.

The present disclosure has as an object to provide a display method and a display device that are capable of displaying appropriate information.

A display method according to an aspect of the present disclosure is a display method performed by a display device that operates in conjunction with a mobile object, and includes: determining which one of first surrounding information and second surrounding information is to be displayed, based on a driving condition of the mobile object, the first surrounding information being information which indicates a surrounding condition of the mobile object and is generated using two-dimensional information, the second surrounding information being information which indicates the surrounding condition of the mobile object and is generated using three-dimensional data; and displaying the one of the first surrounding information and the second surrounding information that is determined to be displayed.

Note that these general and specific aspects may be implemented as a system, a method, an integrated circuit, a computer program, or may be implemented as a computer-readable recording medium such as a CD-ROM, or as any combination of a system, a method, an integrated circuit, a computer program, or a computer-readable recording medium.

The present disclosure can provide a display method and a display device that are capable of displaying appropriate information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF EMBODIMENTS

Figure 1:
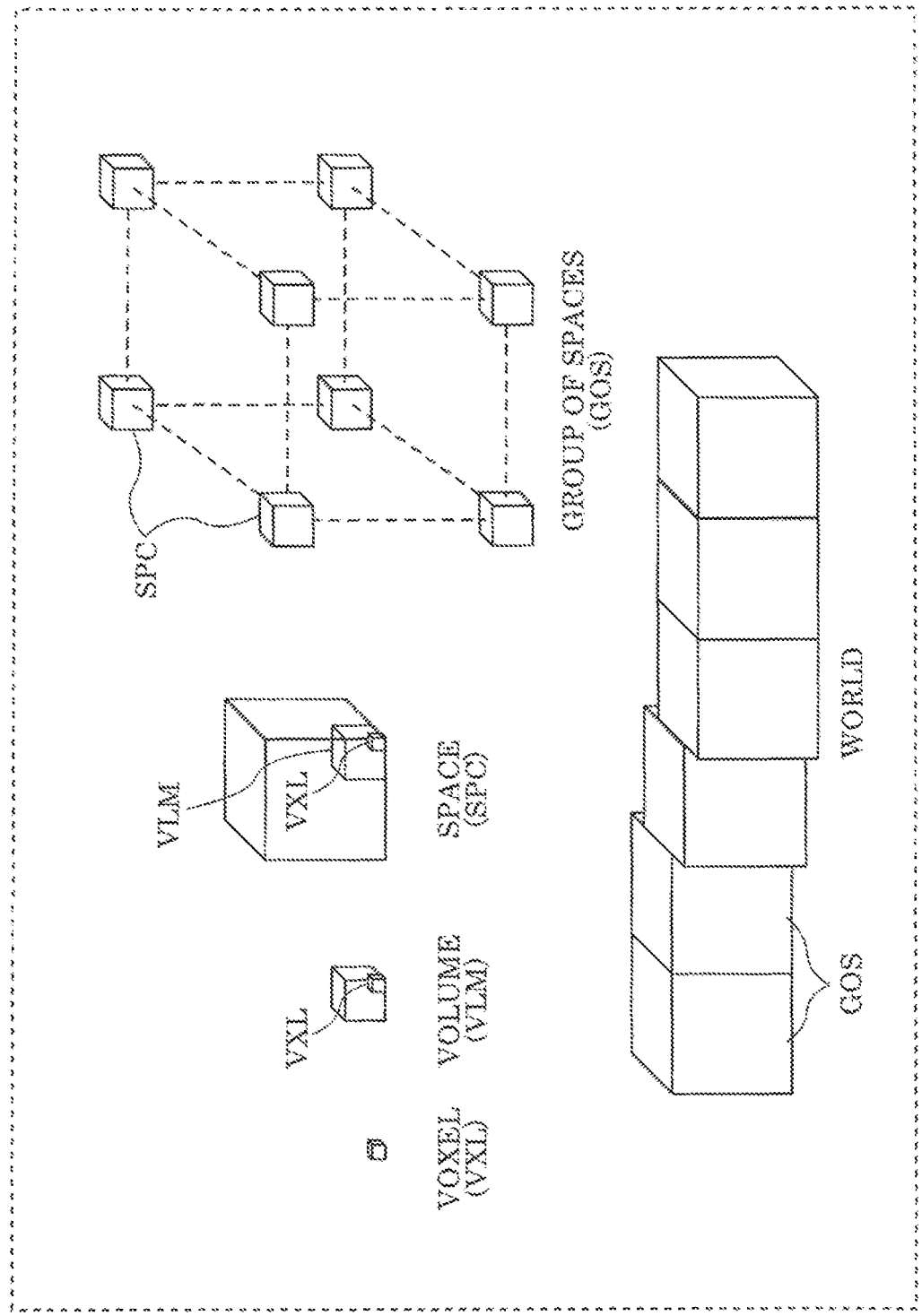
FIG. 1 is a diagram showing the structure of encoded three-dimensional data according to Embodiment 1.

While the use of encoded data such as that of a point cloud in an actual device or service requires random access to a desired spatial position or object, there has been no functionality for random access in encoded three-dimensional data, nor an encoding method therefor.

The present disclosure describes a three-dimensional data encoding method, a three-dimensional data decoding method, a three-dimensional data encoding device, or a three-dimensional data decoding device capable of providing random access functionality for encoded three-dimensional data.

The three-dimensional data encoding method according to one aspect of the present disclosure is a three-dimensional data encoding method for encoding three-dimensional data, the method including: dividing the three-dimensional data into first processing units, each being a random access unit and being associated with three-dimensional coordinates; and encoding each of the first processing units to generate encoded data.

This enables random access on a first processing unit basis. The three-dimensional data encoding method is thus capable of providing random access functionality for encoded three-dimensional data.

For example, the three-dimensional data encoding method may include generating first information indicating the first processing units and the three-dimensional coordinates associated with each of the first processing units, and the encoded data may include the first information.

For example, the first information may further indicate at least one of an object, a time, and a data storage location that are associated with each of the first processing units.

For example, in the dividing, each of the first processing units may be further divided into second processing units, and in the encoding, each of the second processing units may be encoded.

For example, in the encoding, a current second processing unit among the second processing units included in a current first processing unit among the first processing units may be encoded by referring to another of the second processing units included in the current first processing unit.

With this, the encoding efficiency is increased by referring to another second processing unit.

For example, in the encoding, one of three types may be selected as a type of the current second processing unit, and the current second processing unit may be encoded in accordance with the type that has been selected, the three types being a first type in which another of the second processing units is not referred to, a second type in which another of the second processing units is referred to, and a third type in which other two of the second processing units are referred to.

For example, in the encoding, a frequency of selecting the first type may be changed in accordance with the number, or sparseness and denseness of objects included in the three-dimensional data.

This enables an adequate setting of random accessibility and encoding efficiency, which are in a tradeoff relationship.

For example, in the encoding, a size of the first processing units may be determined in accordance with the number, or sparseness and denseness of objects or dynamic objects included in the three-dimensional data.

This enables an adequate setting of random accessibility and encoding efficiency, which are in a tradeoff relationship.

For example, each of the first processing units may be spatially divided in a predetermined direction to have layers, each including at least one of the second processing units, and in the encoding, each of the second processing units may be encoded by referring to another of the second processing units included in an identical layer of the each of the second processing units or included in a lower layer of the identical layer.

This achieves an increased random accessibility to an important layer in a system, while preventing a decrease in the encoding efficiency.

For example, in the dividing, among the second processing units, a second processing unit including only a static object and a second processing unit including only a dynamic object may be assigned to different ones of the first processing units.

This enables easy control of dynamic objects and static objects.

For example, in the encoding, dynamic objects may be individually encoded, and encoded data of each of the dynamic objects may be associated with a second processing unit, among the second processing units, that includes only a static object.

This enables easy control of dynamic objects and static objects.

For example, in the dividing, each of the second processing units may be further divided into third processing units, and in the encoding, each of the third processing units may be encoded.

For example, each of the third processing units may include at least one voxel, which is a minimum unit in which position information is associated.

For example, each of the second processing units may include a keypoint group derived from information obtained by a sensor.

For example, the encoded data may include information indicating an encoding order of the first processing units.

For example, the encoded data may include information indicating a size of the first processing units.

For example, in the encoding, the first processing units may be encoded in parallel.

Also, the three-dimensional data decoding method according another aspect of the present disclosure is a three-dimensional data decoding method for decoding three-dimensional data, the method including: decoding each encoded data of first processing units, each being a random access unit and being associated with three-dimensional coordinates, to generate three-dimensional data of the first processing units.

This enables random access on a first processing unit basis. The three-dimensional data decoding method is thus capable of providing random access functionality for encoded three-dimensional data.

Also, the three-dimensional data encoding device according to still another aspect of the present disclosure is a three-dimensional data encoding device that encodes three-dimensional data that may include: a divider that divides the three-dimensional data into first processing units, each being a random access unit and being associated with three-dimensional coordinates; and an encoder that encodes each of the first processing units to generate encoded data.

This enables random access on a first processing unit basis. The three-dimensional data encoding device is thus capable of providing random access functionality for encoded three-dimensional data.

Also, the three-dimensional data decoding device according to still another aspect of the present disclosure is a three-dimensional data decoding device that decodes three-dimensional data that may include: a decoder that decodes each encoded data of first processing units, each being a random access unit and being associated with three-dimensional coordinates, to generate three-dimensional data of the first processing units.

This enables random access on a first processing unit basis. The three-dimensional data decoding device is thus capable of providing random access functionality for encoded three-dimensional data.

Note that the present disclosure, which is configured to divide a space for encoding, enables quantization, prediction, etc. of such space, and thus is effective also for the case where no random access is performed.

Also, the three-dimensional data encoding method according to one aspect of the present disclosure includes: extracting, from first three-dimensional data, second three-dimensional data having an amount of a feature greater than or equal to a threshold; and encoding the second three-dimensional data to generate first encoded three-dimensional data.

According to this three-dimensional data encoding method, first encoded three-dimensional data is generated that is obtained by encoding data having an amount of a feature greater than or equal to the threshold. This reduces the amount of encoded three-dimensional data compared to the case where the first three-dimensional data is encoded as it is. The three-dimensional data encoding method is thus capable of reducing the amount of data to be transmitted.

For example, the three-dimensional data encoding method may further include encoding the first three-dimensional data to generate second encoded three-dimensional data.

This three-dimensional data encoding method enables selective transmission of the first encoded three-dimensional data and the second encoded three-dimensional data, in accordance, for example, with the intended use, etc.

For example, the second three-dimensional data may be encoded by a first encoding method, and the first three-dimensional data may be encoded by a second encoding method different from the first encoding method.

This three-dimensional data encoding method enables the use of an encoding method suitable for each of the first three-dimensional data and the second three-dimensional data.

For example, of intra prediction and inter prediction, the inter prediction may be more preferentially performed in the first encoding method than in the second encoding method.

This three-dimensional data encoding method enables inter prediction to be more preferentially performed on the second three-dimensional data in which adjacent data items are likely to have low correlation.

For example, the first encoding method and the second encoding method may represent three-dimensional positions differently.

This three-dimensional data encoding method enables the use of a more suitable method to represent three-dimensional positions of three-dimensional data in consideration of the difference in the number of data items included.

For example, at least one of the first encoded three-dimensional data and the second encoded three-dimensional data may include an identifier indicating whether the at least one of the first encoded three-dimensional data and the second encoded three-dimensional data is encoded three-dimensional data obtained by encoding the first three-dimensional data or encoded three-dimensional data obtained by encoding part of the first three-dimensional data.

This enables the decoding device to readily judge whether the obtained encoded three-dimensional data is the first encoded three-dimensional data or the second encoded three-dimensional data.

For example, in the encoding of the second three-dimensional data, the second three-dimensional data may be encoded in a manner that the first encoded three-dimensional data has a smaller data amount than a data amount of the second encoded three-dimensional data.

This three-dimensional data encoding method enables the first encoded three-dimensional data to have a smaller data amount than the data amount of the second encoded three-dimensional data.

For example, in the extracting, data corresponding to an object having a predetermined attribute may be further extracted from the first three-dimensional data as the second three-dimensional data.

This three-dimensional data encoding method is capable of generating the first encoded three-dimensional data that includes data required by the decoding device.

For example, the three-dimensional data encoding method may further include sending, to a client, one of the first encoded three-dimensional data and the second encoded three-dimensional data in accordance with a status of the client.

This three-dimensional data encoding method is capable of sending appropriate data in accordance with the status of the client.

For example, the status of the client may include one of a communication condition of the client and a traveling speed of the client.

For example, the three-dimensional data encoding method may further include sending, to a client, one of the first encoded three-dimensional data and the second encoded three-dimensional data in accordance with a request from the client.

This three-dimensional data encoding method is capable of sending appropriate data in accordance with the request from the client.

Also, the three-dimensional data decoding method according to another aspect of the present disclosure includes: decoding, by a first decoding method, first encoded three-dimensional data obtained by encoding second three-dimensional data having an amount of a feature greater than or equal to a threshold, the second three-dimensional data having been extracted from first three-dimensional data; and decoding, by a second decoding method, second encoded three-dimensional data obtained by encoding the first three-dimensional data, the second decoding method being different from the first decoding method.

This three-dimensional data decoding method enables selective reception of the first encoded three-dimensional data obtained by encoding data having an amount of a feature greater than or equal to the threshold and the second encoded three-dimensional data, in accordance, for example, with the intended use, etc. The three-dimensional data decoding method is thus capable of reducing the amount of data to be transmitted. Such three-dimensional data decoding method further enables the use of a decoding method suitable for each of the first three-dimensional data and the second three-dimensional data.

For example, of intra prediction and inter prediction, the inter prediction may be more preferentially performed in the first decoding method than in the second decoding method.

This three-dimensional data decoding method enables inter prediction to be more preferentially performed on the second three-dimensional data in which adjacent data items are likely to have low correlation.

For example, the first decoding method and the second decoding method may represent three-dimensional positions differently.

This three-dimensional data decoding method enables the use of a more suitable method to represent three-dimensional positions of three-dimensional data in consideration of the difference in the number of data items included.

For example, at least one of the first encoded three-dimensional data and the second encoded three-dimensional data may include an identifier indicating whether the at least one of the first encoded three-dimensional data and the second encoded three-dimensional data is encoded three-dimensional data obtained by encoding the first three-dimensional data or encoded three-dimensional data obtained by encoding part of the first three-dimensional data, and the identifier may be referred to in identifying between the first encoded three-dimensional data and the second encoded three-dimensional data.

This enables judgment to be readily made of whether the obtained encoded three-dimensional data is the first encoded three-dimensional data or the second encoded three-dimensional data.

For example, the three-dimensional data decoding method may further include: notifying a server of a status of a client; and receiving one of the first encoded three-dimensional data and the second encoded three-dimensional data from the server, in accordance with the status of the client.

This three-dimensional data decoding method is capable of receiving appropriate data in accordance with the status of the client.

For example, the status of the client may include one of a communication condition of the client and a traveling speed of the client.

For example, the three-dimensional data decoding method may further include: making a request of a server for one of the first encoded three-dimensional data and the second encoded three-dimensional data; and receiving one of the first encoded three-dimensional data and the second encoded three-dimensional data from the server, in accordance with the request.

This three-dimensional data decoding method is capable of receiving appropriate data in accordance with the intended use.

Also, the three-dimensional data encoding device according to still another aspect of the present disclosure include: an extractor that extracts, from first three-dimensional data, second three-dimensional data having an amount of a feature greater than or equal to a threshold; and a first encoder that encodes the second three-dimensional data to generate first encoded three-dimensional data.

This three-dimensional data encoding device generates first encoded three-dimensional data by encoding data having an amount of a feature greater than or equal to the threshold. This reduces the amount data compared to the case where the first three-dimensional data is encoded as it is. The three-dimensional data encoding device is thus capable of reducing the amount of data to be transmitted.

Also, the three-dimensional data decoding device according to still another aspect of the present disclosure includes: a first decoder that decodes, by a first decoding method, first encoded three-dimensional data obtained by encoding second three-dimensional data having an amount of a feature greater than or equal to a threshold, the second three-dimensional data having been extracted from first three-dimensional data; and a second decoder that decodes, by a second decoding method, second encoded three-dimensional data obtained by encoding the first three-dimensional data, the second decoding method being different from the first decoding method.

This three-dimensional data decoding devices enables selective reception of the first encoded three-dimensional data obtained by encoding data having an amount of a feature greater than or equal to the threshold and the second encoded three-dimensional data, in accordance, for example, with the intended use, etc. The three-dimensional data decoding device is thus capable of reducing the amount of data to be transmitted. Such three-dimensional data decoding device further enables the use of a decoding method suitable for each of the first three-dimensional data and the second three-dimensional data.

Also, the three-dimensional data creation method according to one aspect of the present disclosure includes: creating first three-dimensional data from information detected by a sensor; receiving encoded three-dimensional data that is obtained by encoding second three-dimensional data; decoding the encoded three-dimensional data that has been received to obtain the second three-dimensional data; and merging the first three-dimensional data with the second three-dimensional data to create third three-dimensional data.

Such three-dimensional data creation method is capable of creating detailed three-dimensional data by use of the created first three-dimensional data and the received second three-dimensional data.

For example, in the merging, the first three-dimensional data may be merged with the second three-dimensional data to create the third three-dimensional data that is denser than the first three-dimensional data and the second three-dimensional data.

For example, the second three-dimensional data may be three-dimensional data that is generated by extracting, from fourth three-dimensional data, data having an amount of a feature greater than or equal to a threshold.

Such three-dimensional data creation method reduces the amount of three-dimensional data to be transmitted.

For example, the three-dimensional data creation method may further include searching for a transmission device that transmits the encoded three-dimensional data, and in the receiving, the encoded three-dimensional data may be received from the transmission device that has been searched out.

Such three-dimensional data creation method is, for example, capable of searching for a transmission device having necessary three-dimensional data.

For example, the three-dimensional data creation method may further include: determining a request range that is a range of a three-dimensional space, three-dimensional data of which is requested; and transmitting information indicating the request range to the transmission device, wherein the second three-dimensional data may include the three-dimensional data of the request range.

Such three-dimensional data creation method is capable of receiving necessary three-dimensional data, while reducing the amount of three-dimensional data to be transmitted.

For example, in the determining, a spatial range that includes an occlusion region undetectable by the sensor may be determined as the request range.

The three-dimensional data transmission method according to another aspect of the present disclosure includes: creating fifth three-dimensional data from information detected by a sensor; extracting part of the fifth three-dimensional data to create sixth three-dimensional data; encoding the sixth three-dimensional data to generate encoded three-dimensional data; and transmitting the encoded three-dimensional data.

Such three-dimensional data transmission method is capable of transmitting self-created three-dimensional data to another device, while reducing the amount of three-dimensional data to be transmitted.

For example, in the creating, the fifth three-dimensional data may be created by creating seventh three-dimensional data from the information detected by the sensor, and by extracting data having an amount of a feature greater than or equal to a threshold from the seventh three-dimensional data.

Such three-dimensional data transmission method reduces the amount of three-dimensional data to be transmitted.

For example, the three-dimensional data transmission method may further include: receiving, from a reception device, information indicating a request range that is a range of a three-dimensional space, three-dimensional data of which is requested, wherein in the extracting, the sixth three-dimensional data may be created by extracting the three-dimensional data of the request range from the fifth three-dimensional data, and in the transmitting, the encoded three-dimensional data may be transmitted to the reception device.

Such three-dimensional data transmission method reduces the amount of three-dimensional data to be transmitted.

Also, the three-dimensional data creation device according to still another aspect of the present disclosure includes: a creator that creates first three-dimensional data from information detected by a sensor; a receiver that receives encoded three-dimensional data that is obtained by encoding second three-dimensional data; a decoder that decodes the encoded three-dimensional data that has been received to obtain the second three-dimensional data; and a merger that merges the first three-dimensional data with the second three-dimensional data to create third three-dimensional data.

Such three-dimensional data creation device is capable of creating detailed third three-dimensional data by use of the created first three-dimensional data and the received second three-dimensional data.

Also, the three-dimensional data transmission device according to still another aspect of the present disclosure includes: a creator that creates fifth three-dimensional data from information detected by a sensor; an extractor that extracts part of the fifth three-dimensional data to create sixth three-dimensional data; an encoder that encodes the sixth three-dimensional data to generate encoded three-dimensional data; and a transmitter that transmits the encoded three-dimensional data.

Such three-dimensional data transmission device is capable of transmitting self-created three-dimensional data to another device, while reducing the amount of three-dimensional data to be transmitted.

Also, the three-dimensional information processing method according one aspect of the present disclosure includes: obtaining, via a communication channel, map data that includes first three-dimensional position information; generating second three-dimensional position information from information detected by a sensor; judging whether one of the first three-dimensional position information and the second three-dimensional position information is abnormal by performing, on one of the first three-dimensional position information and the second three-dimensional position information, a process of judging whether an abnormality is present; determining a coping operation to cope with the abnormality when one of the first three-dimensional position information and the second three-dimensional position information is judged to be abnormal; and executing a control that is required to perform the coping operation.

Such three-dimensional information processing method is capable of detecting an abnormality regarding one of the first three-dimensional position information and the second three-dimensional position information, and performing a coping operation therefor.

For example, the first three-dimensional position information may include a plurality of random access units, each of which is an assembly of at least one subspace and is individually decodable, the at least one subspace having three-dimensional coordinates information and serving as a unit in which each of the plurality of random access units is encoded.

Such three-dimensional information processing method is capable of reducing the data amount of the first three-dimensional position information to be obtained.

For example, the first three-dimensional position information may be data obtained by encoding keypoints, each of which has an amount of a three-dimensional feature greater than or equal to a predetermined threshold.

Such three-dimensional information processing method is capable of reducing the data amount of the first three-dimensional position information to be obtained.

For example, the judging may include judging whether the first three-dimensional position information is obtainable via the communication channel, and when the first three-dimensional position information is unobtainable via the communication channel, judging the first three-dimensional position information to be abnormal.

Such three-dimensional information processing method is capable of performing an appropriate coping operation in accordance with communication conditions, etc., when the first three-dimensional position information is unobtainable.

For example, the three-dimensional information processing method may further include: estimating a location of a mobile object having the sensor by use of the first three-dimensional position information and the second three-dimensional position information. The judging may include predicting whether the mobile object will enter an area in which communication conditions are poor. In the executing of the control, the mobile object may obtain the first three-dimensional position information before entering the area in which the communication conditions are poor, when the mobile object is predicted to enter the area.

Such three-dimensional information processing method is capable of obtaining the first three-dimensional position information in advance, when there is a possibility that the first three-dimensional position information may be unobtainable.

For example, the executing of the control may include obtaining, via the communication channel, third three-dimensional position information having a narrower range than a range of the first three-dimensional position information, when the first three-dimensional position information is unobtainable via the communication channel.

Such three-dimensional information processing method is capable of reducing the data amount of data to be obtained via a communication channel, thereby obtaining the three-dimensional position information even when communication conditions are poor.

For example, the three-dimensional information processing method may further include: estimating a location of a mobile object having the sensor by use of the first three-dimensional position information and the second three-dimensional position information. The executing of the control may include obtaining, via the communication channel, map data including two-dimensional position information, when the first three-dimensional position information is unobtainable via the communication channel, and estimating the location of the mobile object having the sensor by use of the two-dimensional position information and the second three-dimensional position information.

Such three-dimensional information processing method is capable of reducing the data amount of data to be obtained via a communication channel, thereby obtaining the three-dimensional position information even when communication conditions are poor.

For example, the three-dimensional information processing method may further include: performing automatic operation of the mobile object by use of the location having been estimated. The judging may further include judging whether to perform the automatic operation of the mobile object by use of the location of the mobile object, based on an environment in which the mobile object is traveling, the location having been estimated by use of the two-dimensional position information and the second three-dimensional position information.

Such three-dimensional information processing method is capable of judging whether to continue automatic operation, in accordance with an environment in which the mobile object is traveling.

For example, the three-dimensional information processing method may further include: performing automatic operation of the mobile object by use of the location having been estimated. The executing of the control may include switching a mode of the automatic operation to another based on an environment in which the mobile object is traveling.

Such three-dimensional information processing method is capable of setting an appropriate automatic operation mode, in accordance with an environment in which the mobile object is traveling.

For example, the judging may include judging whether the first three-dimensional position information has integrity, and when the first three-dimensional position information has no integrity, judging the first three-dimensional position information to be abnormal.

Such three-dimensional information processing method is capable of performing an appropriate coping operation, when, for example, the first three-dimensional position information is corrupt.

For example, the judging may include judging whether a data accuracy is higher than or equal to a reference value, and when the data accuracy is not higher than or equal to the reference value, judging the second three-dimensional position information to be abnormal, the data accuracy being an accuracy of the second three-dimensional position information having been generated.

Such three-dimensional information processing method is capable of performing an appropriate coping operation, when the accuracy of the second three-dimensional position information is low.

For example, the executing of the control may include generating fourth three-dimensional position information from information detected by an alternative sensor different from the sensor, when the data accuracy of the second three-dimensional position information having been generated is not higher than or equal to the reference value.

Such three-dimensional information processing method is capable of obtaining three-dimensional position information by use of an alternative sensor, when, for example, the sensor has trouble.

For example, the three-dimensional information processing method may further include: estimating a location of a mobile object having the sensor by use of the first three-dimensional position information and the second three-dimensional position information; and performing automatic operation of the mobile object by use of the location having been estimated. The executing of the control may include switching a mode of the automatic operation to another when the data accuracy of the second three-dimensional position information having been generated is not higher than or equal to the reference value.

Such three-dimensional information processing method is capable of performing an appropriate coping operation, when the accuracy of the second three-dimensional position information is low.

For example, the executing of the control may include calibrating an operation of the sensor, when the data accuracy of the second three-dimensional position information having been generated is not higher than or equal to the reference value.

Such three-dimensional information processing method is capable of increasing the accuracy of the second three-dimensional position information, when the accuracy of the second three-dimensional position information is low.

Also, the three-dimensional information processing device according to another aspect of the present disclosure includes: an obtainer that obtains, via a communication channel, map data that includes first three-dimensional position information; a generator that generates second three-dimensional position information from information detected by a sensor; a judgment unit that judges whether one of the first three-dimensional position information and the second three-dimensional position information is abnormal by performing, on one of the first three-dimensional position information and the second three-dimensional position information, a process of judging whether an abnormality is present; a determiner that determines a coping operation to cope with the abnormality when one of the first three-dimensional position information and the second three-dimensional position information is judged to be abnormal; and an operation controller that executes a control required to perform the coping operation.

Such three-dimensional information processing device is capable of detecting an abnormality regarding one of the first three-dimensional position information and the second three-dimensional position information, and performing a coping operation therefor.

Also, the three-dimensional data creation method according to one aspect of the present disclosure is a three-dimensional data creation method for use in a mobile object including a sensor and a communication unit that transmits and receives three-dimensional data to and from an external device. This three-dimensional data creation method includes: creating second three-dimensional data based on information detected by the sensor and first three-dimensional data received by the communication unit; and transmitting, to the external device, third three-dimensional data that is part of the second three-dimensional data.

Such three-dimensional data creation method is capable of generating three-dimensional data of a range undetectable by the mobile object. Stated differently, such three-dimensional data creation method is capable of generating detailed three-dimensional data. The three-dimensional data creation method is also capable of transmitting, to another mobile object, etc., three-dimensional data of a range undetectable by such another mobile object, etc.

For example, the creating and the transmitting may be repeatedly performed, and the third three-dimensional data may be three-dimensional data of a small space having a predetermined size and located a predetermined distance ahead of a current position of the mobile object in a traveling direction of the mobile object.

This reduces the data amount of the third three-dimensional data to be transmitted.

For example, the predetermined distance may vary in accordance with a traveling speed of the mobile object.

Such three-dimensional data creation method is capable of setting an appropriate small space in accordance with the traveling speed of the mobile object, and transmitting the three-dimensional data of such small space to another mobile object, etc.

For example, the predetermined size may vary in accordance with a traveling speed of the mobile object.

Such three-dimensional data creation method is capable of setting an appropriate small space in accordance with the traveling speed of the mobile object, and transmitting the three-dimensional data of such small space to another mobile object, etc.

For example, the three-dimensional data creation method may further include: judging whether a change has occurred in the second three-dimensional data of the small space corresponding to the third three-dimensional data already transmitted; and when the change has occurred, transmitting, to the external device, fourth three-dimensional data that is at least part of the second three-dimensional data in which the change has occurred.

Such three-dimensional data creation method is capable of transmitting, to another mobile object, etc., the fourth three-dimensional data of a space in which a change has occurred.

For example, the fourth three-dimensional data may be more preferentially transmitted than the third three-dimensional data.

Such three-dimensional data creation method preferentially transmits, to another mobile object, etc., the fourth three-dimensional data of a space in which a change has occurred, thereby enabling such another mobile object, etc., to promptly make, for example, a judgment, etc. that is based on the three-dimensional data.

For example, when the change has occurred, the fourth three-dimensional data may be transmitted before the third three-dimensional data is transmitted.

For example, the fourth three-dimensional data may indicate a difference between the second three-dimensional data of the small space corresponding to the third three-dimensional data already transmitted and the second three-dimensional data that has undergone the change.

Such three-dimensional data creation method is capable of reducing the amount of the three-dimensional data to be transmitted.

For example, in the transmitting, the third three-dimensional data may not be transmitted when no difference is present between the third three-dimensional data of the small space and the first three-dimensional data of the small space.

This reduces the data amount of the third three-dimensional data to be transmitted.

For example, when no difference is present between the third three-dimensional data of the small space and the first three-dimensional data of the small space, information may be transmitted to the external device, the information indicating that no difference is present between the third three-dimensional data of the small space and the first three-dimensional data of the small space.

For example, the information detected by the sensor may be three-dimensional data.

The three-dimensional data creation device according to another aspect of the present disclosure is a three-dimensional data creation device equipped in a mobile object. This three-dimensional data creation device includes: a sensor; a receiver that receives first three-dimensional data from an external device; a creator that creates second three-dimensional data based on information detected by the sensor and the first three-dimensional data; and a transmitter that transmits, to the external device, third three-dimensional data that is part of the second three-dimensional data.

Such three-dimensional data creation device is capable of generating three-dimensional data of a range undetectable by the mobile object. Stated differently, such three-dimensional data creation device is capable of generating detailed three-dimensional data. The three-dimensional data creation device is also capable of transmitting, to another mobile object, etc., three-dimensional data of a range undetectable by such another mobile object, etc.

Furthermore, a display method according to an aspect of the present disclosure is a display method performed by a display device that operates in conjunction with a mobile object, and includes: determining which one of first surrounding information and second surrounding information is to be displayed, based on a driving condition of the mobile object, the first surrounding information being information which indicates a surrounding condition of the mobile object and is generated using two-dimensional information, the second surrounding information being information which indicates the surrounding condition of the mobile object and is generated using three-dimensional data; and displaying the one of the first surrounding information and the second surrounding information that is determined to be displayed.

Accordingly, in the display method, which between the first surrounding information generated using two-dimensional data and second surrounding information generated using three-dimensional data is to be displayed can be switched based on the driving condition of the mobile object. For example, in the display method, the second surrounding information, which has a large amount of information, is displayed when detailed information is necessary, and the first surrounding information, which has a small amount of information, processing amount, and the like, is displayed when detailed information is not necessary. Accordingly, with the display method, appropriate information can be displayed according to conditions, and the communication data amount, processing amount, and the like, can be reduced.

For example, the driving condition may be whether the mobile object is under autonomous travel or under manual driving, and in the determining, the first surrounding information may be determined to be displayed when the mobile object is under autonomous travel, and the second surrounding information may be determined to be displayed when the mobile object is under manual driving.

Accordingly, detailed information can be displayed during manual driving, and the processing amount during self-driving can be reduced.

For example, the driving condition may be an area in which the mobile object is located.

Accordingly, appropriate information can be displayed according to the location of the mobile object.

For example, the three-dimensional data may be data obtained by extracting, from three dimensional point cloud data, a point cloud having an amount of a feature greater than or equal to a threshold.

Accordingly, the communication data amount or the amount of data to be stored can be reduced.

For example, the three-dimensional data may be data having a mesh structure generated from three-dimensional point cloud data.

Accordingly, the communication data amount or the amount of data to be stored can be reduced.

For example, the three-dimensional data may be data obtained by extracting, from three-dimensional point cloud data, a point cloud which has an amount of a feature greater than or equal to a threshold and is necessary for one of self-location estimation, drive assist, and self-driving.

Accordingly, the communication data amount or the amount of data to be stored can be reduced.

For example, the three-dimensional data may be three-dimensional point cloud data.

Accordingly, the precision of the second surrounding information can be improved.

For example, in the displaying, the second surrounding information may be displayed on a head-up display, and the display method may further include adjusting a display position of the second surrounding information according to one of posture, physique, and eye position of a user aboard the mobile object.

Accordingly, information can be displayed at the appropriate position according to the posture, physique or eye position of the user.

Furthermore, a display device according to an aspect of the present disclosure is a display device that operates in conjunction with a mobile object, and includes: a determiner that determines which one of first surrounding information and second surrounding information is to be displayed, based on a driving condition of the mobile object, the first surrounding information being video which shows a surrounding condition of the mobile object and is generated using two-dimensional information, the second surrounding information being video which shows the surrounding condition of the mobile object and is generated using three-dimensional data; and a display that displays the one of the first surrounding information and the second surrounding information that is determined to be displayed.

Accordingly, the display device can switch which between the first surrounding information generated using two-dimensional data and second surrounding information generated using three-dimensional data to display, based on the driving condition of the mobile object. For example, the display device displays the second surrounding information, which has a large amount of information, when detailed information is necessary, and displays the first surrounding information, which has a small amount of information, processing amount, and the like, when detailed information is not necessary. Accordingly, the display device is capable of displaying appropriate information according to conditions and reducing the communication data amount, the processing amount, and the like.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or its lower levels (the lower levels of the n-th level) may be sequentially indicated. For example, when only the n-th level is decoded, and the n−1th level or its lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
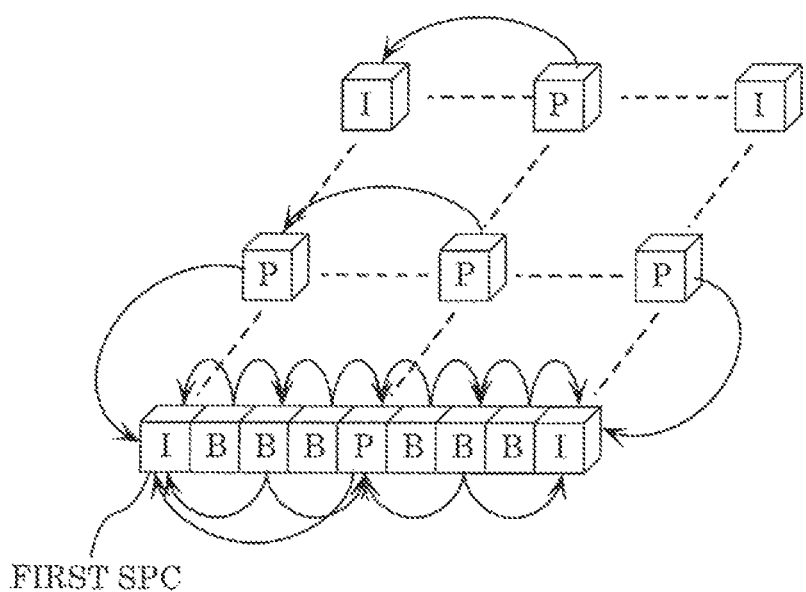
FIG. 2 is a diagram showing an example of prediction structures among SPCs that belong to the lowermost layer in a GOS according to Embodiment 1.
Figure 3:
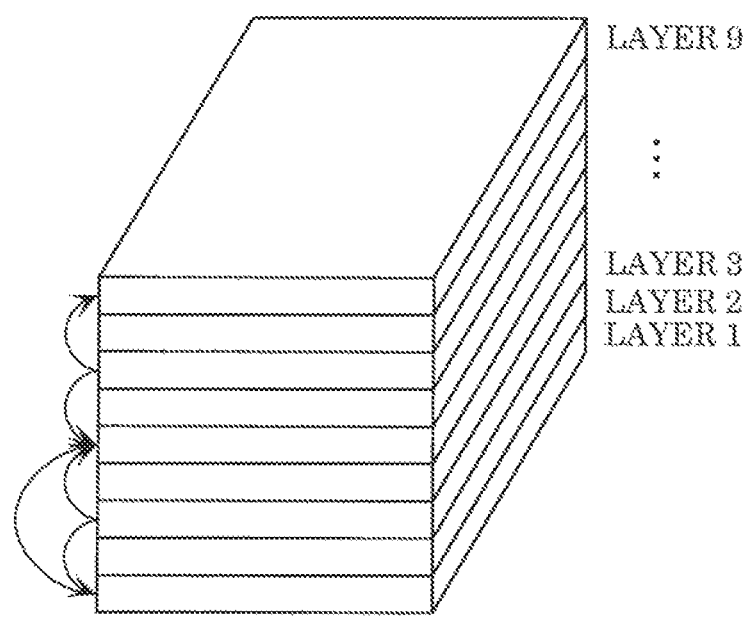
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
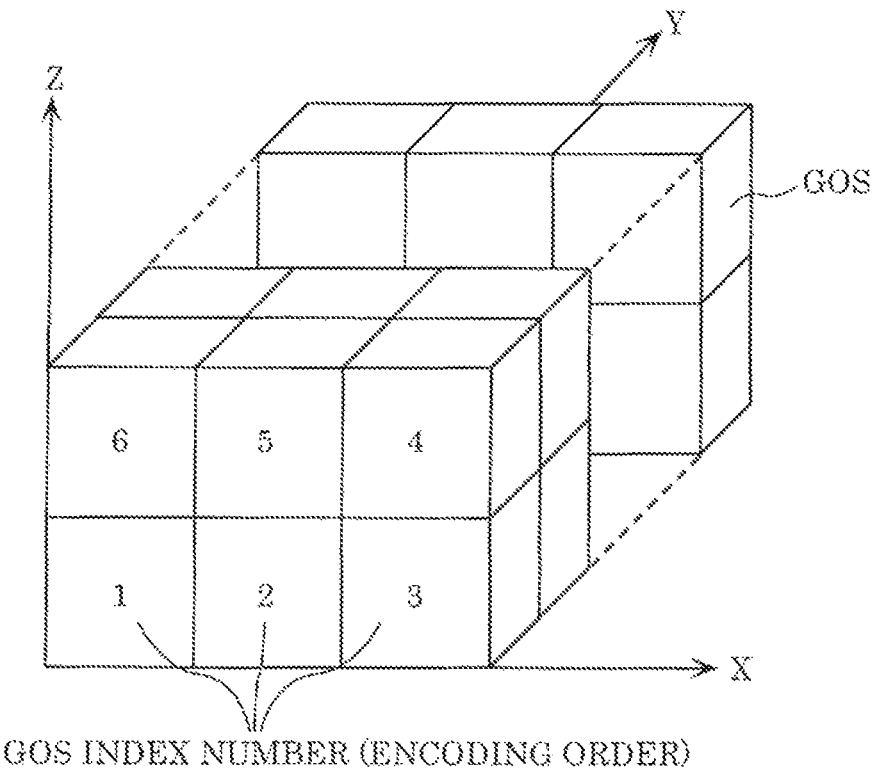
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
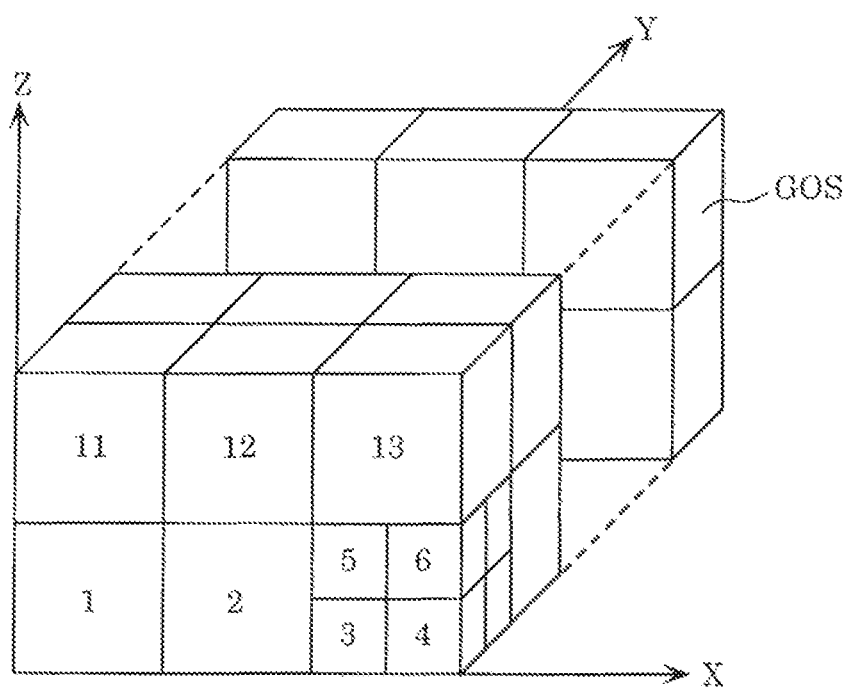
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
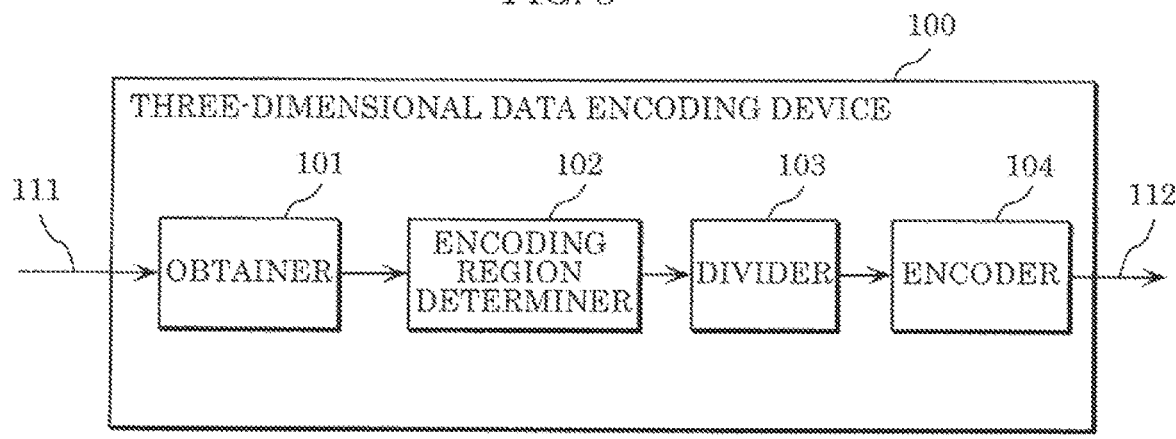
FIG. 6 is a block diagram of a three-dimensional data encoding device according to Embodiment 1.
Figure 7:
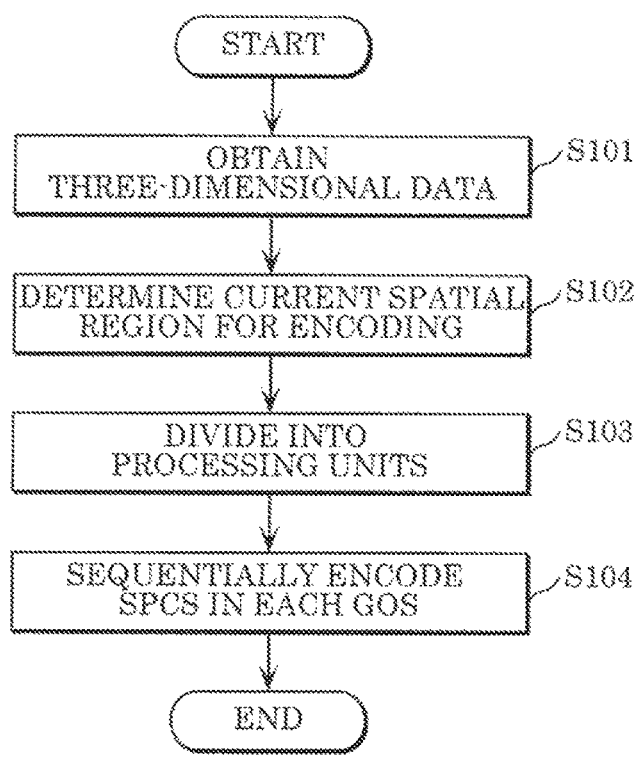
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently, three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
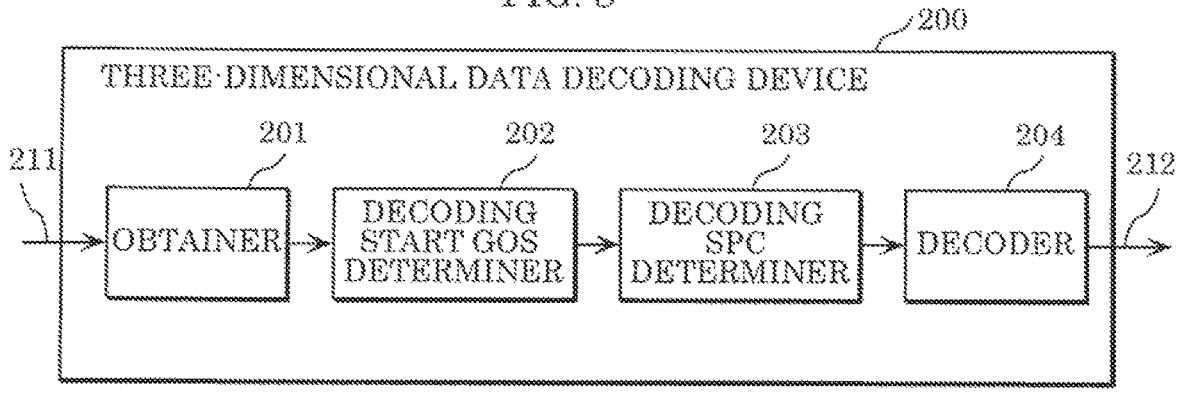
FIG. 8 is a block diagram of a three-dimensional data decoding device according to Embodiment 1.
Figures 9, 10:
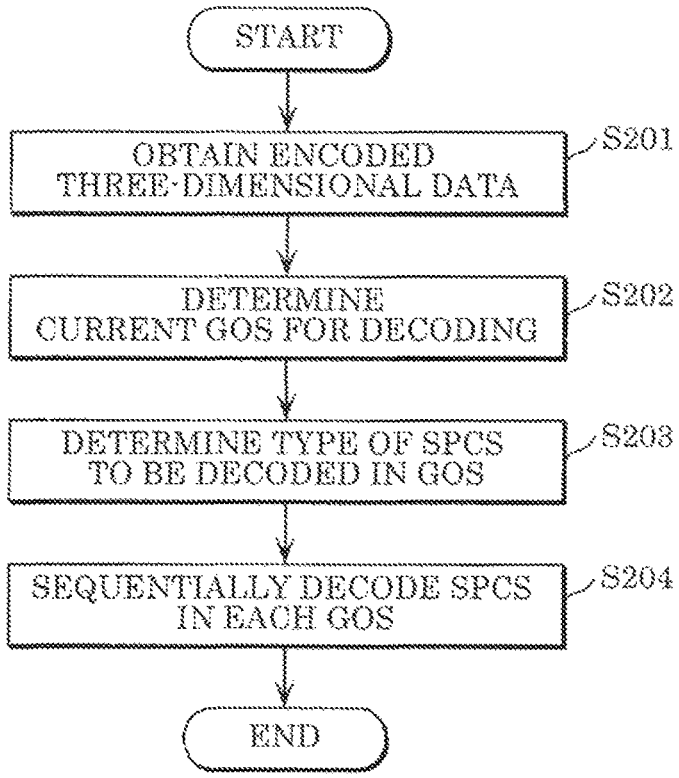
FIG. 9 is a flowchart of decoding processes according to Embodiment 1.
FIG. 10 is a diagram showing an example of meta information according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal." Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or V×L size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom level in the hierarchy.

The decoding device may also start decoding preferentially from the bottom level of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects.

For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently, a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding devices uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associates their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
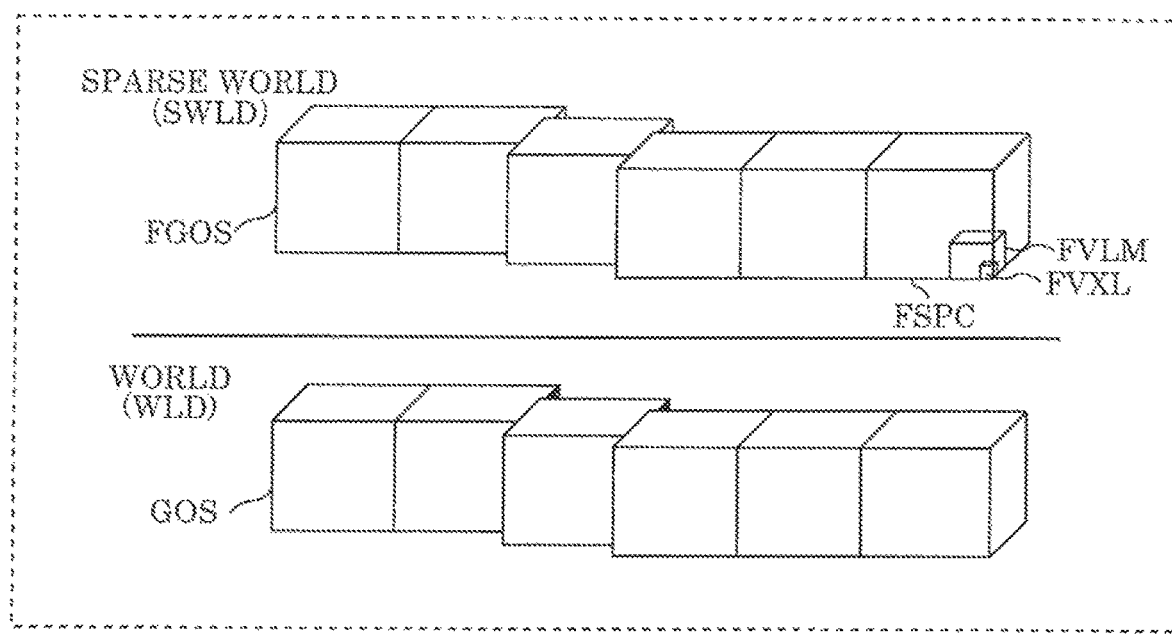
FIG. 11 is a diagram showing an example structure of a SWLD according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs; and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
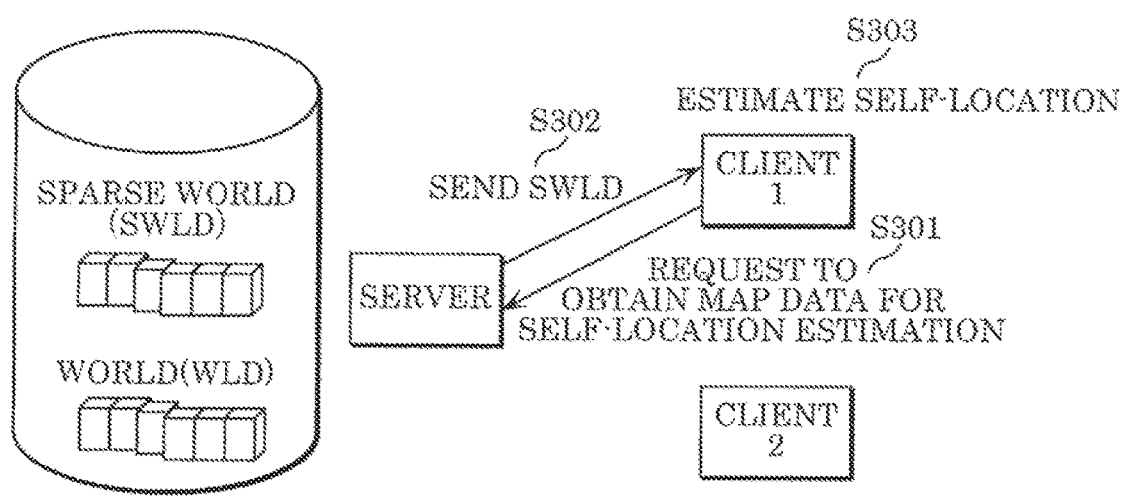
FIG. 12 is a diagram showing example operations performed by a server and a client according to Embodiment 2.
Figure 13:
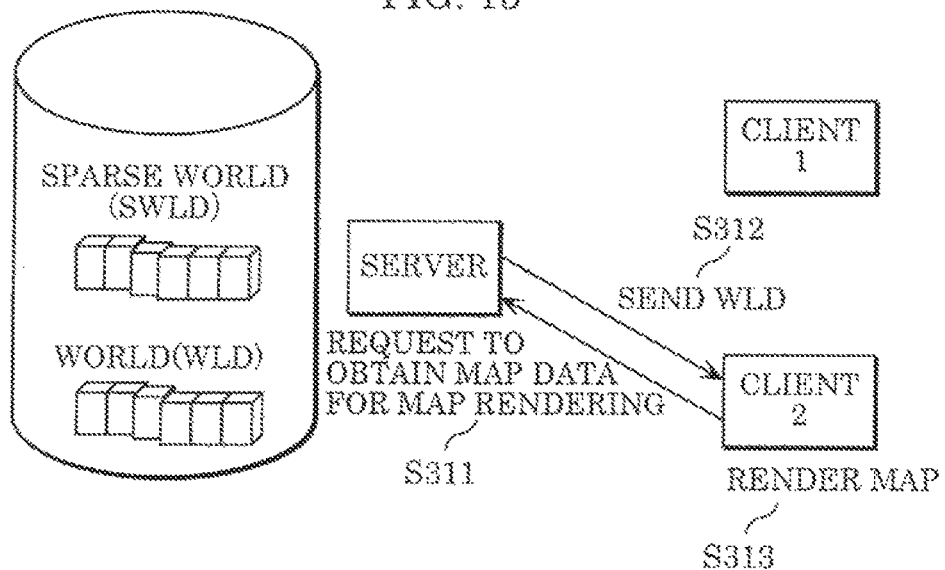
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder, as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, an image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD is necessary, and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
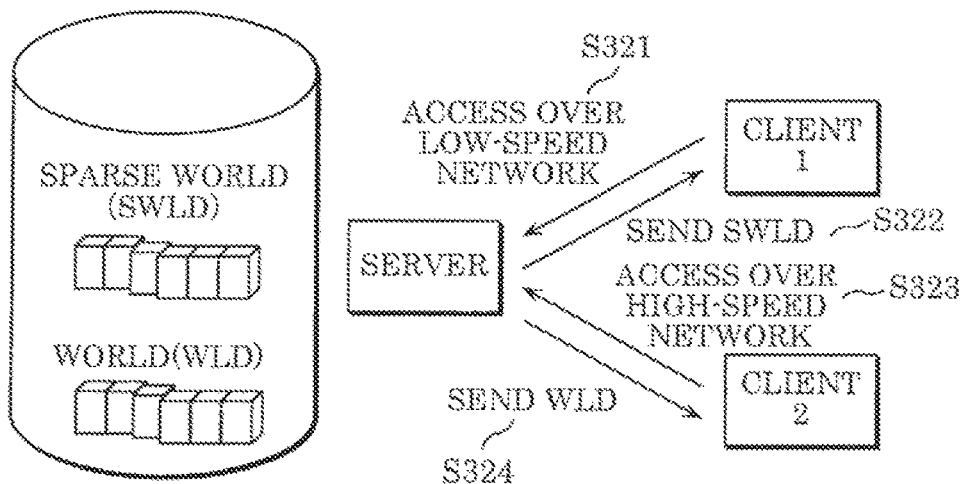
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a long term evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over a LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
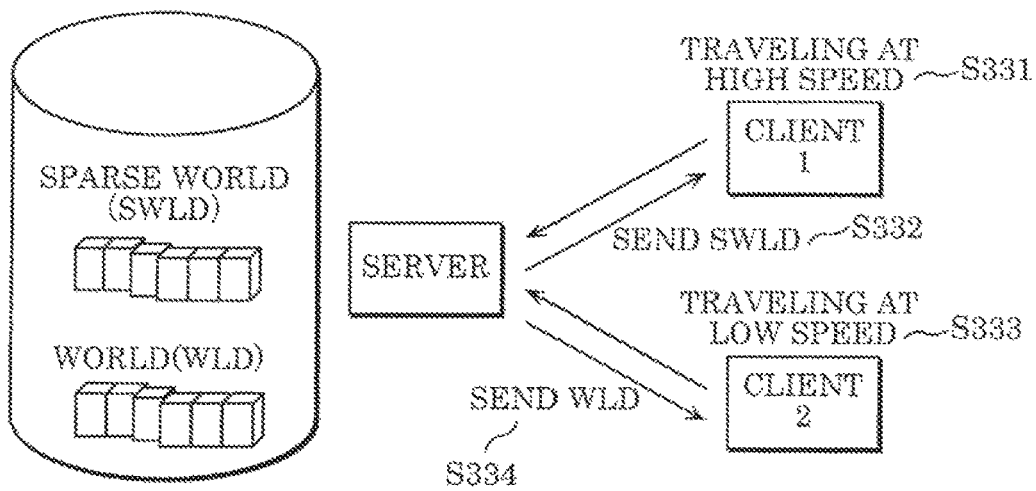
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
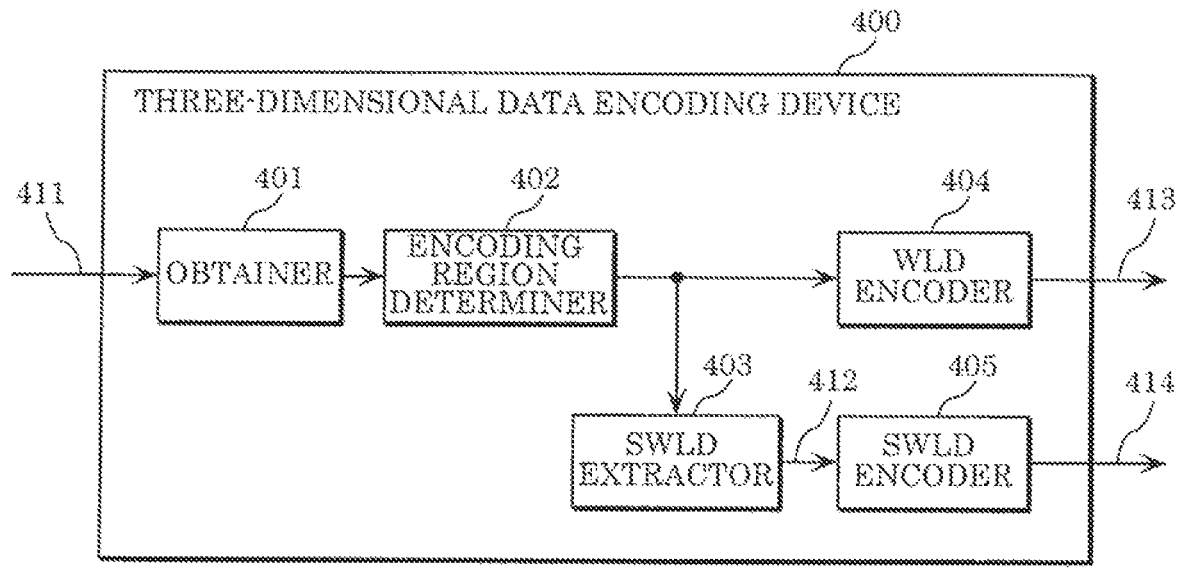
FIG. 16 is a block diagram of a three-dimensional data encoding device according to Embodiment 2.
Figure 17:
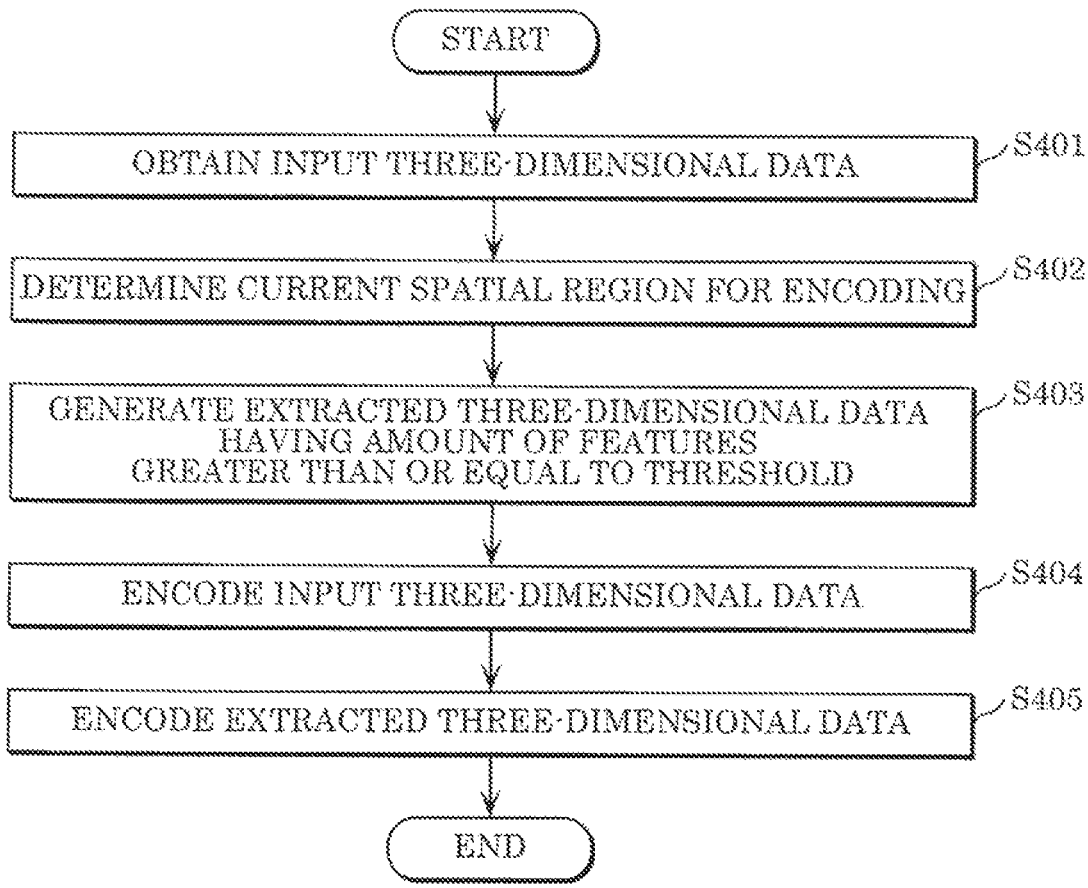
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point group data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then, SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WLD encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a WLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world_type" is defined, for example, as information added to each header of encoded three-dimensional data 413 and encoded three-dimensional data 414. world_type=0 indicates that a stream includes a WLD, and world_type=1 indicates that a stream includes a SWLD. An increased number of values may be further assigned to define a larger number of types, e.g., world_type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WLD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency, and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD, SWLD encoder 405 performs encoding again to re-generate encoded three-dimensional data 414 having a reduced data size.

For example, SWLD extractor 403 re-generates extracted three-dimensional data 412 having a reduced number of keypoints to be extracted, and SWLD encoder 405 encodes such extracted three-dimensional data 412. Alternatively, SWLD encoder 405 may perform more coarse quantization. More coarse quantization is achieved, for example, by rounding the data in the lowermost level in an octree structure described below.

When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently, encoded three-dimensional data 413 of the WLD may be used as it is as encoded three-dimensional data 414 of the SWLD.

Figure 18:
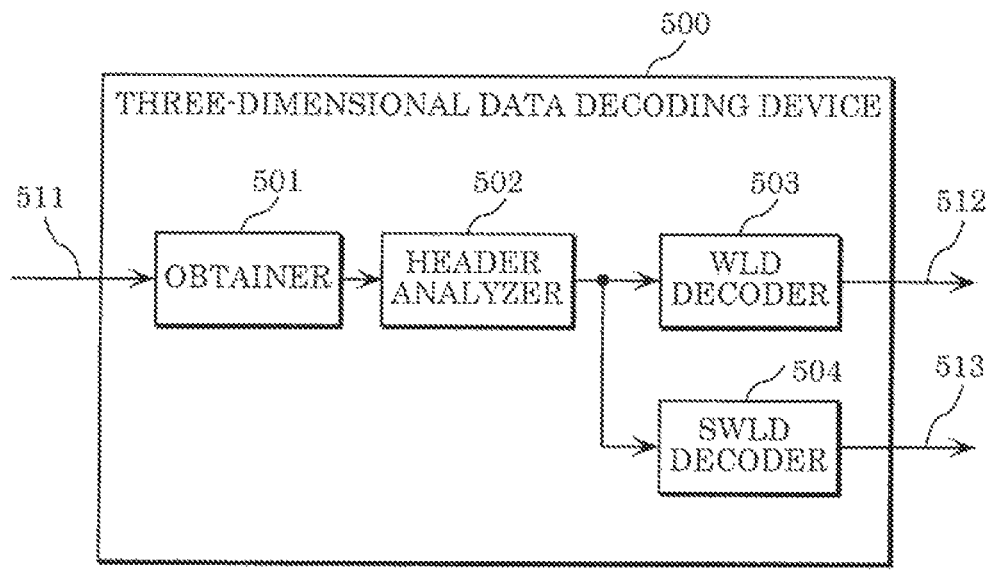
FIG. 18 is a block diagram of a three-dimensional data decoding device according to Embodiment 2.
Figure 19:
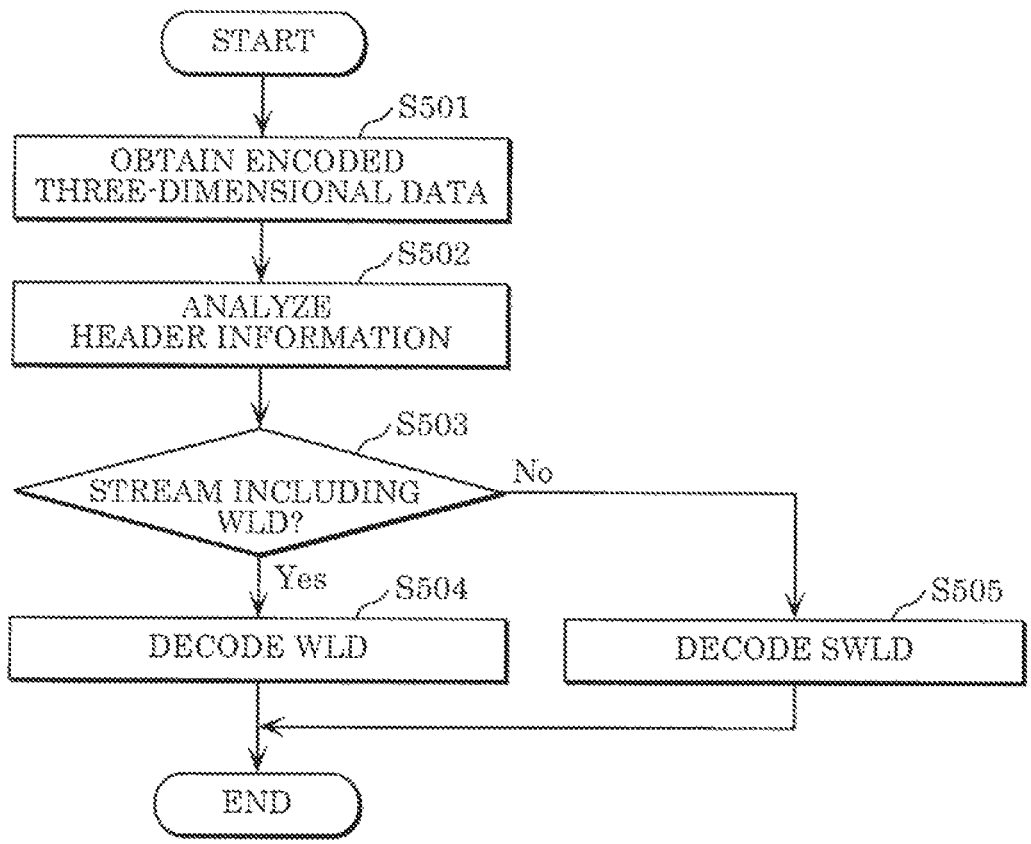
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world_type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504). Meanwhile, when encoded three-dimensional data 511 is a stream including a SWLD (No in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
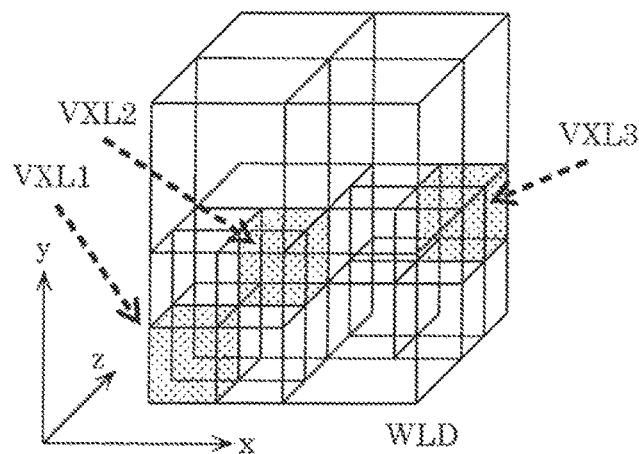
FIG. 20 is a diagram showing an example structure of a WLD according to Embodiment 2.
Figure 21:
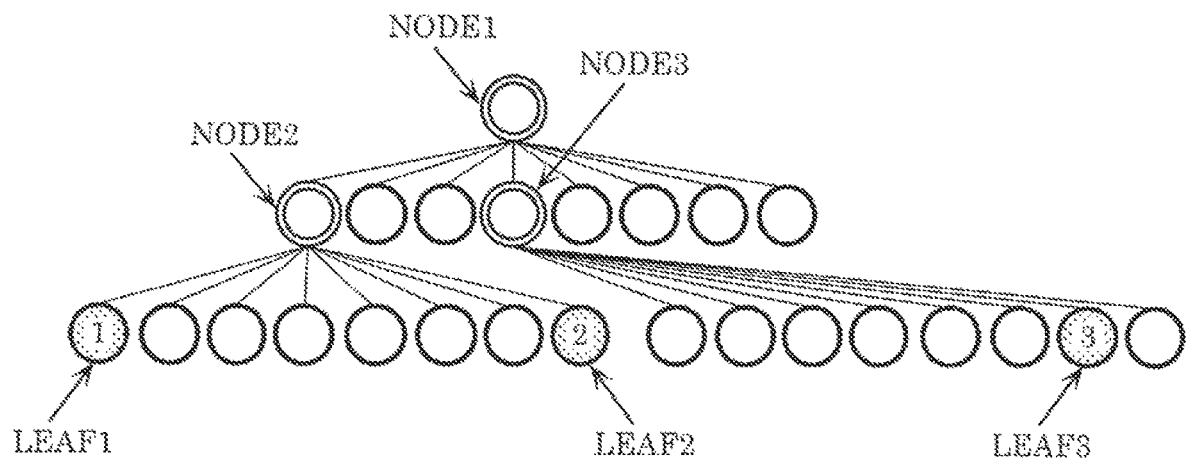
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. illustrates three VXLs 1 to 3 that include point groups (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf corresponds to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
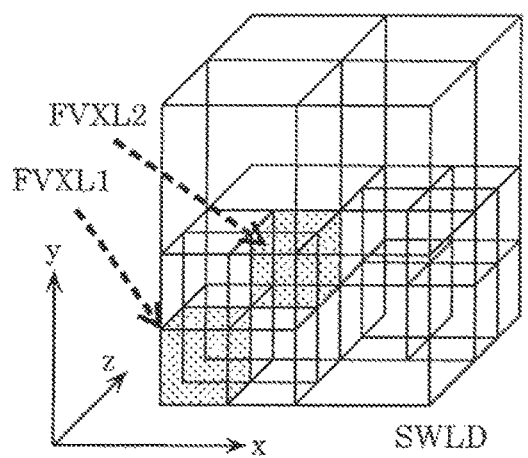
FIG. 22 is a diagram showing an example structure of a SWLD according to Embodiment 2.
Figure 23:
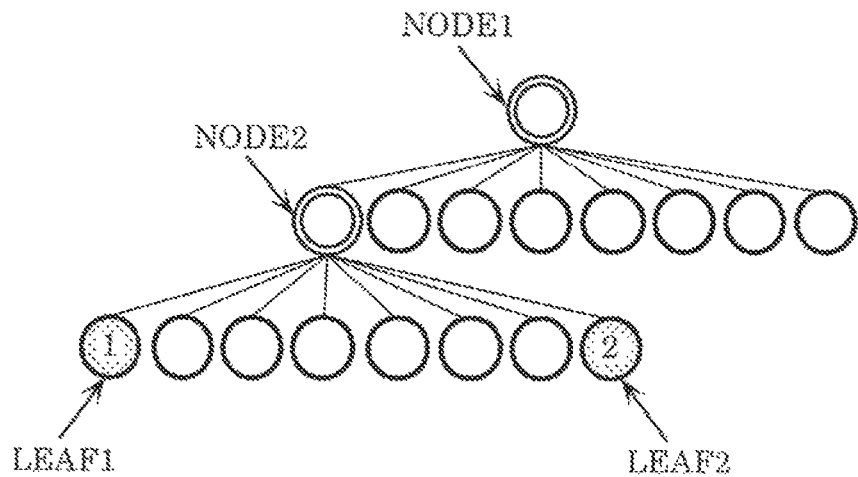
FIG. 23 is a diagram showing an example octree structure of the SWLD according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently, node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region. As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently, SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point groups or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXLs that have not been judged as FVXLs. For example, a SWLD may include an adjacent VXL used to calculate the feature of a FVXL. This enables the client to calculate the feature of a FVXL when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently, three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently.

For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles.

Figure 24:
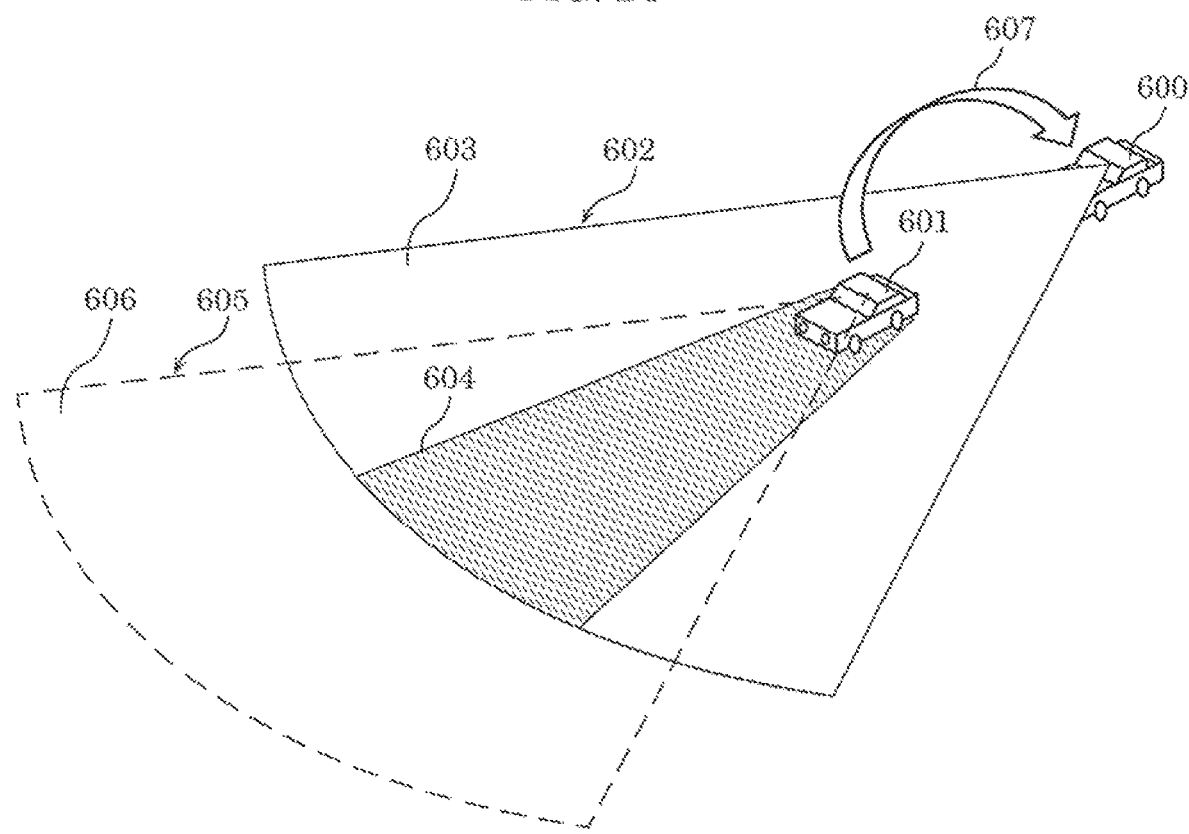
FIG. 24 is a schematic diagram showing three-dimensional data being transmitted/received between vehicles according to Embodiment 3.

FIG. 24 is a schematic diagram showing three-dimensional data 607 being transmitted/received between own vehicle 600 and nearby vehicle 601.

In three-dimensional data that is obtained by a sensor mounted on own vehicle 600 (e.g., a distance sensor such as a rangefinder, as well as a stereo camera and a combination of a plurality of monocular cameras), there appears a region, three-dimensional data of which cannot be created, due to an obstacle such as nearby vehicle 601, despite that such region is included in sensor detection range 602 of own vehicle 600 (such region is hereinafter referred to as occlusion region 604). Also, while the obtainment of three-dimensional data of a larger space enables a higher accuracy of autonomous operations, a range of sensor detection only by own vehicle 600 is limited.

Sensor detection range 602 of own vehicle 600 includes region 603, three-dimensional data of which is obtainable, and occlusion region 604. A range, three-dimensional data of which own vehicle 600 wishes to obtain, includes sensor detection range 602 of own vehicle 600 and other regions. Sensor detection range 605 of nearby vehicle 601 includes occlusion region 604 and region 606 that is not included in sensor detection range 602 of own vehicle 600.

Nearby vehicle 601 transmits information detected by nearby vehicle 601 to own vehicle 600. Own vehicle 600 obtains the information detected by nearby vehicle 601, such as a preceding vehicle, thereby obtaining three-dimensional data 607 of occlusion region 604 and region 606 outside of sensor detection range 602 of own vehicle 600. Own vehicle 600 uses the information obtained by nearby vehicle 601 to complement the three-dimensional data of occlusion region 604 and region 606 outside of the sensor detection range.

The usage of three-dimensional data in autonomous operations of a vehicle or a robot includes self-location estimation, detection of surrounding conditions, or both. For example, for self-location estimation, three-dimensional data is used that is generated by own vehicle 600 on the basis of sensor information of own vehicle 600. For detection of surrounding conditions, three-dimensional data obtained from nearby vehicle 601 is also used in addition to the three-dimensional data generated by own vehicle 600.

Nearby vehicle 601 that transmits three-dimensional data 607 to own vehicle 600 may be determined in accordance with the state of own vehicle 600. For example, the current nearby vehicle 601 is a preceding vehicle when own vehicle 600 is running straight ahead, an oncoming vehicle when own vehicle 600 is turning right, and a following vehicle when own vehicle 600 is rolling backward. Alternatively, the driver of own vehicle 600 may directly specify nearby vehicle 601 that transmits three-dimensional data 607 to own vehicle 600.

Alternatively, own vehicle 600 may search for nearby vehicle 601 having three-dimensional data of a region that is included in a space, three-dimensional data of which own vehicle 600 wishes to obtain, and that own vehicle 600 cannot obtain. The region own vehicle 600 cannot obtain is occlusion region 604, or region 606 outside of sensor detection range 602, etc.

Own vehicle 600 may identify occlusion region 604 on the basis of the sensor information of own vehicle 600. For example, own vehicle 600 identifies, as occlusion region 604, a region which is included in sensor detection range 602 of own vehicle 600, and three-dimensional data of which cannot be created.

The following describes example operations to be performed when a vehicle that transmits three-dimensional data 607 is a preceding vehicle. FIG. is a diagram showing an example of three-dimensional data to be transmitted in such case.

Figure 25:
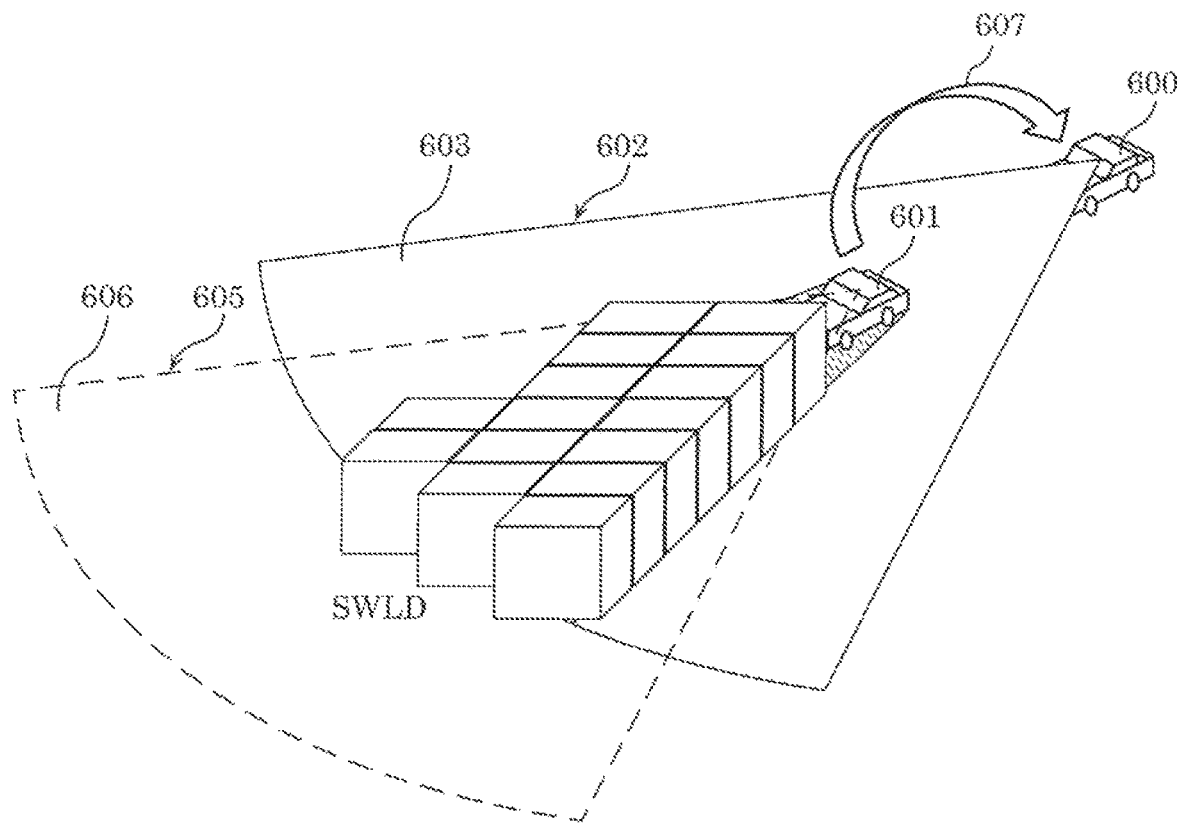
FIG. 25 is a diagram showing an example of three-dimensional data transmitted between vehicles according to Embodiment 3.

As FIG. 25 shows, three-dimensional data 607 transmitted from the preceding vehicle is, for example, a sparse world (SWLD) of a point cloud. Stated differently, the preceding vehicle creates three-dimensional data (point cloud) of a WLD from information detected by a sensor of such preceding vehicle, and extracts data having an amount of features greater than or equal to the threshold from such three-dimensional data of the WLD, thereby creating three-dimensional data (point cloud) of the SWLD. Subsequently, the preceding vehicle transmits the created three-dimensional data of the SWLD to own vehicle 600.

Own vehicle 600 receives the SWLD, and merges the received SWLD with the point cloud created by own vehicle 600.

The SWLD to be transmitted includes information on the absolute coordinates (the position of the SWLD in the coordinates system of a three-dimensional map). The merge is achieved by own vehicle 600 overwriting the point cloud generated by own vehicle 600 on the basis of such absolute coordinates.

The SWLD transmitted from nearby vehicle 601 may be: a SWLD of region 606 that is outside of sensor detection range 602 of own vehicle 600 and within sensor detection range 605 of nearby vehicle 601; or a SWLD of occlusion region 604 of own vehicle 600; or the SWLDs of the both. Of these SWLDs, a SWLD to be transmitted may also be a SWLD of a region used by nearby vehicle 601 to detect the surrounding conditions.

Nearby vehicle 601 may change the density of a point cloud to transmit, in accordance with the communication available time, during which own vehicle 600 and nearby vehicle 601 can communicate, and which is based on the speed difference between these vehicles. For example, when the speed difference is large and the communication available time is short, nearby vehicle 601 may extract three-dimensional points having a large amount of features from the SWLD to decrease the density (data amount) of the point cloud.

The detection of the surrounding conditions refers to judging the presence/absence of persons, vehicles, equipment for roadworks, etc., identifying their types, and detecting their positions, travelling directions, traveling speeds, etc.

Own vehicle 600 may obtain braking information of nearby vehicle 601 instead of or in addition to three-dimensional data 607 generated by nearby vehicle 601. Here, the braking information of nearby vehicle 601 is, for example, information indicating that the accelerator or the brake of nearby vehicle 601 has been pressed, or the degree of such pressing.

In the point clouds generated by the vehicles, the three-dimensional spaces are segmented on a random access unit, in consideration of low-latency communication between the vehicles. Meanwhile, in a three-dimensional map, etc., which is map data downloaded from the server, a three-dimensional space is segmented in a larger random access unit than in the case of inter-vehicle communication.

Data on a region that is likely to be an occlusion region, such as a region in front of the preceding vehicle and a region behind the following vehicle, is segmented on a finer random access unit as low-latency data.

Data on a region in front of a vehicle has an increased importance when on an expressway, and thus each vehicle creates a SWLD of a range with a narrowed viewing angle on a finer random access unit when running on an expressway.

When the SWLD created by the preceding vehicle for transmission includes a region, the point cloud of which own vehicle 600 can obtain, the preceding vehicle may remove the point cloud of such region to reduce the amount of data to transmit.

Next, the structure and operations of three-dimensional data creation device 620 will be described, which is the three-dimensional data reception device according to the present embodiment.

Figure 26:
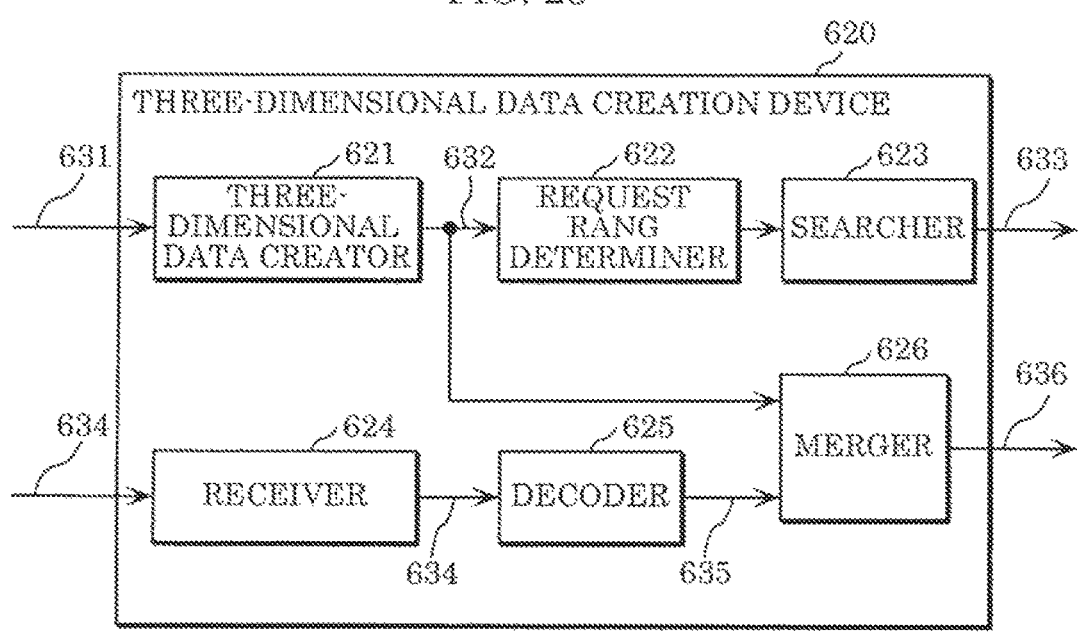
FIG. 26 is a block diagram of a three-dimensional data creation device according to Embodiment 3.

FIG. 26 is a block diagram of three-dimensional data creation device 620 according to the present embodiment. Such three-dimensional data creation device 620, which is included, for example, in the above-described own vehicle 600, mergers first three-dimensional data 632 created by three-dimensional data creation device 620 with the received second three-dimensional data 635, thereby creating third three-dimensional data 636 having a higher density.

Figure 27:
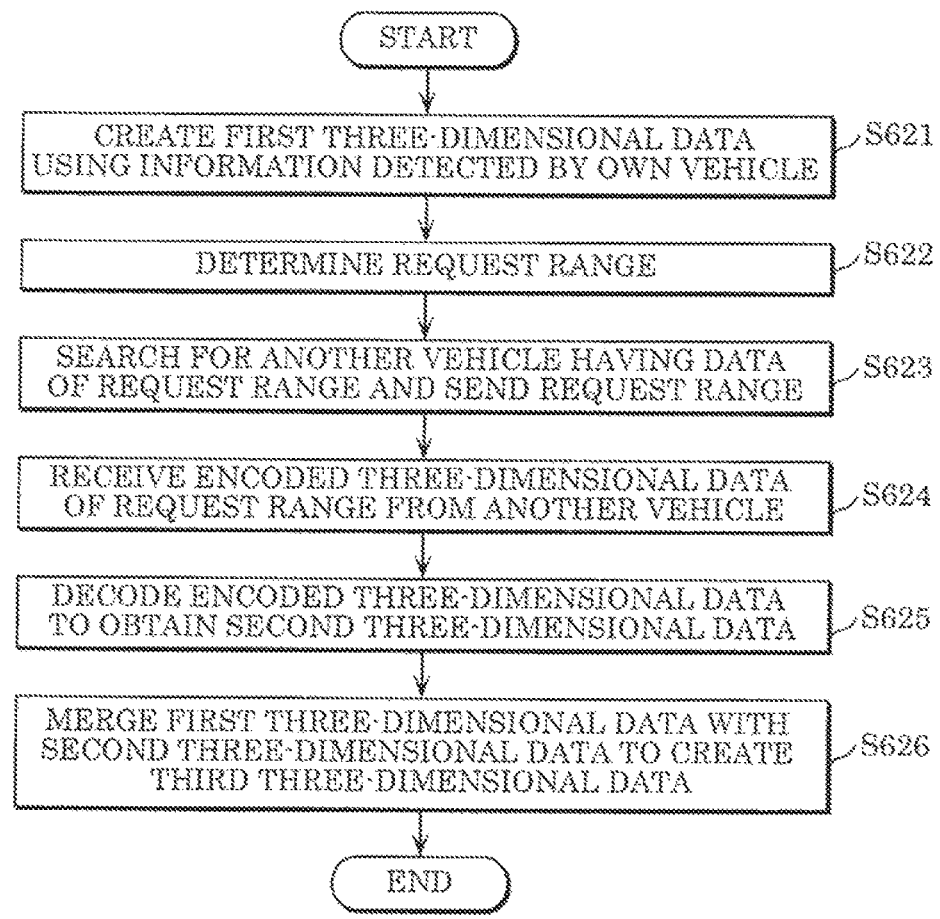
FIG. 27 is a flowchart of the processes of creating three-dimensional data according to Embodiment 3.

Such three-dimensional data creation device 620 includes three-dimensional data creator 621, request range determiner 622, searcher 623, receiver 624, decoder 625, and merger 626. FIG. 27 is a flowchart of operations performed by three-dimensional data creation device 620.

First, three-dimensional data creator 621 creates first three-dimensional data 632 by use of sensor information 631 detected by the sensor included in own vehicle 600 (S621). Next, request range determiner 622 determines a request range, which is the range of a three-dimensional space, the data on which is insufficient in the created first three-dimensional data 632 (S622).

Next, searcher 623 searches for nearby vehicle 601 having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to all vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635 (S625). Next, merger 626 merges first three-dimensional data 632 with second three-dimensional data 635, thereby creating three-dimensional data 636 having a higher density (S626).

Figure 28:
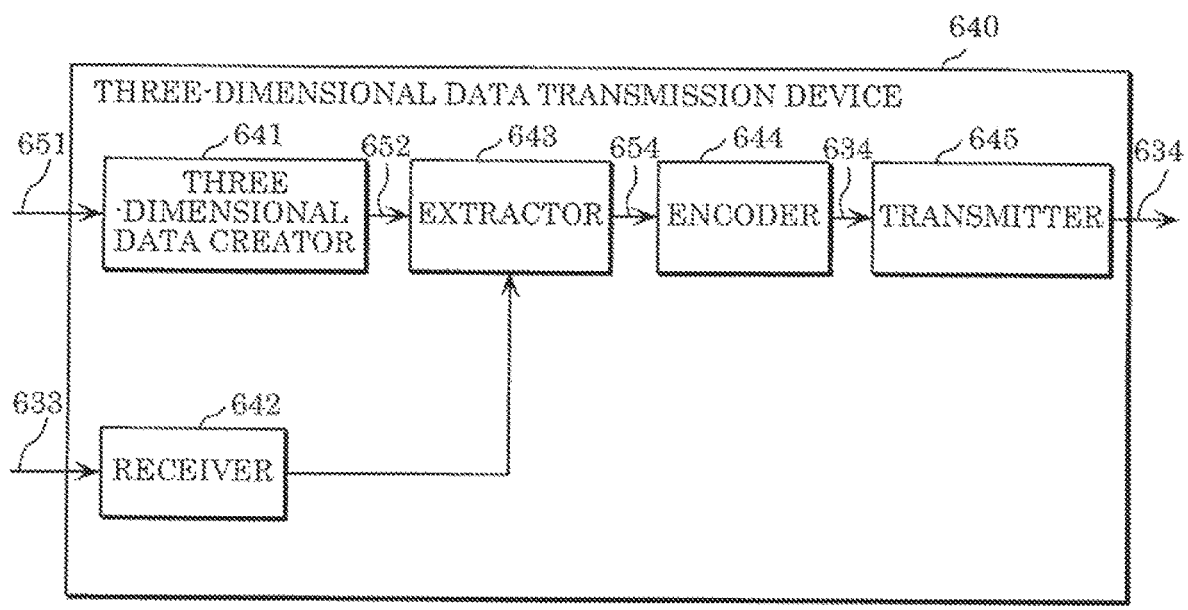
FIG. 28 is a block diagram of a three-dimensional data transmission device according to Embodiment 3.

Next, the structure and operations of three-dimensional data transmission device 640 according to the present embodiment will be described. FIG. 28 is a block diagram of three-dimensional data transmission device 640.

Three-dimensional data transmission device 640 is included, for example, in the above-described nearby vehicle 601. Three-dimensional data transmission device 640 processes fifth three-dimensional data 652 created by nearby vehicle 601 into sixth three-dimensional data 654 requested by own vehicle 600, encodes sixth three-dimensional data 654 to generate encoded three-dimensional data 634, and sends encoded three-dimensional data 634 to own vehicle 600.

Figure 29:
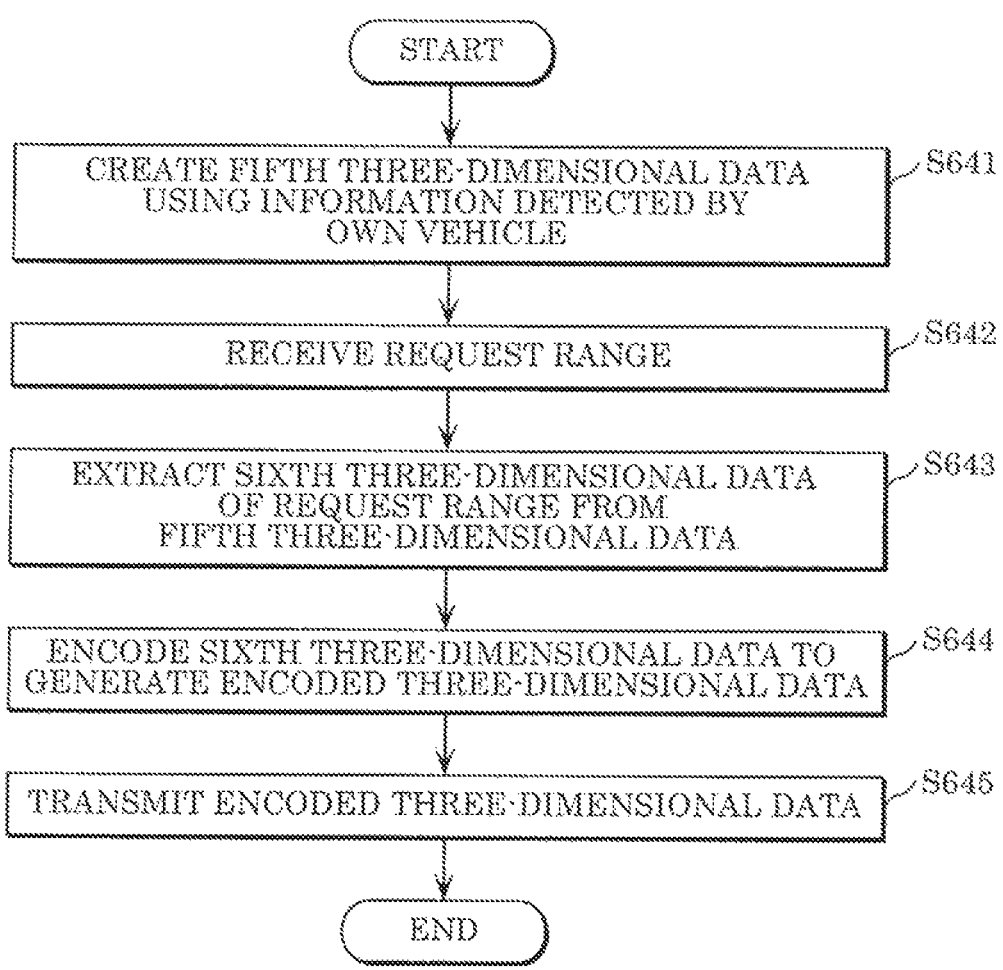
FIG. 29 is a flowchart of the processes of transmitting three-dimensional data according to Embodiment 3.

Three-dimensional data transmission device 640 includes three-dimensional data creator 641, receiver 642, extractor 643, encoder 644, and transmitter 645. FIG. 29 is a flowchart of operations performed by three-dimensional data transmission device 640.

First, three-dimensional data creator 641 creates fifth three-dimensional data 652 by use of sensor information 651 detected by the sensor included in nearby vehicle 601 (S641). Next, receiver 642 receives request range information 633 from own vehicle 600 (S642).

Next, extractor 643 extracts from fifth three-dimensional data 652 the three-dimensional data of the request range indicated by request range information 633, thereby processing fifth three-dimensional data 652 into sixth three-dimensional data 654 (S643). Next, encoder 644 encodes sixth three-dimensional data 654 to generate encoded three-dimensional data 643, which is an encoded stream (S644). Then, transmitter 645 sends encoded three-dimensional data 634 to own vehicle 600 (S645).

Note that although an example case is described here in which own vehicle 600 includes three-dimensional data creation device 620 and nearby vehicle 601 includes three-dimensional data transmission device 640, each of the vehicles may include the functionality of both three-dimensional data creation device 620 and three-dimensional data transmission device 640.

Figure 30:
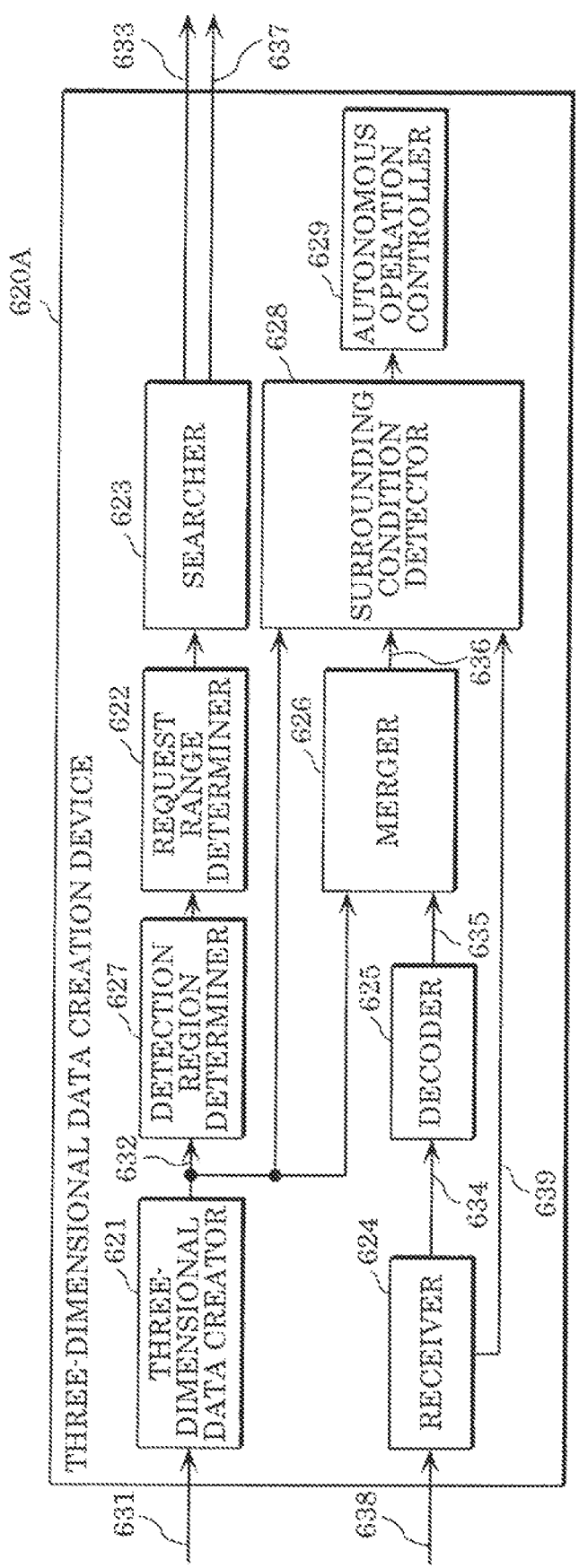
FIG. 30 is a block diagram of a three-dimensional data creation device according to Embodiment 3.

The following describes the structure and operations of three-dimensional data creation device 620 when three-dimensional data creation device 620 is a surrounding condition detection device that enables the detection of the surrounding conditions of own vehicle 600. FIG. 30 is a block diagram of the structure of three-dimensional data creation device 620A in such case. Three-dimensional data creation device 620A shown in FIG. 30 further includes detection region determiner 627, surrounding condition detector 628, and autonomous operation controller 629, in addition to the components of three-dimensional data creation device 620 shown in FIG. 26. Three-dimensional data creation device 620A is included in own vehicle 600.

Figure 31:
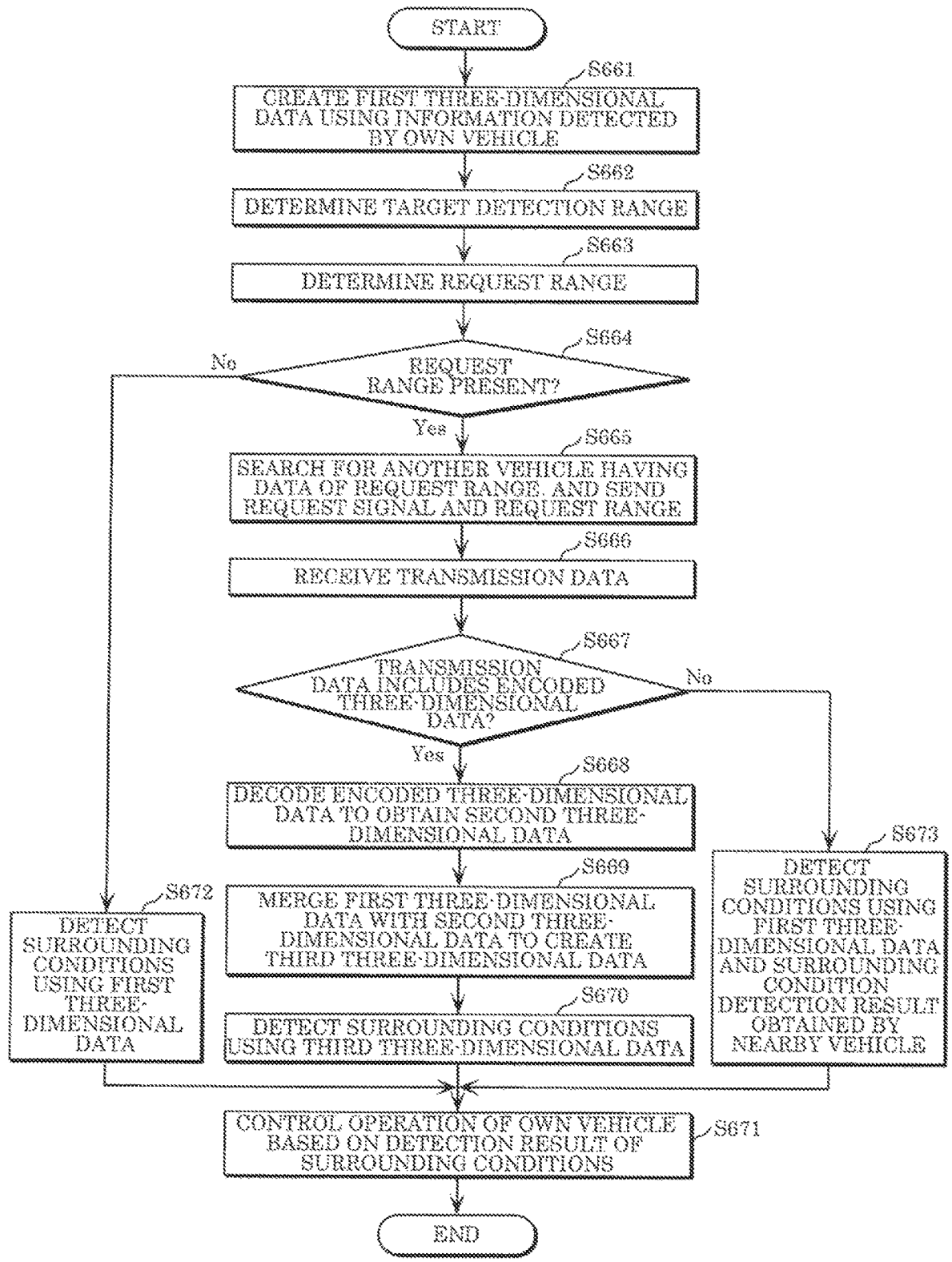
FIG. 31 is a flowchart of the processes of creating three-dimensional data according to Embodiment 3.

FIG. 31 is a flowchart of processes, performed by three-dimensional data creation device 620A, of detecting the surrounding conditions of own vehicle 600.

First, three-dimensional data creator 621 creates first three-dimensional data 632, which is a point cloud, by use of sensor information 631 on the detection range of own vehicle 600 detected by the sensor of own vehicle 600 (S661). Note that three-dimensional data creation device 620A may further estimate the self-location by use of sensor information 631.

Next, detection region determiner 627 determines a target detection range, which is a spatial region, the surrounding conditions of which are wished to be detected (S662). For example, detection region determiner 627 calculates a region that is necessary for the detection of the surrounding conditions, which is an operation required for safe autonomous operations (self-driving), in accordance with the conditions of autonomous operations, such as the direction and speed of traveling of own vehicle 600, and determines such region as the target detection range.

Next, request range determiner 622 determines, as a request range, occlusion region 604 and a spatial region that is outside of the detection range of the sensor of own vehicle 600 but that is necessary for the detection of the surrounding conditions (S663).

When the request range determined in step S663 is present (Yes in S664), searcher 623 searches for a nearby vehicle having information on the request range. For example, searcher 623 may inquire about whether a nearby vehicle has information on the request range, or may judge whether a nearby vehicle has information on the request range, on the basis of the positions of the request range and such nearby vehicle. Next, searcher 623 sends, to nearby vehicle 601 having been searched out, request signal 637 that requests for the transmission of three-dimensional data. Searcher 623 then receives an acceptance signal from nearby vehicle 601 indicating that the request of request signal 637 has been accepted, after which searcher 623 sends request range information 633 indicating the request range to nearby vehicle 601 (S665).

Next, receiver 624 detects a notice that transmission data 638 has been transmitted, which is the information on the request range, and receives such transmission data 638 (S666).

Note that three-dimensional data creation device 620A may indiscriminately send requests to all vehicles in a specified range and receive transmission data 638 from a vehicle that has sent a response indicating that such vehicle has the information on the request range, without searching for a vehicle to send a request to. Searcher 623 may send a request not only to vehicles but also to an object such as a signal and a sign, and receive transmission data 638 from such object.

Transmission data 638 includes at least one of the following generated by nearby vehicle 601: encoded three-dimensional data 634, which is encoded three-dimensional data of the request range; and surrounding condition detection result 639 of the request range. Surrounding condition detection result 639 indicates the positions, traveling directions and traveling speeds, etc., of persons and vehicles detected by nearby vehicle 601. Transmission data 638 may also include information indicating the position, motion, etc., of nearby vehicle 601. For example, transmission data 638 may include braking information of nearby vehicle 601.

When the received transmission data 638 includes encoded three-dimensional data 634 (Yes in 667), decoder 625 decodes encoded three-dimensional data 634 to obtain second three-dimensional data 635 of the SWLD (S668). Stated differently, second three-dimensional data 635 is three-dimensional data (SWLD) that has been generated by extracting data having an amount of features greater than or equal to the threshold from fourth three-dimensional data (WLD).

Next, merger 626 merges first three-dimensional data 632 with second three-dimensional data 635, thereby generating third three-dimensional data 636 (S669).

Next, surrounding condition detector 628 detects the surrounding conditions of own vehicle 600 by use of third three-dimensional data 636, which is a point cloud of a spatial region necessary to detect the surrounding conditions (S670). Note that when the received transmission data 638 includes surrounding condition detection result 639, surrounding condition detector 628 detects the surrounding conditions of own vehicle 600 by use of surrounding condition detection result 639, in addition to third three-dimensional data 636. When the received transmission data 638 includes the braking information of nearby vehicle 601, surrounding condition detector 628 detects the surrounding conditions of own vehicle 600 by use of such braking information, in addition to third three-dimensional data 636.

Next, autonomous operation controller 629 controls the autonomous operations (self-driving) of own vehicle 600 on the basis of the surrounding condition detection result obtained by surrounding condition detector 628 (S671). Note that the surrounding condition detection result may be presented to the driver via a user interface (UI), etc.

Meanwhile, when the request range is not present in step S663 (No in S664), or stated differently, when information on all spatial regions necessary to detect the surrounding conditions has been created on the basis of sensor information 631, surrounding condition detector 628 detects the surrounding conditions of own vehicle 600 by use of first three-dimensional data 632, which is the point cloud of the spatial region necessary to detect the surrounding conditions (S672). Then, autonomous operation controller 629 controls the autonomous operations (self-driving) of own vehicle 600 on the basis of the surrounding condition detection result obtained by surrounding condition detector 628 (S671).

Meanwhile, when the received transmission data 638 does not include encoded three-dimensional data 634 (No in S667), or stated differently, when transmission data 638 includes only surrounding condition detection result 639 or the braking information of nearby vehicle 601, surrounding condition detector 628 detects the surrounding conditions of own vehicle 600 by use of first three-dimensional data 632, and surrounding condition detection result 639 or the braking information (S673). Then, autonomous operation controller 629 controls the autonomous operations (self-driving) of own vehicle 600 on the basis of the surrounding condition detection result obtained by surrounding condition detector 628 (S671).

Figure 32:
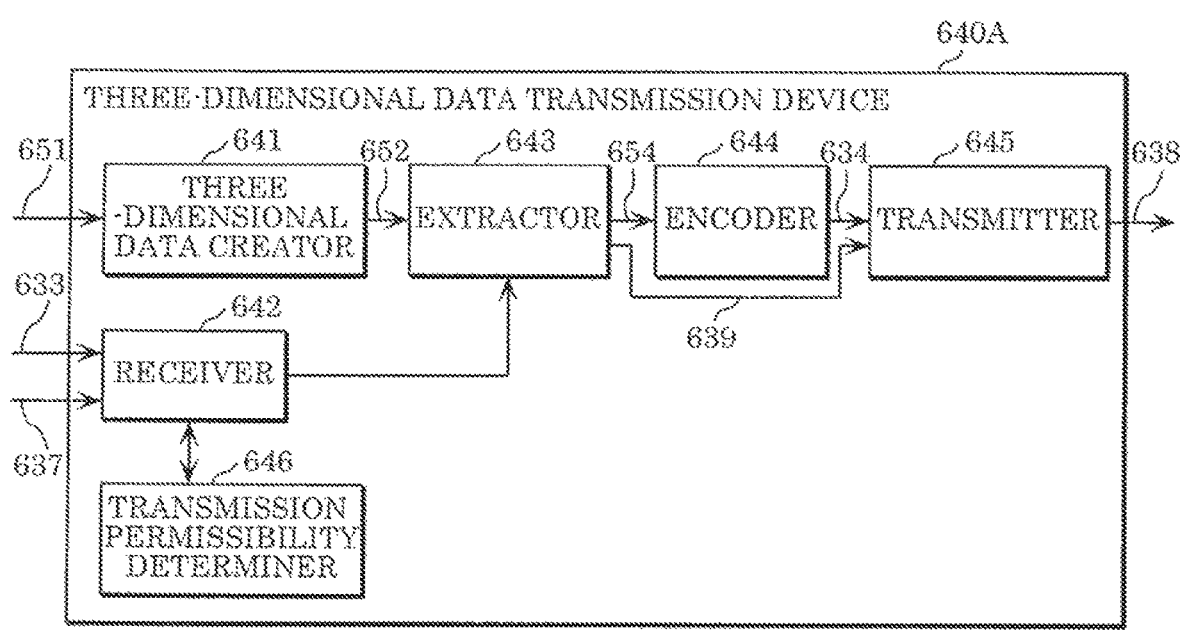
FIG. 32 is a block diagram of a three-dimensional data transmission device according to Embodiment 3.

Next, three-dimensional data transmission device 640A will be described that transmits transmission data 638 to the above-described three-dimensional data creation device 620A. FIG. 32 is a block diagram of such three-dimensional data transmission device 640A.

Three-dimensional data transmission device 640A shown in FIG. 32 further includes transmission permissibility judgment unit 646, in addition to the components of three-dimensional data transmission device 640 shown in FIG. 28. Three-dimensional data transmission device 640A is included in nearby vehicle 601.

Figure 33:
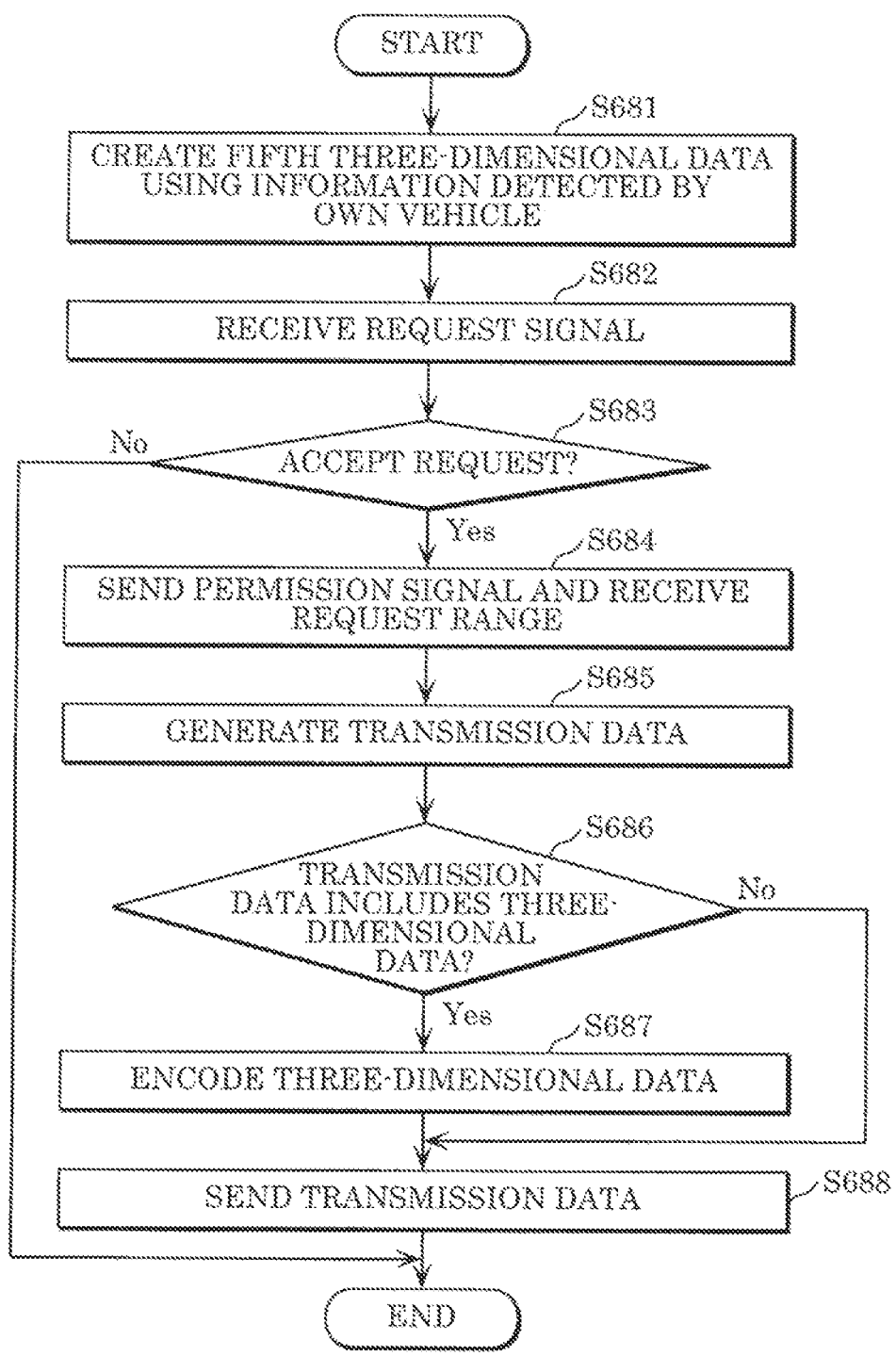
FIG. 33 is a flowchart of the processes of transmitting three-dimensional data according to Embodiment 3.

FIG. 33 is a flowchart of example operations performed by three-dimensional data transmission device 640A. First, three-dimensional data creator 641 creates fifth three-dimensional data 652 by use of sensor information 651 detected by the sensor included in nearby vehicle 601 (S681).

Next, receiver 642 receives from own vehicle 600 request signal 637 that requests for the transmission of three-dimensional data (S682). Next, transmission permissibility judgment unit 646 determines whether to accept the request indicated by request signal 637 (S683). For example, transmission permissibility judgment unit 646 determines whether to accept the request on the basis of the details previously set by the user. Note that receiver 642 may receive a request from the other end such as a request range beforehand, and transmission permissibility judgment unit 646 may determine whether to accept the request in accordance with the details of such request. For example, transmission permissibility judgment unit 646 may determine to accept the request when the three-dimensional data transmission device has the three-dimensional data of the request range, and not to accept the request when the three-dimensional data transmission device does not have the three-dimensional data of the request range.

When determining to accept the request (Yes in S683), three-dimensional data transmission device 640A sends a permission signal to own vehicle 600, and receiver 642 receives request range information 633 indicating the request range (S684). Next, extractor 643 extracts the point cloud of the request range from fifth three-dimensional data 652, which is a point cloud, and creates transmission data 638 that includes sixth three-dimensional data 654, which is the SWLD of the extracted point cloud (S685).

Stated differently, three-dimensional data transmission device 640A creates seventh three-dimensional data (WLD) from sensor information 651, and extracts data having an amount of features greater than or equal to the threshold from seventh three-dimensional data (WLD), thereby creating fifth three-dimensional data 652 (SWLD). Note that three-dimensional data creator 641 may create three-dimensional data of a SWLD beforehand, from which extractor 643 may extract three-dimensional data of a SWLD of the request range. Alternatively, extractor 643 may generate three-dimensional data of the SWLD of the request range from the three-dimensional data of the WLD of the request range.

Transmission data 638 may include surrounding condition detection result 639 of the request range obtained by nearby vehicle 601 and the braking information of nearby vehicle 601. Transmission data 638 may include only at least one of surrounding condition detection result 639 of the request range obtained by nearby vehicle 601 and the braking information of nearby vehicle 601, without including sixth three-dimensional data 654.

When transmission data 638 includes sixth three-dimensional data 654 (Yes in S686), encoder 644 encodes sixth three-dimensional data 654 to generate encoded three-dimensional data 634 (S687).

Then, transmitter 645 sends to own vehicle 600 transmission data 638 that includes encoded three-dimensional data 634 (S688).

Meanwhile, when transmission data 638 does not include sixth three-dimensional data 654 (No in S686), transmitter 645 sends to own vehicle 600 transmission data 638 that includes at least one of surrounding condition detection result 639 of the request range obtained by nearby vehicle 601 and the braking information of nearby vehicle 601 (S688).

The following describes variations of the present embodiment.

For example, information transmitted from nearby vehicle 601 may not be three-dimensional data or a surrounding condition detection result generated by the nearby vehicle, and thus may be accurate keypoint information on nearby vehicle 601 itself. Own vehicle 600 corrects keypoint information on the preceding vehicle in the point cloud obtained by own vehicle 600 by use of such keypoint information of nearby vehicle 601. This enables own vehicle 600 to increase the matching accuracy at the time of self-location estimation.

The keypoint information of the preceding vehicle is, for example, three-dimensional point information that includes color information and coordinates information. This allows for the use of the keypoint information of the preceding vehicle independently of the type of the sensor of own vehicle 600, i.e., regardless of whether the sensor is a laser sensor or a stereo camera.

Own vehicle 600 may use the point cloud of a SWLD not only at the time of transmission, but also at the time of calculating the accuracy of self-location estimation. For example, when the sensor of own vehicle 600 is an imaging device such as a stereo camera, own vehicle 600 detects two-dimensional points on an image captured by the camera of own vehicle 600, and uses such two-dimensional points to estimate the self-location. Own vehicle 600 also creates a point cloud of a nearby object at the same time of estimating the self-location. Own vehicle 600 re-projects the three-dimensional points of the SWLD included in the point cloud onto the two-dimensional image, and evaluates the accuracy of self-location estimation on the basis of an error between the detected points and the re-projected points on the two-dimensional image.

When the sensor of own vehicle 600 is a laser sensor such as a LIDAR, own vehicle 600 evaluates the accuracy of self-location estimation on the basis of an error calculated by Interactive Closest Point algorithm by use of the SWLD of the created point cloud of and the SWLD of the three-dimensional map.

When a communication state via a base station or a server is poor in, for example, a 5G environment, own vehicle 600 may obtain a three-dimensional map from nearby vehicle 601.

Also, own vehicle 600 may obtain information on a remote region that cannot be obtained from a nearby vehicle, over inter-vehicle communication. For example, own vehicle 600 may obtain information on a traffic accident, etc. that has just occurred at a few hundred meters or a few kilometers away from own vehicle 600 from an oncoming vehicle over a passing communication, or by a relay system in which information is sequentially passed to nearby vehicles. Here, the data format of the data to be transmitted is transmitted as meta-information in an upper layer of a dynamic three-dimensional map.

The result of detecting the surrounding conditions and the information detected by own vehicle 600 may be presented to the user via a UI. The presentation of such information is achieved, for example, by superimposing the information onto the screen of the car navigation system or the front window.

In the case of a vehicle not supporting self-driving but having the functionality of cruise control, the vehicle may identify a nearby vehicle traveling in the self-driving mode, and track such nearby vehicle.

Own vehicle 600 may switch the operation mode from the self-driving mode to the tracking mode to track a nearby vehicle, when failing to estimate the self-location for the reason such as failing to obtain a three-dimensional map or having too large a number of occlusion regions.

Meanwhile, a vehicle to be tracked may include a UI which warns the user of that the vehicle is being tracked and by which the user can specify whether to permit tracking. In this case, a system may be provided in which, for example, an advertisement is displayed to the vehicle that is tracking and an incentive is given to the vehicle that is being tracked.

The information to be transmitted is basically a SWLD being three-dimensional data, but may also be information that is in accordance with request settings set in own vehicle 600 or public settings set in a preceding vehicle. For example, the information to be transmitted may be a WLD being a dense point cloud, the detection result of the surrounding conditions obtained by the preceding vehicle, or the braking information of the preceding vehicle.

Own vehicle 600 may also receive a WLD, visualize the three-dimensional data of the WLD, and present such visualized three-dimensional data to the driver by use of a GUI. In so doing, own vehicle 600 may present the three-dimensional data in which information is color-coded, for example, so that the user can distinguish between the point cloud created by own vehicle 600 and the received point cloud.

When presenting the information detected by own vehicle 600 and the detection result of nearby vehicle 601 to the driver via the GUI, own vehicle 600 may present the information in which information is color-coded, for example, so that the user can distinguish between the information detected by own vehicle 600 and the received detection result.

As described above, in three-dimensional data creation device 620 according to the present embodiment, three-dimensional data creator 621 creates first three-dimensional data 632 from sensor information 631 detected by a sensor. Receiver 624 receives encoded three-dimensional data 634 that is obtained by encoding second three-dimensional data 635. Decoder 625 decodes received encoded three-dimensional data 634 to obtain second three-dimensional data 635. Merger 626 merges first three-dimensional data 632 with second three-dimensional data 635 to create third three-dimensional data 636.

Such three-dimensional data creation device 620 is capable of creating detailed third three-dimensional data 636 by use of created first three-dimensional data 632 and received second three-dimensional data 635.

Also, merger 626 merges first three-dimensional data 632 with second three-dimensional data 635 to create third three-dimensional data 636 that is denser than first three-dimensional data 632 and second three-dimensional data 635.

Second three-dimensional data 635 (e.g., SWLD) is three-dimensional data that is generated by extracting, from fourth three-dimensional data (e.g., WLD), data having an amount of a feature greater than or equal to the threshold.

Such three-dimensional data creation device 620 reduces the amount of three-dimensional data to be transmitted.

Three-dimensional data creation device 620 further includes searcher 623 that searches for a transmission device that transmits encoded three-dimensional data 634. Receiver 624 receives encoded three-dimensional data 634 from the transmission device that has been searched out.

Such three-dimensional data creation device 620 is, for example, capable of searching for a transmission device having necessary three-dimensional data.

Such three-dimensional data creation device further includes request range determiner 622 that determines a request range that is a range of a three-dimensional space, the three-dimensional of which is requested. Searcher 623 transmits request range information 633 indicating the request range to the transmission device. Second three-dimensional data 635 includes the three-dimensional data of the request range.

Such three-dimensional data creation device 620 is capable of receiving necessary three-dimensional data, while reducing the amount of three-dimensional data to be transmitted.

Also, request range determiner 622 determines, as the request range, a spatial range that includes occlusion region 604 undetectable by the sensor.

Also, in three-dimensional data transmission device 640 according to the present embodiment, three-dimensional data creator 641 creates fifth three-dimensional data 652 from sensor information 651 detected by the sensor. Extractor 643 extracts part of fifth three-dimensional data 652 to create sixth three-dimensional data 654. Encoder 644 encodes sixth three-dimensional data 654 to generate encoded three-dimensional data 634. Transmitter 645 transmits encoded three-dimensional data 634.

Such three-dimensional data transmission device 640 is capable of transmitting self-created three-dimensional data to another device, while reducing the amount of three-dimensional data to be transmitted.

Also, three-dimensional data creator 641 creates seventh three-dimensional data (e.g., WLD) from sensor information 651 detected by the sensor, and extracts, from the seventh three-dimensional data, data having an amount of a feature greater than or equal to the threshold, to create fifth three-dimensional data 652 (e.g., SWLD).

Such three-dimensional data creation device 640 reduces the amount of three-dimensional data to be transmitted.

Three-dimensional data transmission device 640 further includes receiver 642 that receives, from the reception device, request range information 633 indicating the request range that is the range of a three-dimensional space, the three-dimensional data of which is requested. Extractor 643 extracts the three-dimensional data of the request range from fifth three-dimensional data 652 to create sixth three-dimensional data 654. Transmitter 645 transmits encoded three-dimensional data 634 to the reception device.

Such three-dimensional data transmission device 640 reduces the amount of three-dimensional data to be transmitted.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point group data that is different from keypoints. The transmission/reception of point cloud data is basically carried out in one or more random access units.

A method described below is used as a method of matching a three-dimensional map with self-detected three-dimensional data. For example, the device compares the shapes of the point groups in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.
2. A three-dimensional map is not present, or a three-dimensional map having been obtained is corrupt.
3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 34:
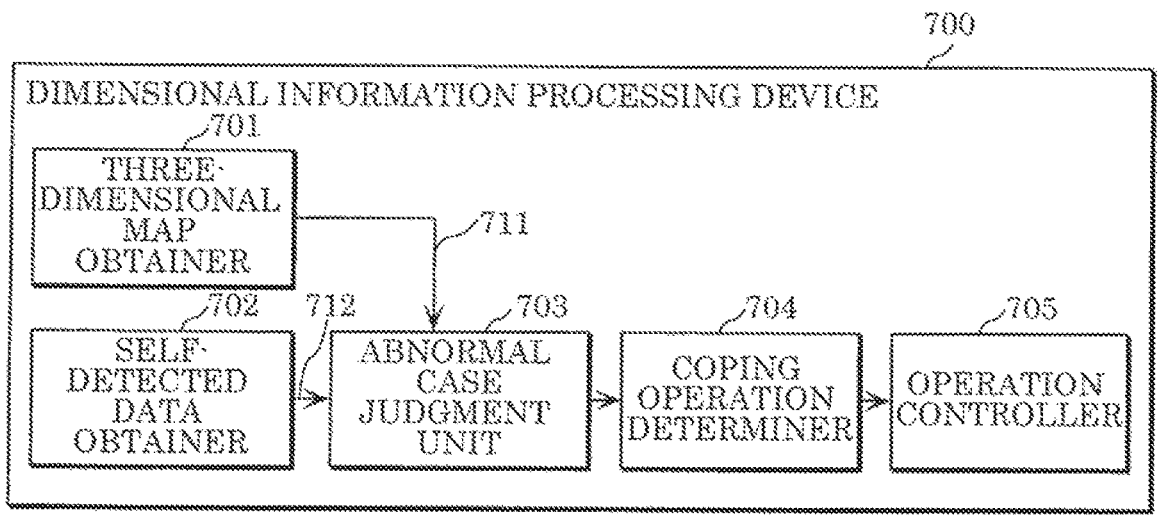
FIG. 34 is a block diagram of a three-dimensional information processing device according to Embodiment 4.
Figure 35:
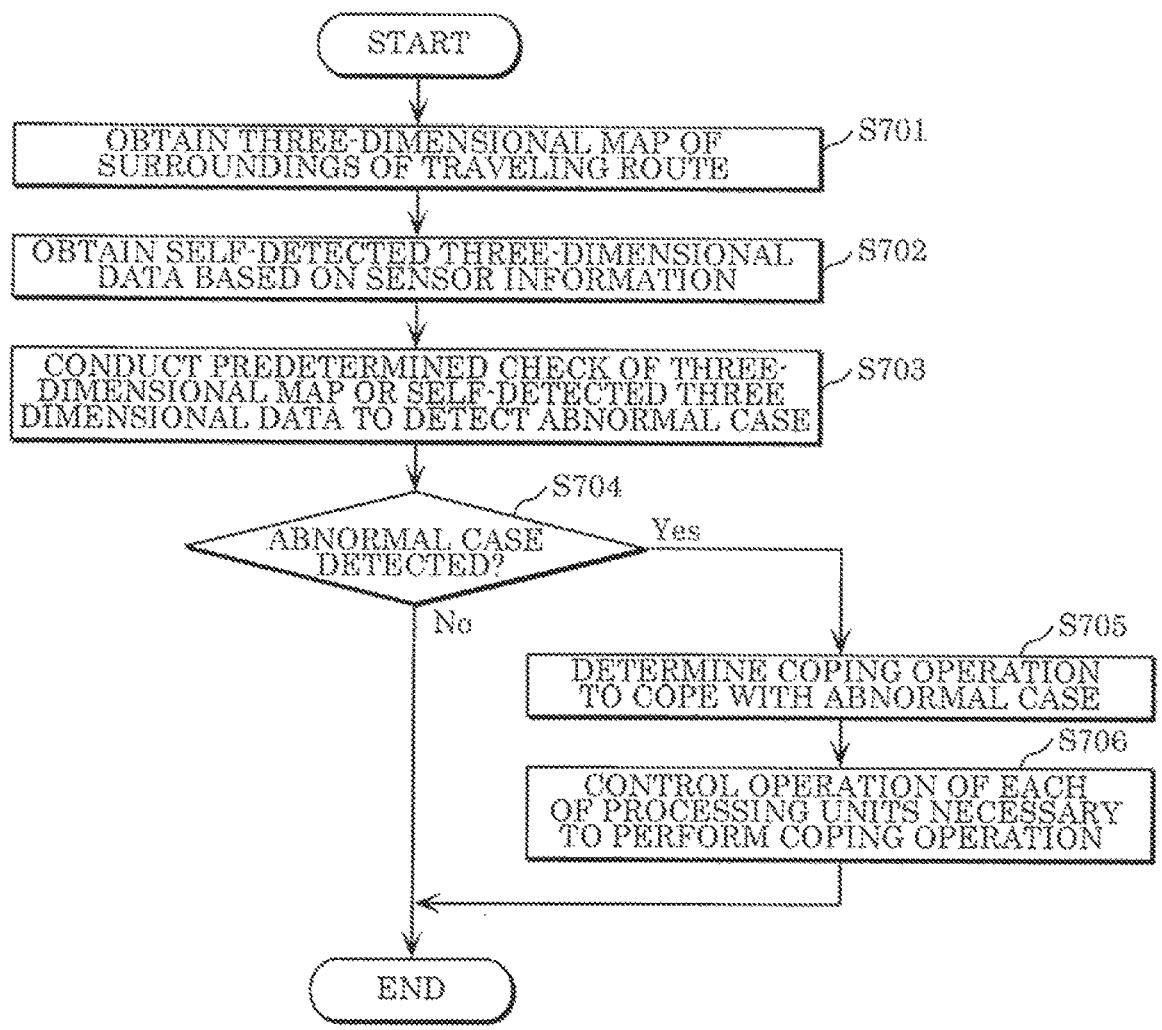
FIG. 35 is a flowchart of a three-dimensional information processing method according to Embodiment 4.

The following describes the structure of the three-dimensional information processing device and its operation according to the present embodiment capable of coping with abnormal cases regarding a three-dimensional map or self-detected three-dimensional data. FIG. 34 is a block diagram of an example structure of three-dimensional information processing device 700 according to the present embodiment. FIG. 35 is a flowchart of a three-dimensional information processing method performed by three-dimensional information processing device 700.

Three-dimensional information processing device 700 is equipped, for example, in a mobile object such as a car. As shown in FIG. 34, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

As shown in FIG. 35, three-dimensional map obtainer 701 obtains three-dimensional map 711 of the surroundings of the traveling route (S701). For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information (S702). For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case (S703). Stated differently, abnormal case judgment unit 703 judges whether at least one of obtained three-dimensional map 711 and self-detected three-dimensional data 712 is abnormal.

When the abnormal case is detected in step S703 (Yes in S704), coping operation determiner 704 determines a coping operation to cope with such abnormal case (S705). Next, operation controller 705 controls the operation of each of the processing units necessary to perform the coping operation (S706).

Meanwhile, when no abnormal case is detected in step S703 (No in S704), three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

The following describes coping operations used for the abnormal case 1 in which three-dimensional map 711 is unobtainable via communication.

Three-dimensional map 711 is necessary to perform self-location estimation, and thus the vehicle needs to obtain three-dimensional map 711 via communication when not having obtained in advance three-dimensional map 711 corresponding to the route to the destination. In some cases, however, the vehicle cannot obtain three-dimensional map 711 of the traveling route due to a reason such as a congested communication channel and a deteriorated environment of radio wave reception.

Abnormal case judgment unit 703 judges whether three-dimensional map 711 of the entire section on the route to the destination or a section within a predetermined range from the current position has already been obtained, and judges that the current condition applies to the abnormal case 1 when three-dimensional map 711 has not been obtained yet. Stated differently, abnormal case judgment unit 703 judges whether three-dimensional map 711 (the first three-dimensional position information) is obtainable via a communication channel, and judges that three-dimensional map 711 is abnormal when three-dimensional map 711 is unobtainable via a communication channel.

When the current condition is judged to be the abnormal case 1, coping operation determiner 704 selects one of the two types of coping operations: (1) continue the self-location estimation; and (2) terminate the self-location estimation.

First, a specific example of the coping operation (1) continue the self-location estimation will be described. Three-dimensional map 711 of the route to the destination is necessary to continue the self-location estimation.

For example, the vehicle identifies a place, within the range of three-dimensional map 711 having been obtained, in which the use of a communication channel is possible. The vehicle moves to such identified place, and obtains three-dimensional map 711. Here, the vehicle may obtain the whole three-dimensional map 711 to the destination, or may obtain three-dimensional map 711 on random access units within the upper limit capacity of a storage of the own vehicle, such as a memory and an HDD.

Note that the vehicle may separately obtain communication conditions on the route, and when the communication conditions on the route are predicted to be poor, the vehicle may obtain in advance three-dimensional map 711 of a section in which communication conditions are predicted to be poor, before arriving at such section, or obtain in advance three-dimensional map 711 of the maximum range obtainable. Stated differently, three-dimensional information processing device 700 predicts whether the vehicle will enter an area in which communication conditions are poor. When the vehicle is predicted to enter an area in which communication conditions are poor, three-dimensional information processing device 700 obtains three-dimensional map 711 before the vehicle enters such area.

Alternatively, the vehicle may identify a random access unit that forms the minimum three-dimensional map 711, the range of which is narrower than that of the normal times, required to estimate the location of the vehicle on the route, and receive a random access unit having been identified. Stated differently, three-dimensional information processing device 700 may obtain, via a communication channel, third three-dimensional position information having a narrower range than the range of the first three-dimensional position information, when three-dimensional map 711 (the first three-dimensional position information) is unobtainable via the communication channel.

Also, when being unable to access a server that distributes three-dimensional map 711, the vehicle may obtain three-dimensional map 711 from a mobile object that has already obtained three-dimensional map 711 of the route to the destination and that is capable of communicating with the own vehicle, such as another vehicle traveling around the own vehicle.

Next, a specific example of the coping operation to terminate the self-location estimation will be described. Three-dimensional map 711 of the route to the destination is unnecessary in this case.

For example, the vehicle notifies the driver of that the vehicle cannot maintain the functionally of automatic operation, etc. that is performed on the basis of the self-location estimation, and shifts the operation mode to a manual mode in which the driver operates the vehicle.

Automatic operation is typically carried out when self-location estimation is performed, although there may be a difference in the level of automatic operation in accordance with the degree of human involvement. Meanwhile, the estimated location of the vehicle can also be used as navigation information, etc. when the vehicle is operated by a human, and thus the estimated location of the vehicle is not necessarily used for automatic operation.

Also, when being unable to use a communication channel that the vehicle usually uses, such as a mobile communication network (e.g., 4G and 5G), the vehicle checks whether three-dimensional map 711 is obtainable via another communication channel, such as road-to-vehicle Wi-Fi (registered trademark) or millimeter-wave communication, or inter-vehicle communication, and switches to one of these communication channels via which three-dimensional map 711 is obtainable.

When being unable to obtain three-dimensional map 711, the vehicle may obtain a two-dimensional map to continue automatic operation by use of such two-dimensional map and self-detected three-dimensional data 712. Stated differently, when being unable to obtain three-dimensional map 711 via a communication channel, three-dimensional information processing device 700 may obtain, via a communication channel, map data that includes two-dimensional position information (a two-dimensional map) to estimate the location of the vehicle by use of the two-dimensional position information and self-detected three-dimensional data 712.

More specifically, the vehicle uses the two-dimensional map and self-detected three-dimensional data 712 to estimate its self-location, and uses self-detected three-dimensional data 712 to detect a vehicle, a pedestrian, an obstacle, etc. around the own vehicle.

Here, the map data such as an HD map is capable of including, together with three-dimensional map 711 formed by a three-dimensional point cloud: two-dimensional map data (a two-dimensional map); simplified map data obtained by extracting, from the two-dimensional map data, characteristic information such as a road shape and an intersection; and meta-data representing real-time information such as a traffic jam, an accident, and a roadwork. For example, the map data has a layer structure in which three-dimensional data (three-dimensional map 711), two-dimensional data (a two-dimensional map), and meta-data are disposed from the bottom layer in the stated order.

Here, the two-dimensional data is smaller in data size than the three-dimensional data. It may be thus possible for the vehicle to obtain the two-dimensional map even when communication conditions are poor. Alternatively, the vehicle can collectively obtain the two-dimensional map of a wide range in advance when in a section in which communication conditions are good. The vehicle thus may receive a layer including the two-dimensional map without receiving three-dimensional map 711, when communication conditions are poor and it is difficult to obtain three-dimensional map 711. Note that the meta-data is small in data size, and thus the vehicle receives the meta-data without fail, regardless, for example, of communication conditions.

Example methods of self-location estimation using the two-dimensional map and self-detected three-dimensional data 712 include two methods described below.

A first method is to perform matching of two-dimensional features. More specifically, the vehicle extracts two-dimensional features from self-detected three-dimensional data 712 to perform matching between the extracted two-dimensional features and the two-dimensional map.

For example, the vehicle projects self-detected three-dimensional data 712 onto the same plane as that of the two-dimensional map, and matches the resulting two-dimensional data with the two-dimensional map. Such matching is performed by use of features of the two-dimensional images extracted from the two-dimensional data and the two-dimensional map.

When three-dimensional map 711 includes a SWLD, two-dimensional features on the same plane as that of the two-dimensional map may be stored in three-dimensional map 711 together with three-dimensional features of keypoints in a three-dimensional space. For example, identification information is assigned to two-dimensional features. Alternatively, two-dimensional features are stored in a layer different from the layers of the three-dimensional data and the two-dimensional map, and the vehicle obtains data of the two-dimensional features together with the two-dimensional map.

When the two-dimensional map shows, on the same map, information on positions having different heights from the ground (i.e., positions that are not on the same plane), such as a white line inside a road, a guardrail, and a building, the vehicle extracts features from data on a plurality of heights in self-detected three-dimensional data 712.

Also, information indicating a correspondence between keypoints on the two-dimensional map and keypoints on three-dimensional map 711 may be stored as meta-information of the map data.

A second method is to perform matching of three-dimensional features. More specifically, the vehicle obtains three-dimensional features corresponding to keypoints on the two-dimensional map, and matches the obtained three-dimensional features with three-dimensional features in self-detected three-dimensional data 712.

More specifically, three-dimensional features corresponding to keypoints on the two-dimensional map are stored in the map data. The vehicle obtains such three-dimensional features when obtaining the two-dimensional map. Note that when three-dimensional map 711 includes a SWLD, information is provided that identifies those keypoints, among the keypoints in the SWLD, that correspond to keypoints on the two-dimensional map. Such identification information enables the vehicle to determine three-dimensional features that should be obtained together with the two-dimensional map. In this case, the representation of two-dimensional positions is only required, and thus the amount of data can be reduced compared to the case of representing three-dimensional positions.

The use of the two-dimensional map to perform self-location estimation decreases the accuracy of the self-location estimation compared to the case of using three-dimensional map 711. For this reason, the vehicle judges whether the vehicle can continue automatic operation by use of the location having decreased estimation accuracy, and may continue automatic operation only when judging that the vehicle can continue automatic operation.

Whether the vehicle can continue automatic operation is affected by an environment in which the vehicle is traveling such as whether the road on which the vehicle is traveling is a road in an urban area or a road accessed less often by another vehicle or a pedestrian, such as an expressway, and the width of a road or the degree of congestion of a road (the density of vehicles or pedestrians). It is also possible to dispose, in a premise of a business place, a town, or inside a building, markers recognized by a senor such as a camera. Since a two-dimensional sensor is capable of highly accurate recognition of such markers in the specified areas, highly accurate self-location estimation is enabled by, for example, incorporating information on the positions of the markers into the two-dimensional map.

Also, by incorporating, into the map, identification information indicating whether each area corresponds to a specified area, for example, the vehicle can judge whether such vehicle is currently in a specified area. When in a specified area, the vehicle judges that the vehicle can continue automatic operation. As described above, the vehicle may judge whether the vehicle can continue automatic operation on the basis of the accuracy of self-location estimation that uses the two-dimensional map or an environment in which the vehicle is traveling.

As described above, three-dimensional information processing device 700 judges whether to perform automatic operation that utilizes the location of the vehicle having been estimated by use of the two-dimensional map and self-detected three-dimensional data 712, on the basis of an environment in which the vehicle is traveling (a traveling environment of the mobile object).

Alternatively, the vehicle may not judge whether the vehicle can continue automatic operation, but may switch levels (modes) of automatic operation in accordance with the accuracy of self-location estimation or the traveling environment of the vehicle. Here, to switch levels (modes) of automatic operation means, for example, to limit the speed, increase the degree of driver operation (lower the automatic level of automatic operation), switch to a mode in which the vehicle obtains information on the operation of a preceding vehicle to refer to it for its own operation, switch to a mode in which the vehicle obtains information on the operation of a vehicle heading for the same destination to use it for automatic operation, etc.

The map may also include information, associated with the position information, indicating a recommendation level of automatic operation for the case where the two-dimensional map is used for self-location estimation. The recommendation level may be meta-data that dynamically changes in accordance with the volume of traffic, etc. This enables the vehicle to determine a level only by obtaining information from the map without needing to judge a level every time an environment, etc. around the vehicle changes. Also, it is possible to maintain a constant level of automatic operation of individual vehicles by such plurality of vehicles referring to the same map. Note that the recommendation level may not be "recommendation," and thus such level may be a mandatory level that should be abided by.

The vehicle may also switch the level of automatic operation in accordance with the presence or absence of the driver (whether the vehicle is manned or unmanned). For example, the vehicle lowers the level of automatic operation when the vehicle is manned, and terminates automatic operation when unmanned. The vehicle may recognize a pedestrian, a vehicle, and a traffic sign around the vehicle to determine a position where the vehicle can stop safely. Alternatively, the map may include position information indicating positions where the vehicle can stop safely, and the vehicle refers to such position information to determine a position where the vehicle can stop safely.

The following describes coping operations to cope with the abnormal case 2 in which three-dimensional map 711 is not present, or three-dimensional map 711 having been obtained is corrupt.

Abnormal case judgment unit 703 checks whether the current condition applies to one of: (1) three-dimensional map 711 of part or the entirety of the section on the route to the destination not being present in a distribution server, etc. to which the vehicle accesses, and thus unobtainable; and (2) part or the entirety of obtained three-dimensional map 711 being corrupt. When one of these cases applies, the vehicle judges that the current condition applies to the abnormal case 2. Stated differently, abnormal case judgment unit 703 judges whether the data of three-dimensional map 711 has integrity, and judges that three-dimensional map 711 is abnormal when the data of three-dimensional map 711 has no integrity.

When the current condition is judged to apply to the abnormal case 2, coping operations described below are performed. First, an example coping operation for the case where (1) three-dimensional map 711 is unobtainable will be described.

For example, the vehicle sets a route that avoids a section, three-dimensional map 711 of which is not present.

When being unable to set an alternative route for a reason that an alternative route is not present, an alternative route is present but its distance is substantially longer, or etc., the vehicle sets a route that includes a section, three-dimensional map 711 of which is not present. When in such section, the vehicle notifies the driver of the necessity to switch to another operation mode, and switches the operation mode to the manual mode.

When the current condition applies to (2) in which part or the entirety of obtained three-dimensional map 711 is corrupt, a coping operation described below is performed.

The vehicle identifies a corrupted portion of three-dimensional map 711, requests for the data of such corrupted portion via communication, obtains the data of the corrupted portion, and updates three-dimensional map 711 using the obtained data. In so doing, the vehicle may specify the corrupted portion on the basis of position information in three-dimensional map 711, such as absolute coordinates and relative coordinates, or may specify the corrupted portion by an index number, etc. assigned to a random access unit that forms the corrupted portion. In such case, the vehicle replaces the random access unit including the corrupted portion with a random access unit having been obtained.

The following describes coping operations to cope with the abnormal case 3 in which the vehicle fails to generate self-detected three-dimensional data 712 due to trouble of a sensor of the own vehicle or bad weather.

Abnormal case judgment unit 703 checks whether an error in generated self-detected three-dimensional data 712 falls within an acceptable range, and judges that the current condition applies to the abnormal case 3 when such error is beyond the acceptable range. Stated differently, abnormal case judgment unit 703 judges whether the data accuracy of generated self-detected three-dimensional data 712 is higher than or equal to the reference value, and judges that self-detected three-dimensional data 712 is abnormal when the data accuracy of generated self-detected three-dimensional data 712 is not higher than or equal to the reference value.

A method described below is used to check whether an error in generated self-detected three-dimensional data 712 is within the acceptable range.

A spatial resolution of self-detected three-dimensional data 712 when the own vehicle is in normal operation is determined in advance on the basis of the resolutions in the depth and scanning directions of a three-dimensional sensor of the own vehicle, such as a rangefinder and a stereo camera, or on the basis of the density of generatable point groups. Also, the vehicle obtains the spatial resolution of three-dimensional map 711 from meta-information, etc. included in three-dimensional map 711.

The vehicle uses the spatial resolutions of self-detected three-dimensional data 712 and three-dimensional map 711 to estimate a reference value used to specify a matching error in matching self-detected three-dimensional data 712 with three-dimensional map 711 on the basis of three-dimensional features, etc. Used as the matching error is an error in three-dimensional features of the respective keypoints, statistics such as the mean value of errors in three-dimensional features among a plurality of keypoints, or an error in spatial distances among a plurality of keypoints. The acceptable range of a deviation from the reference value is set in advance.

The vehicle judges that the current condition applies to the abnormal case 3 when the matching error between self-detected three-dimensional data 712 generated before or in the middle of traveling and three-dimensional map 711 is beyond the acceptable range.

Alternatively, the vehicle may use a test pattern having a known three-dimensional shape for accuracy check to obtain, before the start of traveling, for example, self-detected three-dimensional data 712 corresponding to such test pattern, and judge whether the current condition applies to the abnormal case 3 on the basis of whether a shape error is within the acceptable range.

For example, the vehicle makes the above judgment before every start of traveling. Alternatively, the vehicle makes the above judgment at a constant time interval while traveling, thereby obtaining time-series variations in the matching error. When the matching error shows an increasing trend, the vehicle may judge that the current condition applies to the abnormal case 3 even when the error is within the acceptable range. Also, when an abnormality can be predicted on the basis of the time-series variations, the vehicle may notify the user of that an abnormality is predicted by displaying, for example, a message that prompts the user for inspection or repair. The vehicle may discriminate between an abnormality attributable to a transient factor such as bad weather and an abnormality attributable to sensor trouble on the basis of time-series variations, and notify the user only of an abnormality attributable to sensor trouble.

When the current condition is judged to be the abnormal case 3, the vehicle performs one, or selective ones of the following three types of coping operations: (1) operate an alternative emergency sensor (rescue mode); (2) switch to another operation mode; and (3) calibrate the operation of a three-dimensional sensor.

First, the coping operation (1) operate an alternative emergency sensor will be described. The vehicle operates an alternative emergency sensor that is different from a three-dimensional sensor used for normal operation. Stated differently, when the accuracy of generated self-detected three-dimensional data 712 is not higher than or equal to the reference value, three-dimensional information processing device 700 generates self-detected three-dimensional data 712 (fourth three-dimensional position information) from information detected by the alternative sensor that is different from a usual sensor.

More specifically, when obtaining self-detected three-dimensional data 712 in a combined use of a plurality of cameras or LiDARs, the vehicle identifies a malfunctioning sensor, on the basis of a direction, etc. in which the matching error of self-detected three-dimensional data 712 is beyond the acceptable range. Subsequently, the vehicle operates an alternative sensor corresponding to such malfunctioning sensor.

The alternative sensor may be a three-dimensional sensor, a camera capable of obtaining two-dimensional images, or a one-dimensional sensor such as an ultrasonic sensor. The use of an alternative sensor other than a three-dimensional sensor can result in a decrease in the accuracy of self-location estimation or the failure to perform self-location estimation. The vehicle thus may switch automatic operation modes depending on the type of an alternative sensor.

When an alternative sensor is a three-dimensional sensor, for example, the vehicle maintains the current automatic operation mode. When an alternative sensor is a two-dimensional sensor, the vehicle switches the operation mode from the full automatic operation mode to the semi-automatic operation mode that requires human operation. When an alternative sensor is a one-dimensional sensor, the vehicle switches the operation mode to the manual mode that performs no automatic braking control.

Alternatively, the vehicle may switch automatic operation modes on the basis of a traveling environment. When an alternative sensor is a two-dimensional sensor, for example, the vehicle maintains the full automatic operation mode when traveling on an expressway, and switches the operation mode to the semi-automatic operation mode when traveling in an urban area.

Also, even when no alternative sensor is available, the vehicle may continue the self-location estimation so long as a sufficient number of keypoints are obtainable only by normally operating sensors. Since detection cannot work in a specific direction in this case, the vehicle switches the current operation mode to the semi-automatic operation mode or the manual mode.

Next, the coping operation (2) switch to another operation mode will be described. The vehicle switches the current operation mode from the automatic operation mode to the manual mode. The vehicle may continue automatic operation until arriving at the shoulder of the road, or another place where the vehicle can stop safely, and then stop there. The vehicle may switch the current operation mode to the manual mode after stopping. As described above, three-dimensional information processing device 700 switches the automatic operation mode to another mode when the accuracy of generated self-detected three-dimensional data 712 is not higher than or equal to the reference value.

Next, the coping operation (3) calibrate the operation of a three-dimensional sensor will be described. The vehicle identifies a malfunctioning three-dimensional sensor from a direction, etc. in which an matching error is occurring, and calibrates the identified sensor. More specifically, when a plurality of LiDARs or cameras are used as sensors, an overlapped portion is included in a three-dimensional space reconstructed by each of the sensors. Stated differently, data corresponding to such overlapped portion is obtained by a plurality of sensors. However, a properly operating sensor and a malfunctioning sensor obtain different three-dimensional point group data corresponding to the overlapped portion. The vehicle thus calibrates the origin point of the LiDAR or adjusts the operation for a predetermined part such as one responsible for camera exposure and focus so that the malfunctioning sensor can obtain the data of a three-dimensional point group equivalent to that obtained by a properly operating sensor.

When the matching error falls within the acceptable range as a result of such adjustment, the vehicle maintains the previous operation mode. Meanwhile, when the matching accuracy fails to fall within the acceptable range after such adjustment, the vehicle performs one of the above coping operations: (1) operate an alternative emergency sensor; and (2) switch to another operation mode.

As described above, three-dimensional information processing device 700 calibrates a sensor operation when the data accuracy of generated self-detected three-dimensional data 712 is not higher than or equal to the reference value.

The following describes a method of selecting a cooping operation. A coping operation may be selected by the user such as a driver, or may be automatically selected by the vehicle without user's involvement.

The vehicle may switch controls in accordance with whether the driver is onboard. For example, when the driver is onboard, the vehicle prioritizes the manual mode. Meanwhile, when the driver is not onboard, the vehicle prioritizes the mode to move to a safe place and stop.

Three-dimensional map 711 may include information indicating places to stop as meta-information. Alternatively, the vehicle may issue, to a service firm that manages operation information on a self-driving vehicle, a request to send a reply indicating a place to stop, thereby obtaining information on the place to stop.

Also, when the vehicle travels on a fixed route, for example, the operation mode of the vehicle may be switched to a mode in which an operator controls the operation of the vehicle via a communication channel. It is highly dangerous when there is a failure in the function of self-location estimation especially when the vehicle is traveling in the full automatic operation mode. When any abnormal case is detected or a detected abnormality cannot be fixed, the vehicle notifies, via a communication channel, the service firm that manages the operation information of the occurrence of the abnormality. Such service firm may notify vehicles, etc. traveling around such vehicle in trouble of the presence of a vehicle having an abnormality or that they should clear a nearby space for the vehicle to stop.

The vehicle may also travel at a decreased speed compared to normal times when any abnormal case has been detected.

When the vehicle is a self-driving vehicle from a vehicle dispatch service such as a taxi, and an abnormal case occurs in such vehicle, the vehicle contacts an operation control center, and then stops at a safe place. The firm of the vehicle dispatch service dispatches an alternative vehicle. The user of such vehicle dispatch service may operate the vehicle instead. In these cases, fee discount or benefit points may be provided in combination.

Figure 36:
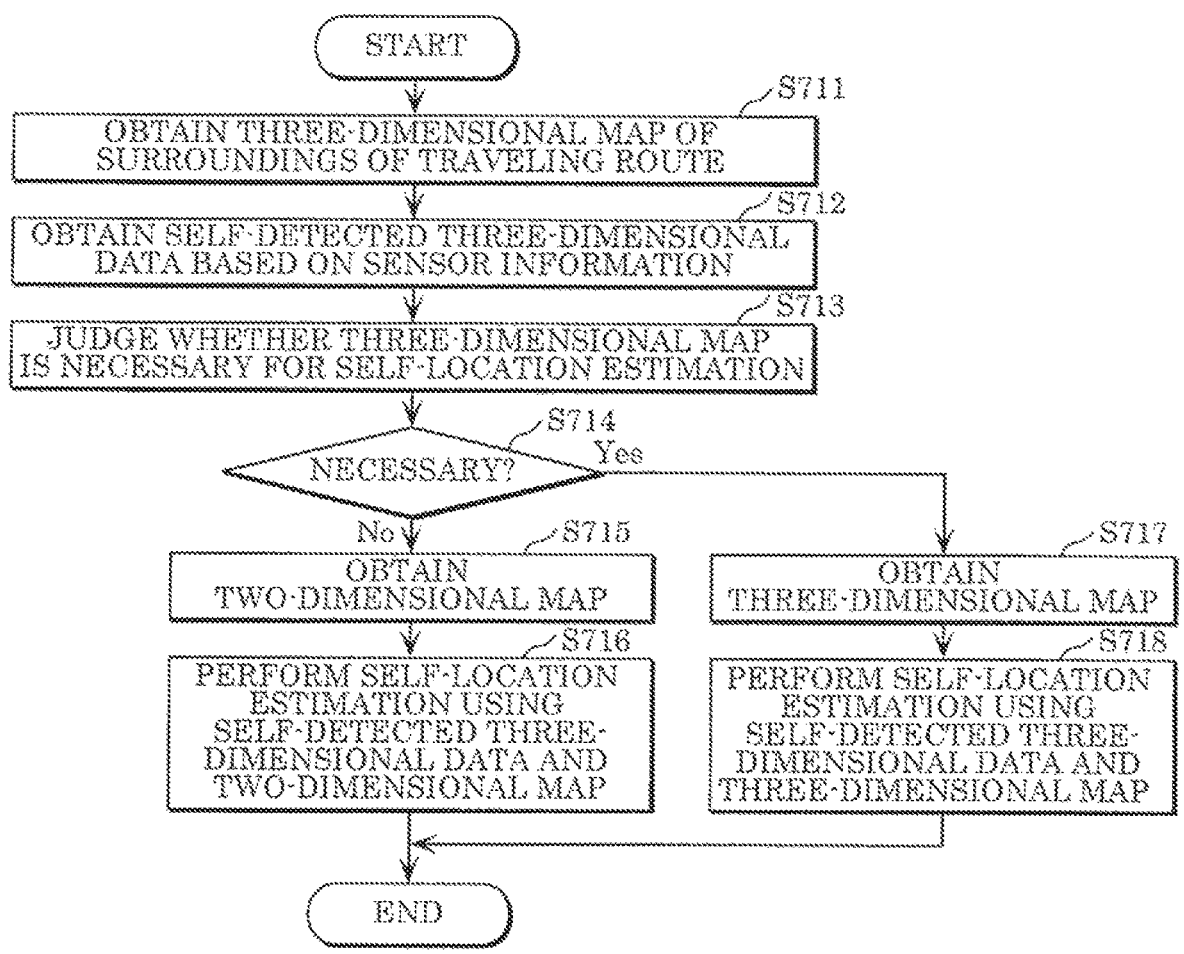
FIG. 36 is a flowchart of a three-dimensional information processing method according to Embodiment 4.

In the description of the coping operations for the abnormal case 1, self-location estimation is performed on the basis of the two-dimensional map, but self-location estimation may be performed also in normal times by use of the two-dimensional map. FIG. 36 is a flowchart of self-location estimation processes performed in such case.

First, the vehicle obtains three-dimensional map 711 of the surroundings of the traveling route (S711). The vehicle then obtains self-detected three-dimensional data 712 on the basis of sensor information (S712).

Next, the vehicle judges whether three-dimensional map 711 is necessary for self-location estimation (S713). More specifically, the vehicle judges whether three-dimensional map 711 is necessary on the basis of the accuracy of its location having been estimated by use of the two-dimensional map and the traveling environment. For example, a method similar to the above-described coping operations for the abnormal case 1 is used.

When judging that three-dimensional map 711 is not necessary (No in S714), the vehicle obtains a two-dimensional map (S715). In so doing, the vehicle may obtain additional information together that is mentioned when the coping operations for the abnormal case 1 have been described. Alternatively, the vehicle may generate a two-dimensional map from three-dimensional map 711. For example, the vehicle may generate a two-dimensional map by cutting out any plane from three-dimensional map 711.

Next, the vehicle performs self-location estimation by use of self-detected three-dimensional data 712 and the two-dimensional map (S716). Note that a method of self-location estimation by use of a two-dimensional map is similar to the above-described coping operations for the abnormal case 1.

Meanwhile, when judging that three-dimensional map 711 is necessary (Yes in S714), the vehicle obtains three-dimensional map 711 (S717). Then, the vehicle performs self-location estimation by use of self-detected three-dimensional data 712 and three-dimensional map 711 (S718).

Note that the vehicle may selectively decide on which one of the two-dimensional map and three-dimensional map 711 to basically use, in accordance with a speed supported by a communication device of the own vehicle or conditions of a communication channel. For example, a communication speed that is required to travel while receiving three-dimensional map 711 is set in advance, and the vehicle may basically use the two-dimensional map when the communication speed at the time of traveling is less than or equal to the such set value, and basically use three-dimensional map 711 when the communication speed at the time of traveling is greater than the set value. Note that the vehicle may basically use the two-dimensional map without judging which one of the two-dimensional map and the three-dimensional map to use.

Embodiment 5

Figure 37:
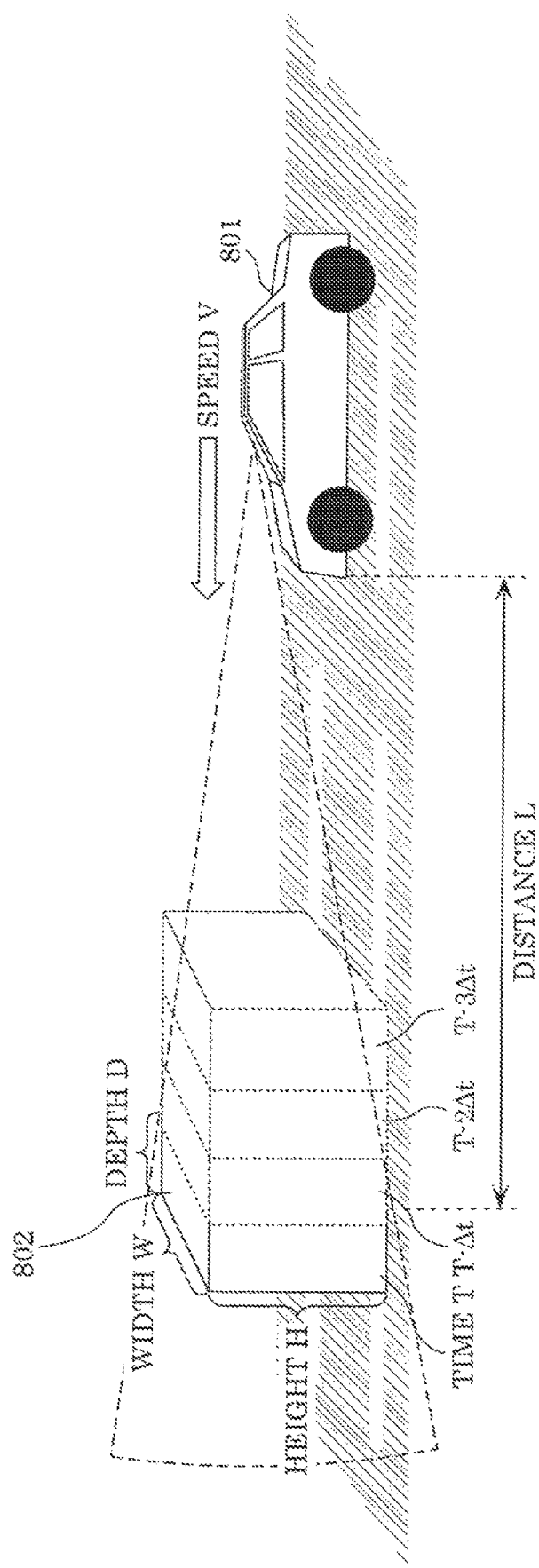
FIG. 37 is a diagram that illustrates processes of transmitting three-dimensional data according to Embodiment 5.

The present embodiment describes a method, etc. of transmitting three-dimensional data to a following vehicle. FIG. 37 is a diagram showing an exemplary space, three-dimensional data of which is to be transmitted to a following vehicle, etc.

Vehicle 801 transmits, at the time interval of Δt, three-dimensional data, such as a point cloud (a point group) included in a rectangular solid space 802, having width W, height H, and depth D, located ahead of vehicle 801 and distanced by distance L from vehicle 801, to a cloud-based traffic monitoring system that monitors road situations or a following vehicle.

When a change has occurred in the three-dimensional data of a space that is included in space 802 already transmitted in the past, due to a vehicle or a person entering space 802 from outside, for example, vehicle 801 also transmits three-dimensional data of the space in which such change has occurred.

Although FIG. 37 illustrates an example in which space 802 has a rectangular solid shape, space 802 is not necessarily a rectangular solid so long as space 802 includes a space on the forward road that is hidden from view of a following vehicle.

Distance L may be set to a distance that allows the following vehicle having received the three-dimensional data to stop safely. For example, set as distance L is the sum of a distance traveled by the following vehicle while receiving the three-dimensional data; a distance traveled by the following vehicle until the following vehicle starts speed reduction in accordance with the received data; and a distance required by the following vehicle to stop safely after starting speed reduction. These distances vary in accordance with the speed, and thus distance L may vary in accordance with speed V of the vehicle, just like L=a×V+b (a and b are constants).

Width W is set to a value that is at least greater than the width of the lane on which vehicle 801 is traveling. Width W may also be set to a size that includes an adjacent space such as right and left lanes and a side strip.

Depth D may have a fixed value, but may vary in accordance with speed V of the vehicle, just like D=c×V+d (c and d are constants). Also, D that is set to satisfy D>V×Δt enables the overlap of a space to be transmitted and a space transmitted in the past. This enables vehicle 801 to transmit a space on the traveling road to the following vehicle, etc. completely and more reliably.

As described above, vehicle 801 transmits three-dimensional data of a limited space that is useful to the following vehicle, thereby effectively reducing the amount of the three-dimensional data to be transmitted and achieving low-latency, low-cost communication.

Figure 38:
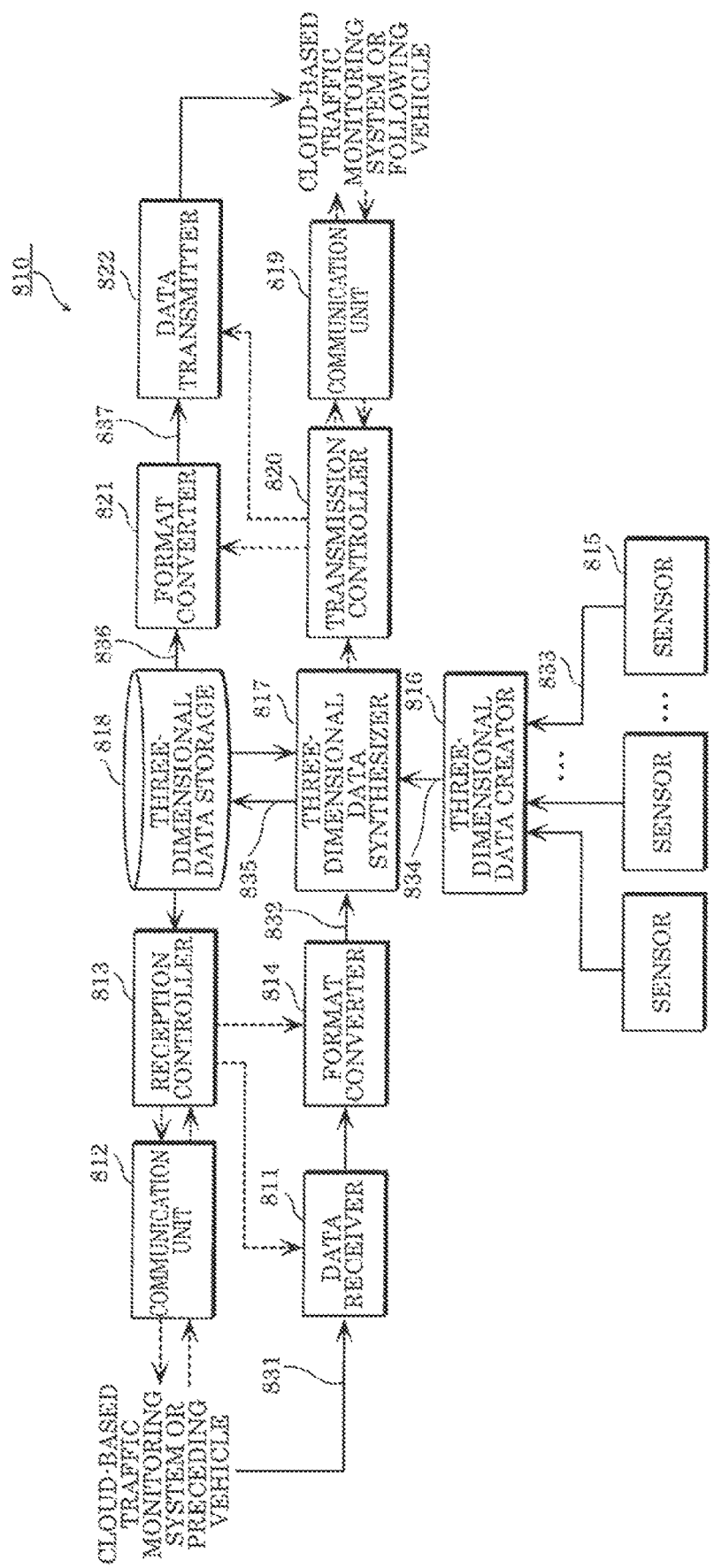
FIG. 38 is a block diagram of a three-dimensional data creation device according to Embodiment 5.

The following describes the structure of three-dimensional data creation device 810 according to the present embodiment. FIG. 38 is a block diagram of an exemplary structure of three-dimensional data creation device 810 according to the present embodiment. Such three-dimensional data creation device 810 is equipped, for example, in vehicle 801. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of vehicle 801 and generate sensor information 833. Sensor information 833 is, for example, three-dimensional data such as a point cloud (point group data), when sensors 815 are laser sensors such as LIDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 39:
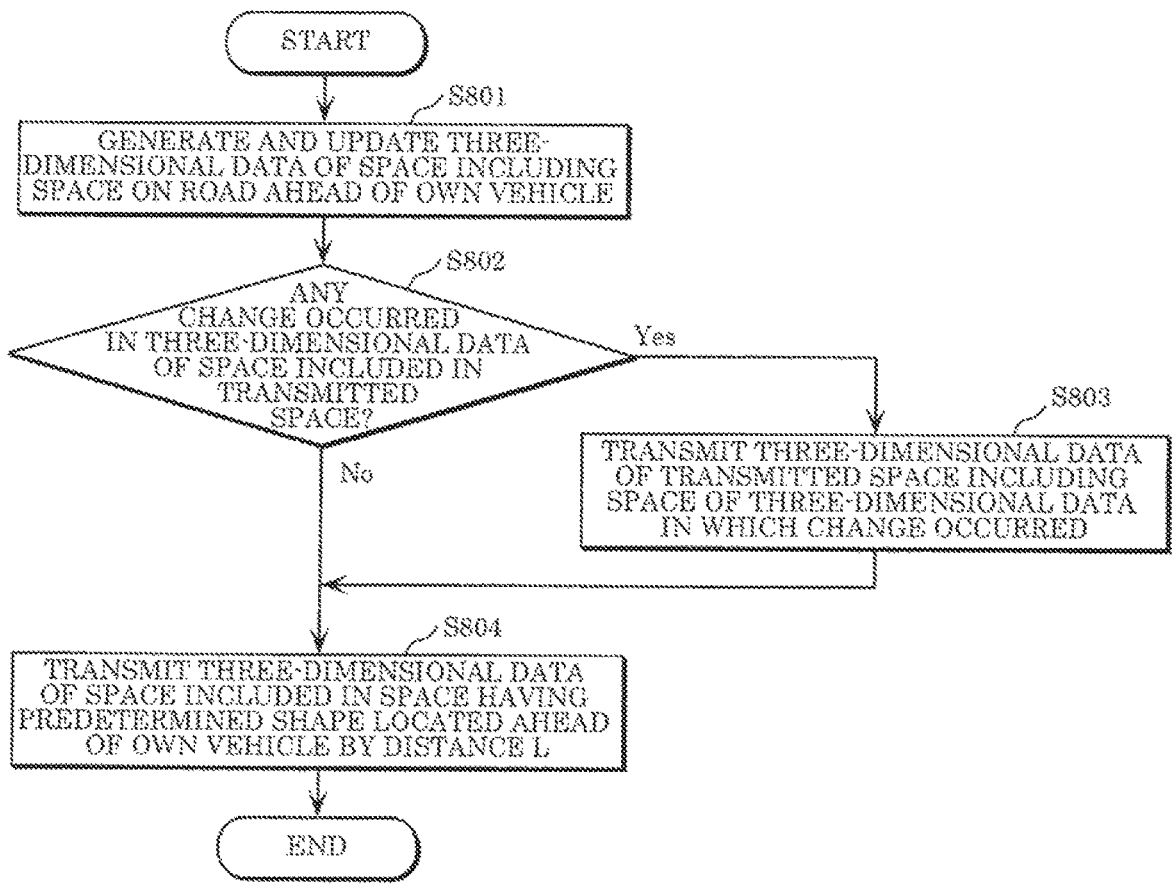
FIG. 39 is a flowchart of a three-dimensional data creation method according to Embodiment 5.

The following describes the steps performed by three-dimensional data creation device 810 of transmitting three-dimensional data to a following vehicle. FIG. 39 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space 802 on the road ahead of own vehicle 801 (S801). More specifically, three-dimensional data creation device 810 synthesizes three-dimensional data 834 created on the basis of sensor information 833 of own vehicle 801 with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of own vehicle 801 by distance L (S804).

The processes of step S801 through step S804 are repeated, for example at a predetermined time interval.

When three-dimensional data 835 of the current space 802 to be transmitted includes no difference from the three-dimensional map, three-dimensional data creation device 810 may not transmit three-dimensional data 837 of space 802.

Figure 40:
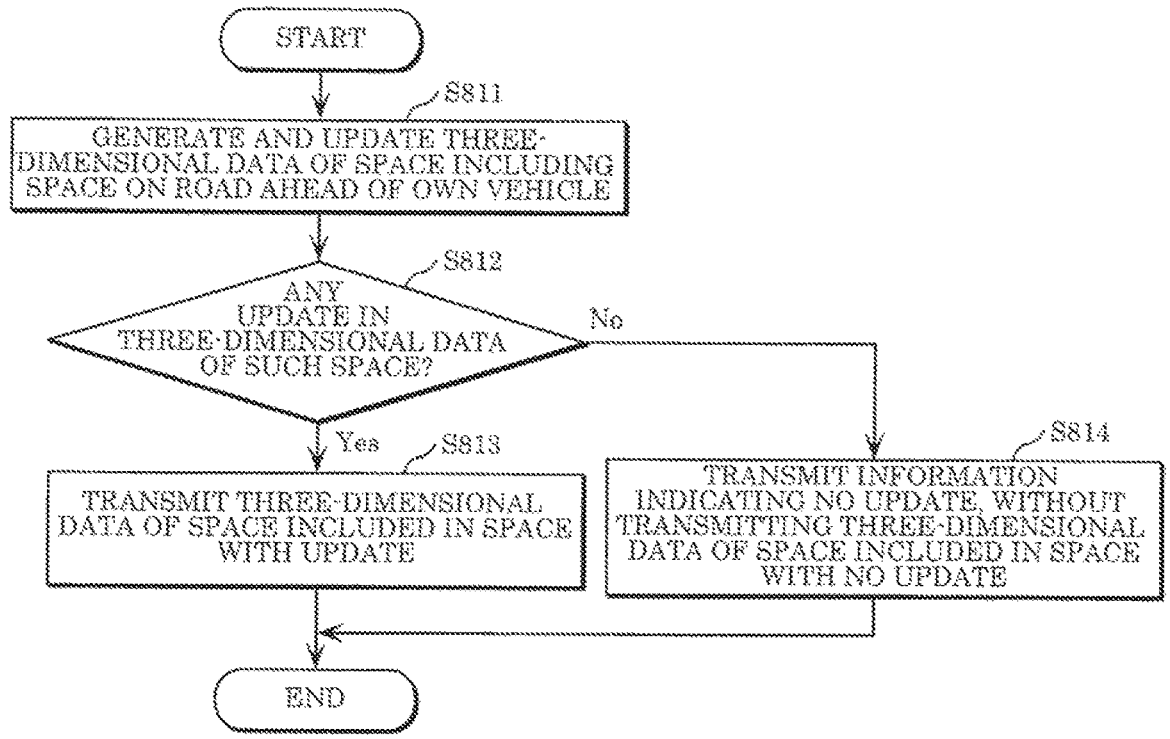
FIG. 40 is a flowchart of a three-dimensional data creation method according to Embodiment 5.

FIG. 40 is a flowchart of the operation performed by three-dimensional data creation device 810 in such case.

First, three-dimensional data creation device 810 generates and updates three-dimensional data 835 of a space that includes space 802 on the road ahead of own vehicle 801 (S811).

Three-dimensional data creation device 810 then judges whether three-dimensional data 835 of space 802 that has been generated includes an update from the three-dimensional map (S812). Stated differently, three-dimensional data creation device 810 judges whether three-dimensional data 835 of space 802 that has been generated is different from the three-dimensional map. Here, the three-dimensional map is three-dimensional map information managed by a device on the infrastructure side such as a cloud-based traffic monitoring system. Such three-dimensional map is obtained, for example, as three-dimensional data 831.

When an update is included (Yes in S812), three-dimensional data creation device 810 transmits three-dimensional data of the space included in space 802 to the cloud-based traffic monitoring system or the following vehicle just like the above case (S813).

Meanwhile, when no update is included (No in S812), three-dimensional data creation device 810 does not transmit three-dimensional data of the space included in space 802 to the cloud-based traffic monitoring system or the following vehicle (S814). Note that three-dimensional data creation device 810 may set the volume of space 802 to zero, thereby controlling the three-dimensional data of space 802 not to be transmitted. Alternatively, three-dimensional data creation device 810 may transmit information indicating that space 802 includes no update to the cloud-based traffic monitoring system or the following vehicle.

As described above, data is not transmitted when, for example, no obstacle is present on the road and thus no difference is present between three-dimensional data 835 that has been generated and the three-dimensional map of on infrastructure side. This prevents the transmission of unnecessary data.

Note that the above description illustrates a non-limited example in which three-dimensional data creation device 810 is equipped in a vehicle, and thus three-dimensional data creation device 810 may be equipped in any mobile object.

As described above, three-dimensional data creation device 810 according to the present embodiment is equipped in a mobile object that includes sensors 815 and a communication unit (data receiver 811, or data transmitter 822, etc.) that transmits and receives three-dimensional data to and from an external device. Three-dimensional data creation device 810 creates three-dimensional data 835 (second three-dimensional data) on the basis of sensor information 833 detected by sensors 815 and three-dimensional data 831 (first three-dimensional data) received by data receiver 811. Three-dimensional data creation device 810 transmits three-dimensional data 837 that is part of three-dimensional data 835 to the external device.

Such three-dimensional data creation device 810 is capable of generating three-dimensional data of a range undetectable by the own vehicle. Three-dimensional data creation device 810 is also capable of transmitting, to another vehicle, etc., three-dimensional data of a range undetectable by such another vehicle, etc.

Also, three-dimensional data creation device 810 repeats the creation of three-dimensional data 835 and the transmission of three-dimensional data 837 at a predetermined time interval. Three-dimensional data 837 is three-dimensional data of small space 802 having a predetermined size and located predetermined distance L ahead of the current position of vehicle 801 in a traveling direction of vehicle 801.

This limits a range of three-dimensional data 837 to be transmitted, and thus reduces the data amount of three-dimensional data 837 to be transmitted.

Predetermined distance L varies in accordance with traveling speed V of vehicle 801. For example, predetermined distance L is longer as traveling speed V is faster. This enables vehicle 801 to set an appropriate small space 802 in accordance with traveling speed V of vehicle 801, and thus to transmit three-dimensional data 837 of such small space 802 to a following vehicle, etc.

Also, the predetermined size varies in accordance with traveling speed V of vehicle 801. For example, the predetermined size is greater as traveling speed V is faster. For example, depth D is greater, which is the length of small space 802 in the traveling direction of the vehicle, as traveling speed V is faster. This enables vehicle 801 to set an appropriate small space 802 in accordance with traveling speed V of vehicle 801, and thus to transmit three-dimensional data 837 of such small space 802 to a following vehicle, etc.

Three-dimensional data creation device 810 judges whether a change has occurred in three-dimensional data 835 of small space 802 corresponding to three-dimensional data 837 already transmitted. When judging that a change has occurred, three-dimensional data creation device 810 transmits, to a following vehicle, etc. outside, three-dimensional data 837 (fourth three-dimensional data) that is at least part of three-dimensional data 835 in which the change has occurred.

This enables vehicle 801 to transmit, to a following vehicle, etc., three-dimensional data 837 of the space in which a change has occurred.

Also, three-dimensional data creation device 810 more preferentially transmits three-dimensional data 837 (fourth three-dimensional data) in which a change has occurred than normal three-dimensional data 837 (third three-dimensional data) that is transmitted at regular time intervals. More specifically, three-dimensional data creation device 810 transmits three-dimensional data 837 (fourth three-dimensional data) in which a change has occurred before transmitting normal three-dimensional data 837 (third three-dimensional data) that is transmitted at regular time intervals. Stated differently, three-dimensional data creation device 810 transmits three-dimensional data 837 (fourth three-dimensional data) in which a change has occurred at irregular time intervals without waiting for the transmission of normal three-dimensional data 837 that is transmitted at regular time intervals.

This enables vehicle 801 to preferentially transmit, to a following vehicle, etc., three-dimensional data 837 of the space in which a change has occurred, thereby enabling the following vehicle, etc., to promptly make a judgment that is based on the three-dimensional data.

Three-dimensional data 837 (fourth three-dimensional data) in which the change has occurred indicates a difference between three-dimensional data 835 of small space 802 corresponding to three-dimensional data 837 already transmitted and three-dimensional data 835 that has undergone the change. This reduces the data amount of three-dimensional data 837 to be transmitted.

Three-dimensional data creation device 810 does not transmit three-dimensional data 837 of small space 802, when no difference is present between three-dimensional data 837 of small space 802 and three-dimensional data 831 of small space 802. Also, three-dimensional data creation device 810 may transmit, to the external device, information indicating that no difference is present between three-dimensional data 837 of small space 802 and three-dimensional data 831 of small space 802.

This prevents the transmission of unnecessary three-dimensional data 837, thereby reducing the data amount of three-dimensional data 837 to be transmitted.

Embodiment 6

In the present embodiment, a display device and a display method which display information obtained from a three-dimensional map, etc., and a storing device and storing method for storing a three-dimensional map, etc., will be described.

A mobile object such as a car or robot makes use of a three-dimensional map obtainable by communication with a server or another vehicle and two-dimensional video or self-detected three-dimensional data obtainable from a sensor equipped in the own vehicle, for the self-driving of the car or the autonomous travelling of the robot. Among such data, it is possible that data that the user wants to watch or store is different depending on conditions. Hereinafter, a display device that switches display according to the conditions will be described.

Figure 41:
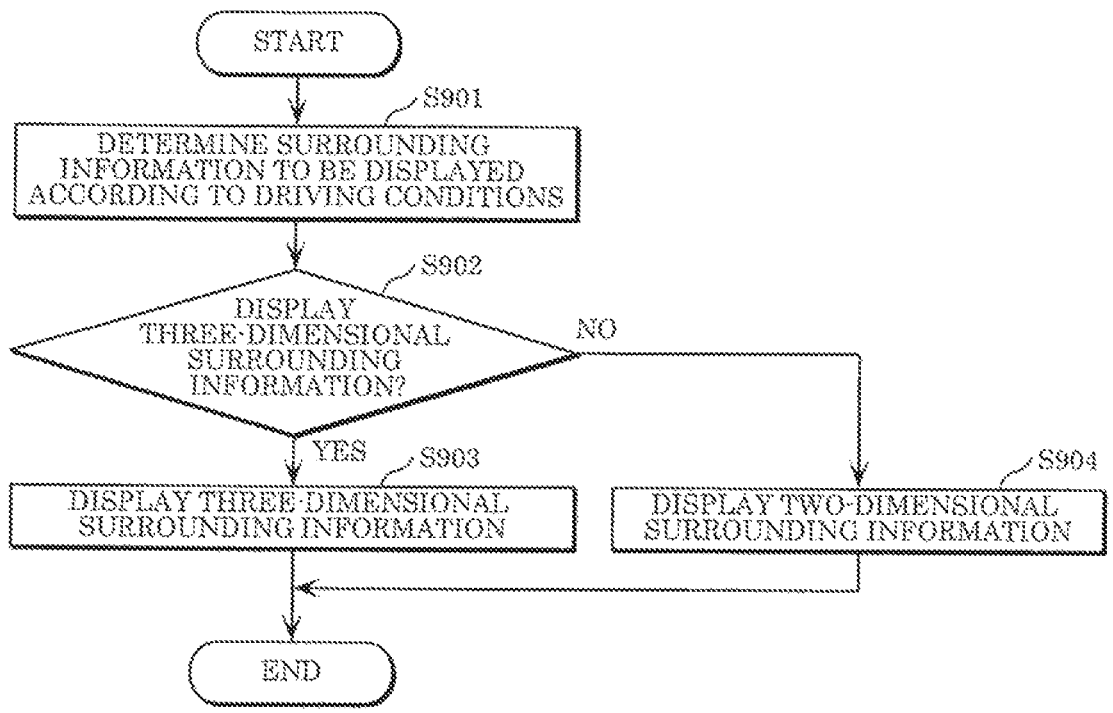
FIG. 41 is a flowchart of a display method according to Embodiment 6.

FIG. 41 is a flowchart showing an outline of a display method performed by the display device. The display device is equipped in a mobile object such as a car or a robot. Note that an example in which the mobile object is a vehicle (car) will be described below.

First, the display device determines which between two-dimensional surrounding information and three-dimensional surrounding information is to be displayed, according to the driving conditions of the vehicle (S901). Note that the two-dimensional surrounding information corresponds to the first surrounding information in the claims, and the three-dimensional surrounding information corresponds to the second surrounding information in the claims. Here, surrounding information is information indicating the surroundings of the mobile object, and is for example, video of a view in a particular direction from the vehicle or a map of the surroundings of the vehicle.

Two-dimensional surrounding information is information generated using two-dimensional data. Here, two-dimensional data is two-dimensional map information or video. For example, two-dimensional surrounding information is a map of the vehicle's surroundings obtained from a two-dimensional map or video obtained using a camera equipped in the vehicle. Furthermore, the two-dimensional surrounding information, for example, does not include three-dimensional information. Specifically, when the two-dimensional surrounding information is a map of the vehicle's surroundings, the map does not include height direction information. Furthermore, when the two-dimensional surrounding information is video obtained using a camera, the video does not include depth direction information.

Furthermore, the three-dimensional surrounding information is information generated using three-dimensional data. Here, the three-dimensional data is, for example, a three-dimensional map. Note that the three-dimensional data may be information, etc., indicating the three-dimensional position or the three-dimensional shape of a target in the vehicle's surroundings obtained from another vehicle or a server, or detected by the own vehicle. For example, the three-dimensional surrounding information is a two-dimensional or three-dimensional video or map of the vehicle's surroundings generated using a three-dimensional map. Furthermore, the three-dimensional surrounding information, for example, includes three-dimensional information. For example, when the three-dimensional surrounding information is a video of the view ahead of the vehicle, the video includes information indicating the distance up to a target in the video. Furthermore, in the video, a pedestrian, or the like, present ahead of a preceding vehicle is displayed. Furthermore, the three-dimensional surrounding information may be information in which information indicating the distance or the pedestrian, etc., is superimposed on video obtainable from a sensor equipped in the vehicle. Furthermore, the three-dimensional surrounding information may be information in which height direction information is superimposed on a two-dimensional map.

Furthermore, the three-dimensional data may be three-dimensionally displayed, or a two-dimensional video or a two-dimensional map obtained from three-dimensional data may be displayed on a two-dimensional display, or the like.

When it is determined in step S901 that three-dimensional surrounding information is to be displayed (Yes in S902), the display device displays three-dimensional surrounding information (S903). On the other hand, when it is determined in step S901 that two-dimensional surrounding information is to be displayed (No in S902), the display device displays two-dimensional surrounding information (S904).

In this manner, the display device displays the three-dimensional surrounding information or the two-dimensional surrounding information that is determined to be displayed in step S901. A specific example will be displayed below. In a first example, the display device switches the surrounding information to be displayed according to whether the vehicle is under self-driving or manual driving. Specifically, during self-driving, the driver does not need to know in detail the detailed surrounding road information, and thus the display device displays two-dimensional surrounding information (for example, a two-dimensional map). On the other hand, during manual driving, the display device displays three-dimensional surrounding information (for example, three-dimensional map) so that the driver knows the details of the road information of the surroundings for safe driving.

Furthermore, during self-driving, in order to indicate to the user the kind of information on which the driving of the own vehicle is based, the display device may display information that influenced the driving operation (for example, an SWLD used in self-location estimation, traffic lanes, road signs, surrounding condition detection results, etc.). For example, the display device may display such information in addition to a two-dimensional map.

Note that the surrounding information to be displayed during self-driving and manual driving described above is merely an example, and the display device may display three-dimensional surrounding information during self-driving and display two-dimensional surrounding information during manual driving. Furthermore, in at least one of self-driving and manual driving, the display device may display metadata or a surrounding condition search result in addition to a two-dimensional or three-dimensional map or video, or may display metadata or a surrounding condition search result in place of a two-dimensional or three-dimensional map or video. Here, metadata is information indicating the three-dimensional position or three-dimensional shape of a target obtained from a server or another vehicle. Furthermore, the surrounding condition search result is information indicating the three-dimensional position or three-dimensional shape of a target detected by the own vehicle.

In a second example, the display device switches the surrounding information to be displayed according to the operating environment. For example, the display device switches the surrounding information to be displayed according to the brightness outside. Specifically, when the surroundings of the own vehicle is bright, the display device displays two-dimensional video obtainable using a camera equipped in the own vehicle or three-dimensional surrounding information created using the two-dimensional video. On the other hand, when the surroundings of the own vehicle is dark, two-dimensional video obtainable from the camera equipped in the own vehicle is dark and hard to watch, and thus the display device displays three-dimensional surrounding information created using LiDAR or millimeter wave radar.

Furthermore, the display device switches the surrounding information to be displayed according to an driving area which is the area in which the own-vehicle is currently present. For example, in a tourist spot, a city center, or the vicinity of a target location, the display device displays three-dimensional surrounding information to be able to provide the user with information of surrounding buildings, or the like. On the other hand, since there are many cases where detailed information of the surroundings is considered unnecessary in a mountainous area or the suburbs, etc., the display device displays two-dimensional surrounding information.

Furthermore, the display device may switch the surrounding information to be displayed based on weather conditions. For example, in the case of good weather, the display device displays three-dimensional surrounding information created using the camera or LiDAR. On the other hand, in the case of rain or dense fog, the three-dimensional surrounding information obtainable from a camera or LiDAR tends to include noise, and thus the display device displays three-dimensional surrounding information created using millimeter wave radar.

Furthermore, these switching of displays may be carried out automatically by a system or may be carried out manually by the user.

Furthermore, the three-dimensional surrounding information is generated from any one or more of dense point cloud data generated based on a WLD, mesh data generated based on a MWLD, sparse data generated based on a SWLD, lane data generated based on a lane world, two-dimensional map data including three-dimensional shape information of roads and intersections, and metadata including three-dimensional position or three-dimensional shape information that changes in real time or own vehicle detection results.

Note that, as described above, a WLD is three-dimensional point cloud data, and a SWLD is data obtained by extracting a point cloud having an amount of a feature greater than or equal to a threshold. Furthermore, a MWLD is data having a mesh structure generated from a WLD. A lane world is data obtained by extracting, from a WLD, a point cloud which has an amount of a feature greater than or equal to a threshold and is required for self-location estimation, driving assist, self-driving, or the like.

Here, a MWLD and a SWLD have a smaller amount of data compared to a WLD. Therefore, by using a WLD when more detailed data is required, and otherwise using a MWLD or a SWLD, the communication data amount and the processing amount can be appropriately reduced. Furthermore, a lane world has a smaller amount of data compared to a SWLD. Therefore, by using a lane world, the communication data amount and the processing amount can be further reduced.

Furthermore, although an example of switching between two-dimensional surrounding information and three-dimensional surrounding data is described above, the display device may switch the type of data (WLD, SWLD, etc.) to be used in generating three-dimensional surrounding information, based on the above-described conditions. Specifically, in the foregoing description, the display device displays three-dimensional surrounding information generated from first data (for example, a WLD or a SWLD) having a larger amount of data in the case of displaying three-dimensional surrounding information, and may display three-dimensional surrounding information generated from second data (for example, a SWLD or a lane world) having a smaller amount of data than the first data instead of two-dimensional surrounding data in the case of displaying two-dimensional surrounding data.

Furthermore, the display data displays the two-dimensional surrounding data or the three-dimensional surrounding information on, for example, a two-dimensional display equipped in the own vehicle, a head-up display, or a head-mounted display. Furthermore, the display device may transmit and display the two-dimensional surrounding data or the three-dimensional surrounding information on a mobile terminal such as a smartphone by radio communication. Specifically, the display device is not limited to being equipped in the mobile object, as long as it is equipped in a device that operates in conjunction with the mobile object. For example, when the user carrying a display device such as a smartphone boards the mobile device or operates the mobile device, information on the mobile object such as the location of the mobile object based on self-location detection of the mobile object is displayed on the display device, or such information together with surrounding information is displayed on the display device.

Furthermore, when displaying a three-dimensional map, the display device may render the three-dimensional map and display it as two-dimensional data or may display the three-dimensional map as three-dimensional data by using a three-dimensional display or a three-dimensional hologram.

Next, a method of storing the three-dimensional map will be described. A mobile object such as a car or robot makes use of a three-dimensional map obtainable by communication with a server or another vehicle and two-dimensional video or self-detected three-dimensional data obtainable from a sensor equipped in the own vehicle, for the self-driving of the car or the autonomous travelling of the robot. Among such data, data that the user wants to watch or store is different depending on conditions. Hereinafter, a method of storing data according to conditions will be described.

The storing device is equipped in a mobile object such as a car or a robot. Note that an example in which the mobile object is a vehicle (car) will be described below. First, the storing device may be included in the above-described display device.

In a first example, the storing device determines whether to store a three-dimensional map based on the area. Here, storing the three-dimensional map in a recording medium of the own vehicle enables self-driving inside the stored space without communication with the server. However, since the memory capacity is limited, only limited data can be stored. For this reason, the storing device limits the area to be stored in the manner indicated below.

For example, the storing device preferentially stores a three-dimensional map of an area frequently passed such as a commutation path or the surroundings of the home. This eliminates the need to obtain data of a frequently used area every time, and thus the communication data amount can be effectively reduced. Note that preferentially store refers to storing data having higher priority within a predetermined memory capacity. For example, when new data cannot be stored within the memory capacity, data having lower priority than the new data is deleted.

Alternatively, the storing device preferentially stores the three-dimensional map of an area in which the communication environment is poor. Accordingly, in an area in which the communication environment is poor, the need to obtain data via communication is eliminated, thus the occurrence of cases in which a three-dimensional map cannot be obtained due to poor communication can be reduced.

Alternatively, the storing device preferentially stores the three-dimensional map of an area in which traffic volume is high. Accordingly, it is possible to preferentially store the three-dimensional map of an area in which occurrence of accidents is high. Therefore, in which in such an area, the inability to obtain a three-dimensional map due to poor communication, and the deterioration of precision of self-driving or driving assist can be reduced.

Alternatively, the storing device preferentially stores the three-dimensional map of an area in which traffic volume is low. Here, in an area in which traffic volume is low, the possibility that an self-driving mode for automatically following the preceding vehicle cannot be used becomes high. With this, there are cases where more detailed surrounding information becomes necessary. Therefore, by storing the three-dimensional map of an area in which traffic volume is low, the precision of self-driving or driving assist in such an area can be improved.

Note that the above-described storing methods may be combined. Furthermore, these areas for which a three-dimensional map is to be preferentially stored may be automatically determined by a system, or may be specified by the user.

Furthermore, the storing device may delete, or updated with new data, a three-dimensional map for which a predetermined period has elapsed after storing. Accordingly, it is possible to prevent old map data from being used. Furthermore, in updating map data, the storing device may update only an area in which there is a change by comparing an old map and a new map to detect a difference area which is a spatial area where there is a difference, and adding the data of the difference area of the new map to the old map or removing the data of the difference area from the old map.

Furthermore, in this example, the stored three-dimensional map is used for self-driving. Therefore, by using a SWLD for the three-dimensional map, the communication data amount can be reduced. Note that the three-dimensional map is not limited to a SWLD, and may be another type of data such as WLD, etc.

In a second example, the storing device stores a three-dimensional map based on an event.

For example, the storing device stores as a three-dimensional map a special event to be encountered while the vehicle is underway. With this, the user can subsequently view, etc., details of the event. Examples of events to be stored as a three-dimensional map are indicated below. Note that the storing device may store three-dimensional surrounding information generated from a three-dimensional map.

For example, the storing device stores a three-dimensional map before and after a collision accident, or when danger is sensed, etc.

Alternatively, the storing device stores a three-dimensional map of a characteristic scene such as beautiful scenery, a crowded place, or a tourist spot.

These events to be stored may be automatically determined by a system or may be specified in advance by the user. For example, as a method of judging these events, machine learning may be used.

Furthermore, in this example, the stored three-dimensional map is used for viewing. Therefore, by using a WLD for the three-dimensional map, high-definition video can be provided. Note that the three-dimensional map is not limited to a WLD, and may be another type of data such as SWLD, etc.

Hereinafter, a method in which the display device controls display according to the user will be described. When displaying the surrounding condition detection result obtained by inter-vehicle communication by superimposing it on a map, the display device represents a nearby vehicle using wireframe or represents a nearby vehicle with transparency in order to make a detected object on a far side of the nearby vehicle visible. Alternatively, the display device may display video from an overhead perspective to enable a birds-eye view of the own vehicle, the nearby vehicle, and the surrounding condition detection result.

Figure 42:
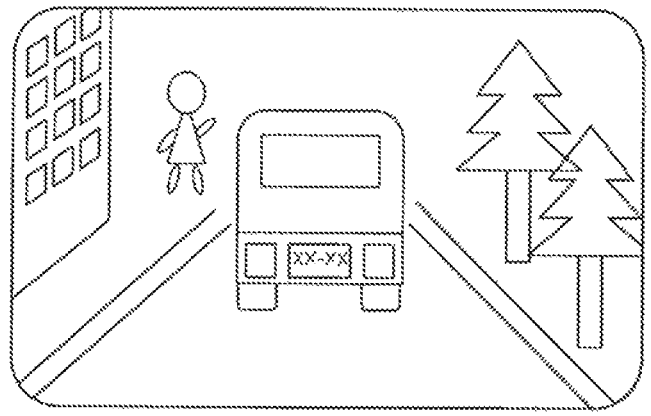
FIG. 42 is a diagram that illustrates an example of a surrounding environment visible through a windshield according to Embodiment 6.
Figure 43:
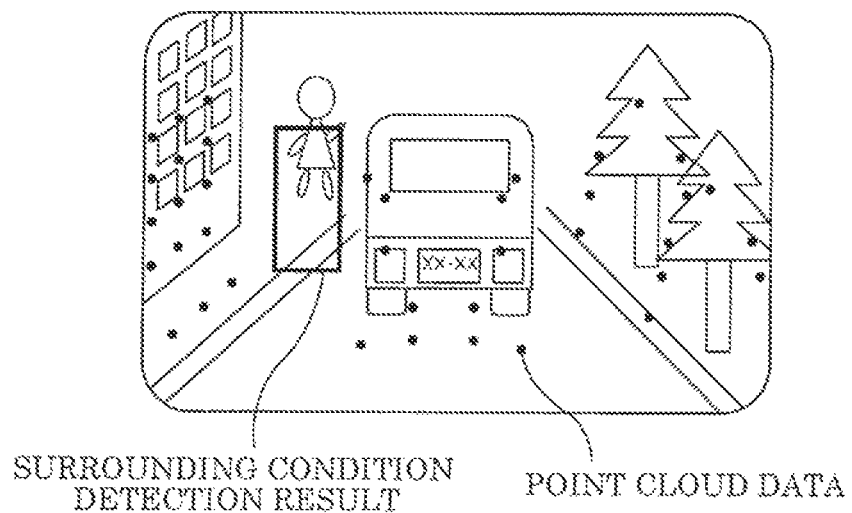
FIG. 43 is a diagram that illustrates an example of a display on a head-up display according to Embodiment 6.

When the surrounding condition detection result or the point cloud data is superimposed on the surrounding environment visible through the windshield, using a head-up display, as illustrated in FIG. 42, the position at which information is to be superimposed may become misaligned due to a difference in the posture, physique, or eye position of the user. FIG. 43 is a diagram illustrating an example of a display on a head-up display when the superimposition position is misaligned.

Figure 44:
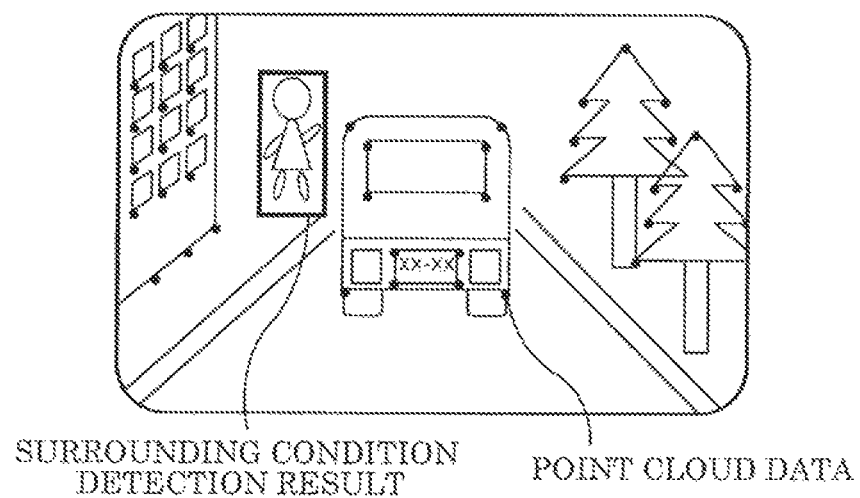
FIG. 44 is a diagram that illustrates an example of a display on a head-up display after adjustment according to Embodiment 6.

In order to correct such a misalignment, the display device detects the posture, physique, or eye position of the user using information from a vehicle interior camera or a sensor equipped in a vehicle seat. The display device adjusts the position at which information is to be superimposed according to the posture, physique, or eye position of the user detected. FIG. 44 is a diagram illustrating an example of the display on the head-up display after adjustment.

Note that such a superimposition position adjustment may be performed manually by the user using a control device equipped in the car.

Furthermore, during a disaster, the display device may indicate a safe place on the map, and present this to the user. Alternatively, the vehicle may convey, to the user, details of the disaster and that fact of going to a safe place, and perform self-driving up to the safe place.

For example, when an earthquake occurs, the vehicle may set an area with a high sea-level altitude as the destination to avoid getting caught up in a tsunami. At this time, the vehicle may obtain, through communication with a server, information on roads that have become difficult to pass through due to the earthquake, and perform processing according to the details of the disaster such as taking a route that avoids such roads.

Furthermore, the self-driving may include a plurality of modes such as travel mode, drive mode, etc.

In travel mode, the vehicle determines the route up to a destination with consideration being given to arrival time earliness, fee cheapness, travel distance shortness, energy consumption lowness, etc., and performs self-driving according to the determined route.

In drive mode, the vehicle automatically determines the route so as to arrive at the destination at the time specified by the user. For example, when the user sets the destination and arrival time, the vehicle determines a route that enables the user to go around a nearby tourist spot and arrive at the destination at the set time.

Although a three-dimensional data creation device and a display device according to the embodiments of the present disclosure have been described above, the present disclosure is not limited to such embodiments.

Note that each of the processing units included in the three-dimensional data creation device and the display device according to the embodiments is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as a three-dimensional data creation method or a display method performed by the three-dimensional data creation device or the display device.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional information creation device and the display device according to one or more aspects has been described on the basis of the embodiments, the present disclosure is not limited to such embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a display device.
What is claimed is:

1. A display method performed by a display control device that operates in conjunction with a mobile object, the display method comprising:
generating first surrounding information and second surrounding information, the first surrounding information indicating a surrounding condition of the mobile object based on two-dimensional information, the second surrounding information indicating the surrounding condition of the mobile object based on three-dimensional data;
determining which one of the first surrounding information and the second surrounding information is to be displayed, based on brightness of surroundings of the mobile object; and
controlling a display to display the one of the first surrounding information and the second surrounding information,
wherein the display is further controlled to switch information to be displayed between the first surrounding information and the second surrounding information, based on a change in the brightness of surroundings of the mobile object.

2. The display method according to claim 1, wherein
in the determining, the first surrounding information is determined to be displayed when the brightness of the surroundings of the mobile object is higher than a predetermined brightness, and the second surrounding information is determined to be displayed when the brightness of the surroundings of the mobile object is lower than the predetermined brightness.

3. A display control device that operates in conjunction with a mobile object, the display control device comprising:
at least one processor configured to:
generate first surrounding information and second surrounding information, the first surrounding information indicating a surrounding condition of the mobile object based on two-dimensional information, the second surrounding information indicating the surrounding condition of the mobile object based on three-dimensional data; and
determine which one of the first surrounding information and the second surrounding information is to be displayed, based on brightness of surroundings of the mobile object; and
display control circuitry configured to control a display to show a video based on the one of the first surrounding information and the second surrounding information,
wherein the display control circuitry is further configured to control the display to switch information to be displayed between the first surrounding information and the second surrounding information, based on a change in the brightness of surroundings of the mobile object.

4. The display control device according to claim 3, wherein
the at least one processor determines that the first surrounding information is to be displayed when the brightness of the surroundings of the mobile object is higher than a predetermined brightness, and determines that the second surrounding information is to be displayed when the brightness of the surroundings of the mobile object is lower than the predetermined brightness.

5. A non-transitory computer readable recording medium having recorded thereon a program for causing a computer to execute a display method performed by a display control device that operates in conjunction with a mobile object, wherein
the program causes the computer to execute:
generating first surrounding information and second surrounding information, the first surrounding information indicating a surrounding condition of the mobile object based on two-dimensional information, the second surrounding information indicating the surrounding condition of the mobile object based on three-dimensional data;

determining which one of the first surrounding information and the second surrounding information is to be displayed, based on brightness of surroundings of the mobile object; and controlling a display to display the one of the first surrounding information and the second surrounding information, wherein the display is further controlled to switch information to be displayed between the first surrounding information and the second surrounding information, based on a change in the brightness of surroundings of the mobile object.

6. The recording medium according to claim 5, wherein in the determining, the first surrounding information is determined to be displayed when the brightness of the surroundings of the mobile object is higher than a predetermined brightness, and the second surrounding information is determined to be displayed when the brightness of the surroundings of the mobile object is lower than the predetermined brightness.

* * * * *